US011335486B2

(12) United States Patent
Lee

(10) Patent No.: US 11,335,486 B2
(45) Date of Patent: May 17, 2022

(54) SYSTEMS AND METHODS FOR ELECTROMAGNETIC FORMING OF CONTAINERS

(71) Applicant: Belvac Production Machinery Inc., Lynchburg, VA (US)

(72) Inventor: Richard H. Lee, Forest, VA (US)

(73) Assignee: Belvac Production Machinery Inc., Lynchburg, VA (US)

(*) Notice: Subject to any disclaimer, the term of this patent is extended or adjusted under 35 U.S.C. 154(b) by 445 days.

(21) Appl. No.: 16/107,249

(22) Filed: Aug. 21, 2018

(65) Prior Publication Data

US 2018/0354016 A1 Dec. 13, 2018

Related U.S. Application Data

(62) Division of application No. 15/307,161, filed as application No. PCT/US2015/029084 on May 4, 2015, now Pat. No. 10,081,045.
(Continued)

(51) Int. Cl.
*H01F 6/06* (2006.01)
*H01F 5/00* (2006.01)
(Continued)

(52) U.S. Cl.
CPC ............ *H01F 6/06* (2013.01); *B21D 1/06* (2013.01); *B21D 22/125* (2013.01);
(Continued)

(58) Field of Classification Search
CPC ... H01F 7/202; H01F 5/00; H01F 6/06; B21D 26/045
See application file for complete search history.

(56) References Cited

U.S. PATENT DOCUMENTS 1,433,937 A * 10/1922 Clews ............... B23P 15/06
277/458
1,738,528 A * 12/1929 Dunlop ............... H01F 7/06
336/197
(Continued)

FOREIGN PATENT DOCUMENTS

CN 1681672 A 10/2005
CN 101090783 A 12/2007
(Continued)

OTHER PUBLICATIONS

International Search Report from International Application No. PCT/US2015/029084 dated Jul. 23, 2015.
(Continued)

*Primary Examiner* — Mohamad A Musleh
(74) *Attorney, Agent, or Firm* — Nixon Peabody LLP

(57) ABSTRACT

Systems and methods of forming articles using electromagnetic radiation are disclosed. In some aspects, the system includes a plurality of forming modules movably mounted relative to an infeed mechanism. The infeed mechanism is configured to supply pre-form articles to the plurality of forming modules, and each of the plurality of forming modules includes a multi-segment mold disposed about an electromagnetic coil. The electromagnetic coil is configured to impart an electromagnetic force on the pre-form articles when supplied with electrical energy that urges the pre-form articles into contact with the multi-segment mold to produce the formed containers.

22 Claims, 29 Drawing Sheets

Related U.S. Application Data

(60) Provisional application No. 61/988,214, filed on May 4, 2014.

(51) Int. Cl.

| | | |
|---|---|---|
| *B21D 26/045* | (2011.01) | |
| *C22F 1/04* | (2006.01) | |
| *B21D 26/049* | (2011.01) | |
| *B30B 1/42* | (2006.01) | |
| *B30B 1/00* | (2006.01) | |
| *B21D 1/06* | (2006.01) | |
| *B21D 22/12* | (2006.01) | |
| *B21D 51/26* | (2006.01) | |
| *B21D 26/14* | (2006.01) | |

(52) U.S. Cl.
CPC ......... *B21D 26/045* (2013.01); *B21D 26/049* (2013.01); *B21D 26/14* (2013.01); *B21D 51/26* (2013.01); *B21D 51/2607* (2013.01); *B21D 51/2615* (2013.01); *B21D 51/2692* (2013.01); *B30B 1/00* (2013.01); *B30B 1/42* (2013.01); *C22F 1/04* (2013.01); *H01F 5/00* (2013.01)

(56) References Cited

U.S. PATENT DOCUMENTS

| | | | |
|---|---|---|---|
| 2,976,907 A | 3/1961 | Harvey | |
| 3,088,200 A | 5/1963 | Birdsall | |
| 3,108,325 A | 10/1963 | Harvey | |
| 3,195,335 A | 7/1965 | Brower | |
| 3,272,659 A * | 9/1966 | Bassett, Jr. | H01L 35/00 136/203 |
| 3,372,566 A * | 3/1968 | Schenk | B21D 26/14 72/56 |
| 3,447,350 A | 6/1969 | Schenk | |
| 3,540,250 A | 11/1970 | Schwinghamer | |
| 3,566,647 A | 3/1971 | Inoue | |
| 3,599,462 A * | 8/1971 | Kline | B21D 26/14 72/56 |
| 3,797,294 A | 3/1974 | Roth | |
| 3,842,631 A | 10/1974 | Aschberger | |
| 4,170,887 A | 10/1979 | Baranov | |
| 4,619,127 A | 10/1986 | Sano | |
| 4,947,667 A | 8/1990 | Gunkel | |
| 4,962,656 A | 10/1990 | Kunerth | |
| 4,990,805 A | 2/1991 | Zieve | |
| 5,058,408 A | 10/1991 | Leftault, Jr | |
| 5,187,962 A | 2/1993 | Bilko | |
| 5,275,033 A | 1/1994 | Riviere | |
| 5,331,832 A | 7/1994 | Cherian | |
| 5,353,617 A | 10/1994 | Cherian | |
| 5,428,337 A * | 6/1995 | Vinclarelli | H01F 5/00 336/223 |
| 5,457,977 A | 10/1995 | Wilson | |
| 5,634,364 A | 6/1997 | Gardner | |
| 5,687,599 A | 11/1997 | Donaldson | |
| 5,730,016 A | 3/1998 | Zittel | |
| 5,776,270 A | 7/1998 | Biondich | |
| 5,813,264 A | 9/1998 | Steingroever | |
| 5,826,320 A | 10/1998 | Rathke | |
| 5,916,317 A | 6/1999 | Willoughby | |
| 5,970,767 A | 10/1999 | Hartman | |
| 6,047,582 A | 4/2000 | Daehn | |
| 6,079,244 A | 6/2000 | Robinson | |
| 6,151,939 A | 11/2000 | Hanna | |
| 7,752,880 B2 | 7/2010 | Sakamoto | |
| 8,302,451 B2 | 11/2012 | Matsuo | |
| 10,081,045 B2 | 9/2018 | Lee | |
| 10,407,203 B2 | 9/2019 | Adams | |
| 2008/0041243 A1 | 2/2008 | Sakamoto | |
| 2018/0229288 A1 | 8/2018 | Lee | |
| 2018/0304337 A1 | 10/2018 | Lee | |
| 2019/0001390 A1 | 1/2019 | Dick | |

FOREIGN PATENT DOCUMENTS

| | | |
|---|---|---|
| CN | 102248059 A | 11/2011 |
| CN | 102806262 A | 12/2012 |
| EP | 0853515 A1 | 7/1998 |
| EP | 1561606 A | 8/2005 |
| EP | 2123373 A1 | 11/2009 |
| JP | 2006264769 A | 10/2006 |
| JP | 2011079015 A | 5/2013 |
| SE | 398716 B | 1/1978 |
| WO | 9111274 A1 | 8/1991 |
| WO | 9712706 A1 | 4/1997 |
| WO | 2015171512 A1 | 11/2015 |

OTHER PUBLICATIONS

Extended European Search Report International Patent Application No. EP 19178978.3, dated Oct. 24, 2019 (7 pages).
Written Opinion in International Application No. PCT/US2015/029084, dated Jul. 23, 2015 (7 pages).
International Search Report and Written Opinion of International Searching Authority for International Patent Application No. PCT/US2019/024650, dated Jul. 8, 2019 (10 pages).

\* cited by examiner

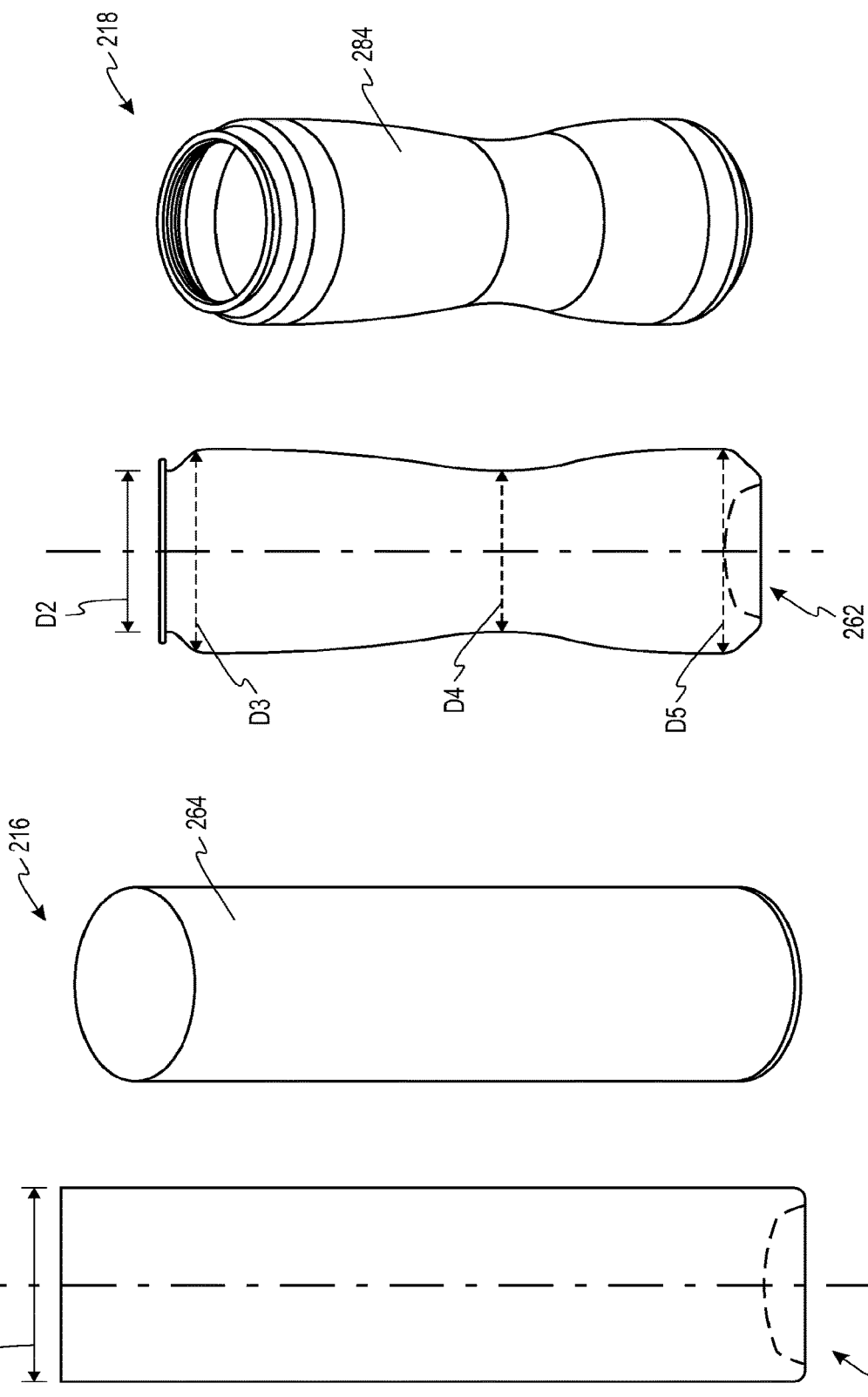

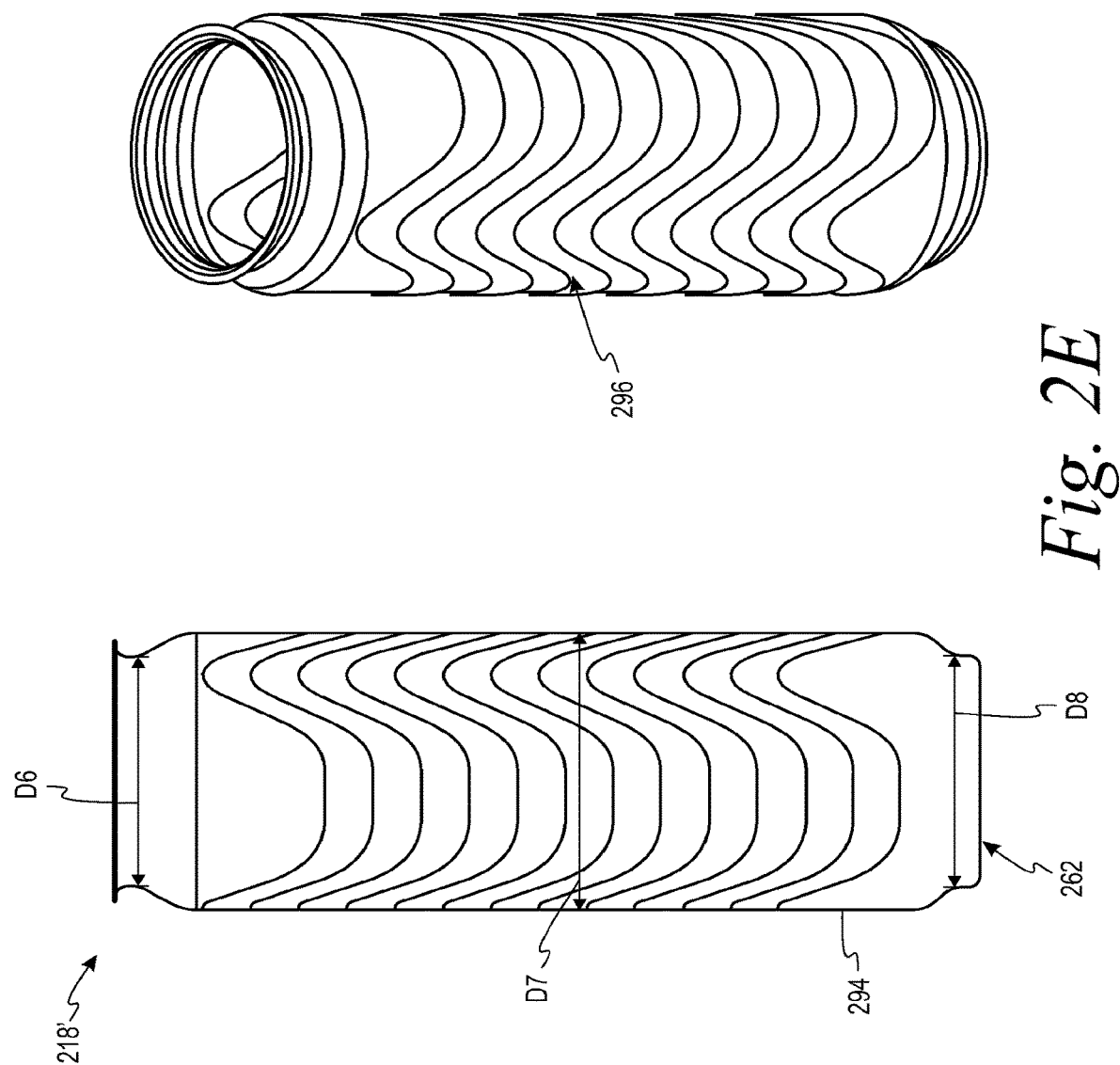

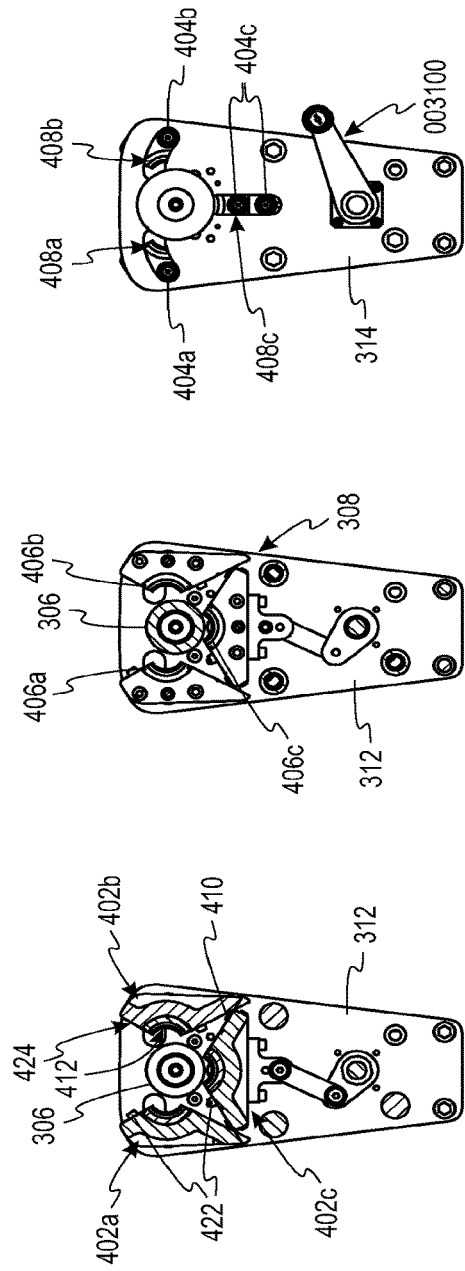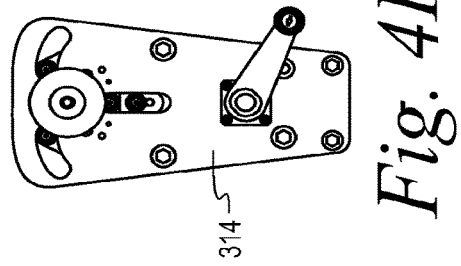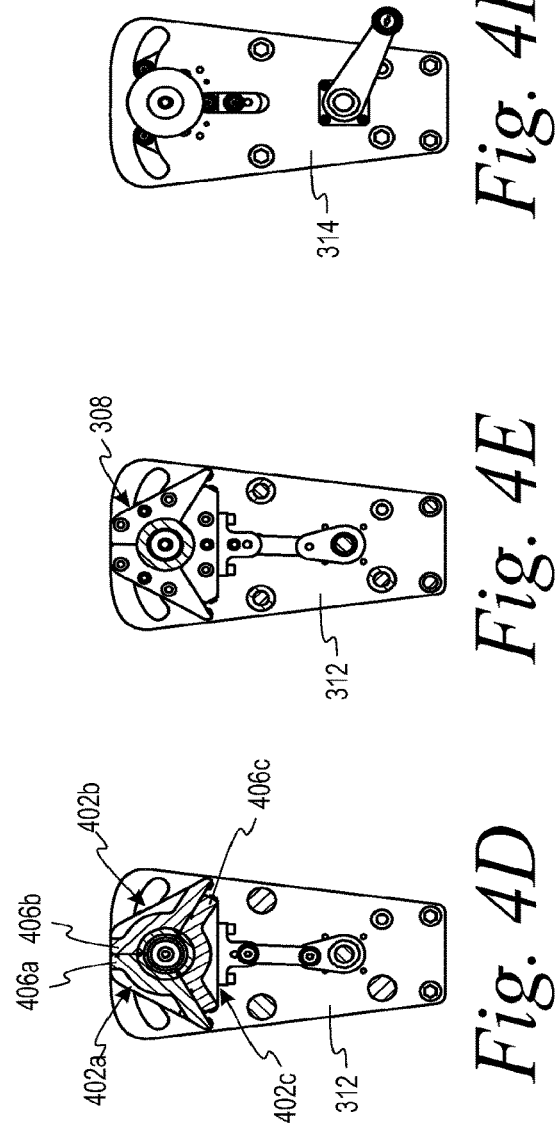

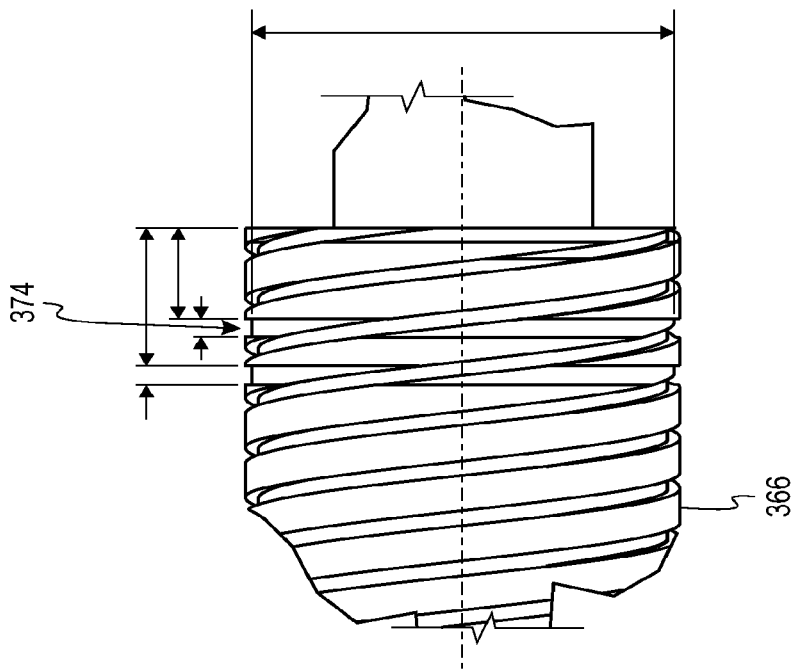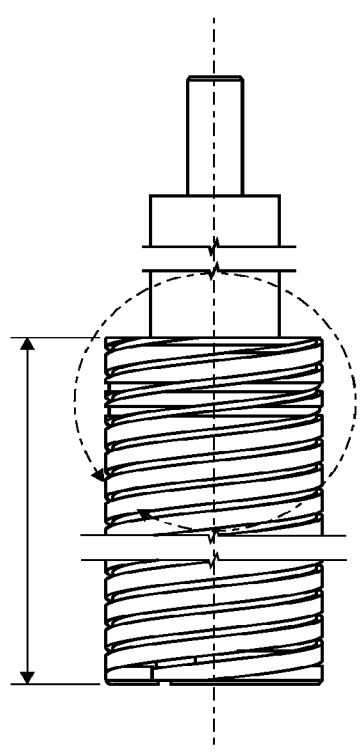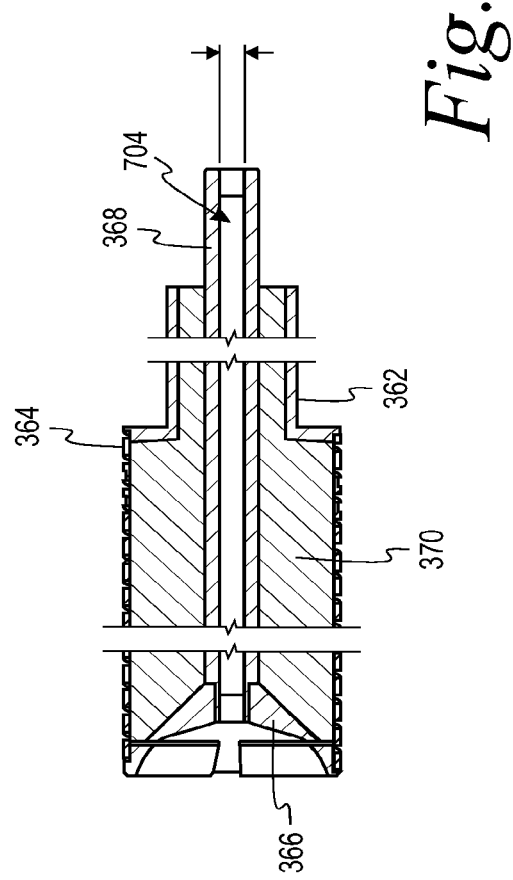
Fig. 7D

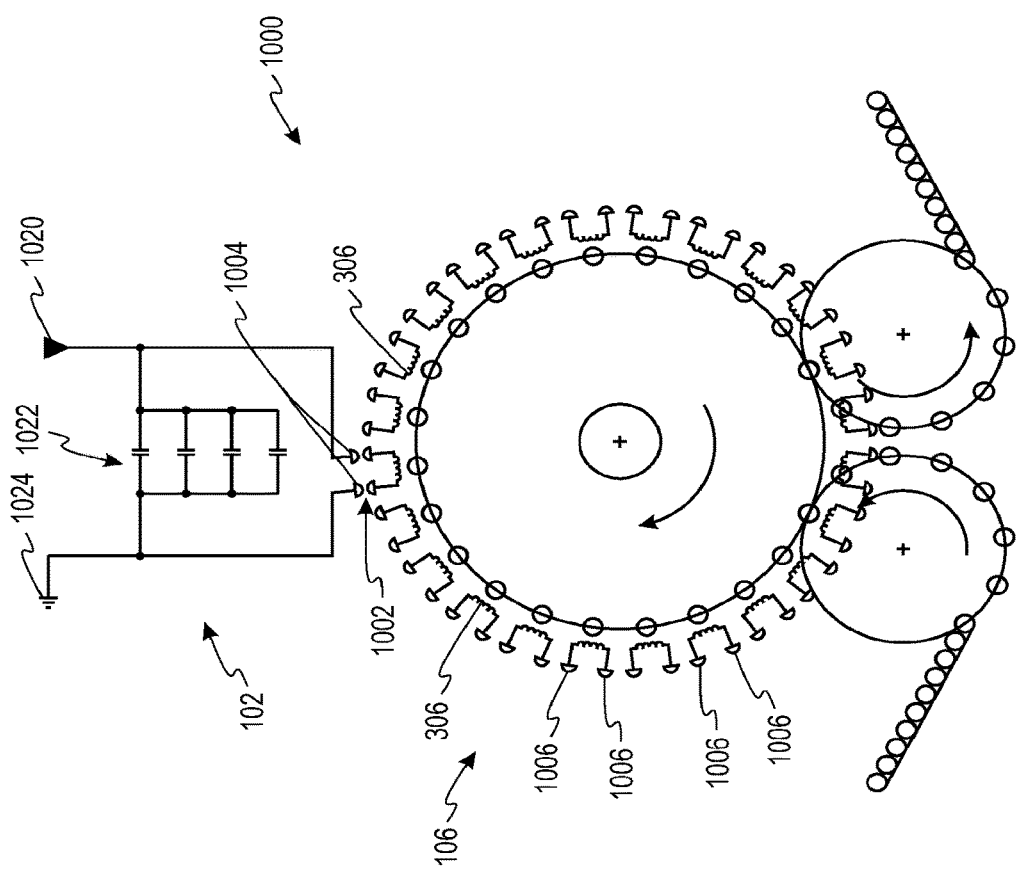

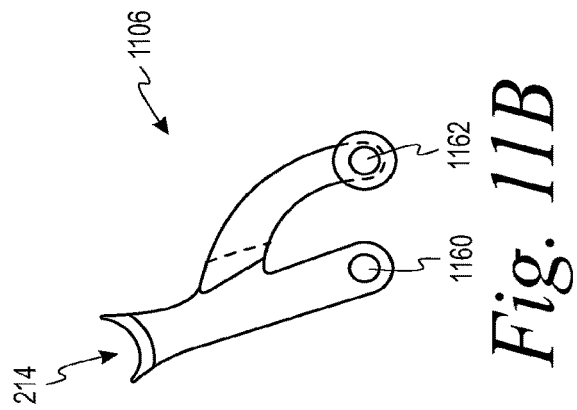
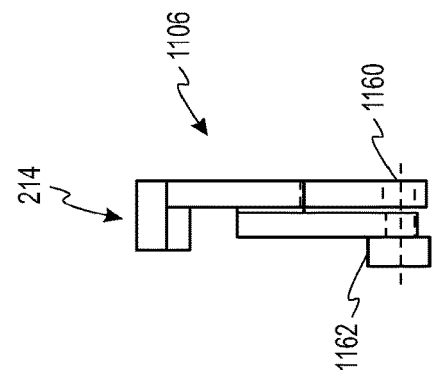
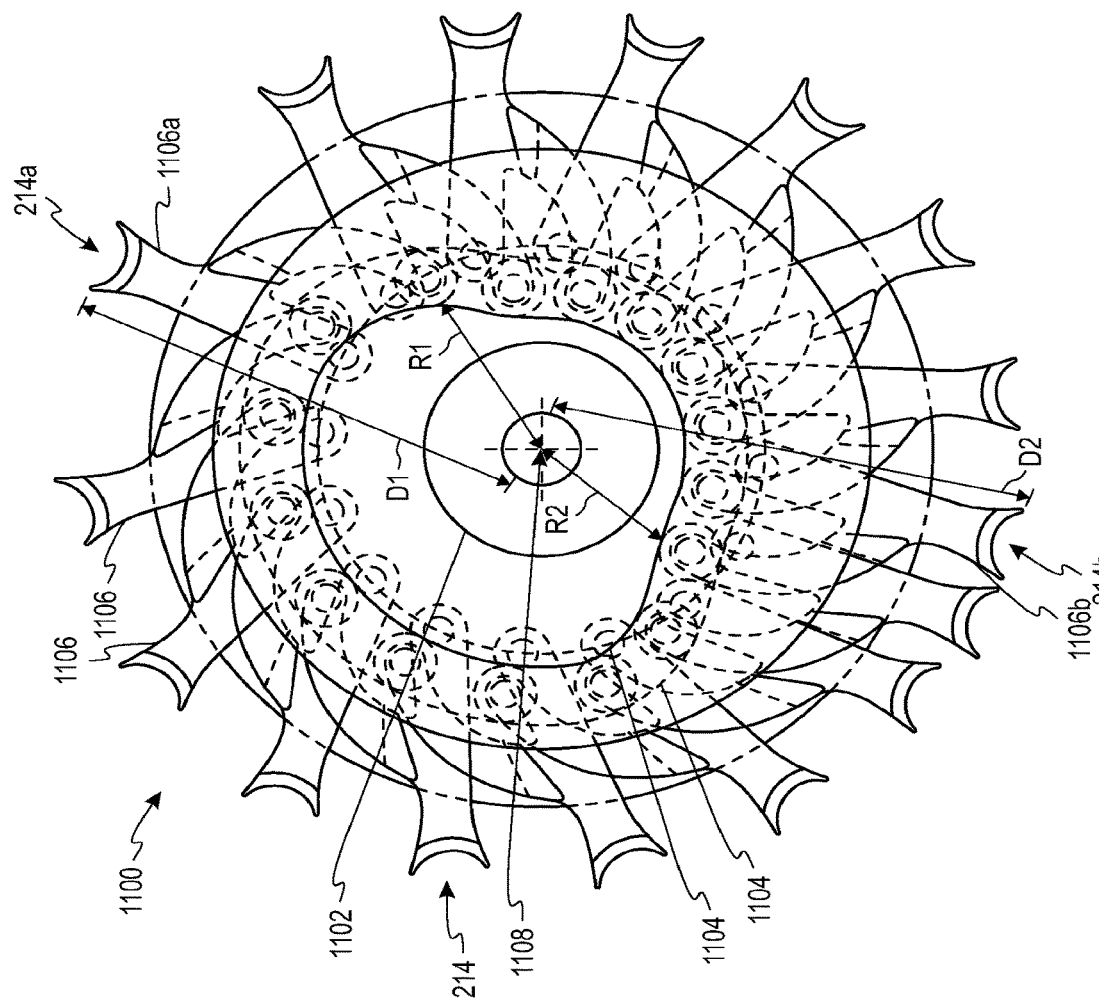

SYSTEMS AND METHODS FOR ELECTROMAGNETIC FORMING OF CONTAINERS

CROSS-REFERENCE TO RELATED APPLICATIONS

This application claims the benefit of U.S. Provisional Application No. 61/988,214, filed May 4, 2014, the contents of which are hereby incorporated by reference herein in its entirety.

FIELD OF THE INVENTION

The present disclosure relates generally to manufacturing articles such as beverage containers, and more particularly, to systems and methods of forming containers using electromagnetic processing.

BACKGROUND

In conventional production of metal containers, a large number of manufacturing operations are required to produce common features. Pre-form containers, such as those produced by a drawn-wall ironing process or an impact-extrusion process, typically require a number of forming operations including expanding, necking, flanging, body shaping, embossing, threading, trimming, threading, etc. to produce a finished container. Moreover, each of these forming operations generally requires multiple stages to produce the desired feature. At each stage, a cold-forming or cold-working step is performed by contacting the container with specific tooling such as dies.

Necking a container generally requires between approximately 7 and 17 die-necking stages to produce, depending on properties of the container such as wall thickness and neck geometry. Flanging the container generally requires one or more roll-forming stages. Shaping the body of a container generally requires multiple die-reduction and die-expansion stages, with the number of stages increasing as the complexity of the final geometry increases. Embossing or debossing generally requires one stage of rolling against a tool, or pressure forming into a mold. Threading generally requires at least one roll-forming stage. Trimming generally requires one stage, and multiple trimming operations may be required when multiple necking and shaping stages are performed. For example, one trim may be required after every approximately 8 to 12 reducing or expanding stages. Thus, production of a completely finished container can require 50 or more forming stages.

Conventional machine arrangements for bottle and can manufacturing include a plurality of processing or forming modules extending in a single process line that is typically linear. This is generally referred to as a "machine line." Containers are passed through the machine line until reaching a desired stage of manufacture. Each module in the machine line receives a container and completes only a single forming stage on the container before passing the container to an adjacent module. Thus, such arrangements generally require a large amount of space in a warehouse, factory, or other location. What is more, each module in the machine line also generally increases operating costs for the system because each module requires individualized maintenance and provides additional points of potential failure.

Another downside of conventional machine arrangements is that each cold-form stage alters the physical properties of the container material, typically making the material more brittle. Thus, the structural integrity of the article is reduced, and additional operations such as heating or lubricating the container may be required to counteract these altered properties.

As an alternative to cold-forming, metal straight-wall pre-form articles or other tubes can be subjected to magnetic pressure, and thereby formed, using a wound-wire electromagnetic coil inserted into the container. When a large electrical pulse is released through the coil, an induced current pulse is produced in the wall of the container. The resulting magnetic pressure can be used to force the wall of the container outward, thereby forming the container. A mold is sometimes used to aid in shaping the container.

These magnetic-pressure systems are generally low-speed, low-throughput, and batch systems. These systems also have significant drawbacks such as inconsistent forming of articles, an inability to produce fine-detail embossing, an inability to produce smooth-sided containers, an inability to produce certain container geometries, or the like. For example, certain container geometries cannot be achieved using electromagnetic systems because the wound-wire coils cannot deliver sufficient electromagnetic force near the lower sidewall of the container due to insufficient clearance between the domed bottom of the can and the sidewall for the electromagnetic coil. One method attempting to cure this deficiency is disclosed in U.S. Pat. No. 5,730,016 entitled "Method and Apparatus for Electromagnetic Forming of Thin Walled Metal." The system disclosed therein includes an intermediate conductor that is thinner than the coil and, thus, can extend more proximate the domed bottom of the article. The wound-wire coil induces a current into the intermediate conductor, which in turn applies an electromagnetic force on the article. However, this produces a number of drawbacks including a loss of forming power between the coil and the article due to induction of current in the intermediate conductor, a non-uniform force applied in the radial direction due to the required slit(s) in the intermediate conductor, and/or a sizing issue due to the coil and intermediate conductor needing to fit inside of the pre-form article.

Thus, a need exists for systems and methods providing high-speed, high-throughput electromagnetic forming of containers. A further need exists for systems and methods that use electromagnetic energy to consistently form containers having irregular shapes. A yet further need exists for systems and methods that can directly apply electromagnetic forces to low-clearance areas of containers.

SUMMARY

According to aspects of the present disclosure, a rotary-turret system for forming a plurality of formed containers from a respective plurality of pre-form articles using electromagnetic energy includes a rotary turret, a charging circuit, and a discharge-control mechanism. The rotary turret includes a plurality of forming modules. The forming modules are disposed about the periphery of the rotary turret. Each forming module includes a multi-segment mold disposed about an electromagnetic coil. The multi-segment mold has a plurality of segments. Each segment includes an inner surface. The plurality of inner surfaces defines a desired shape of the formed containers. The electromagnetic coil is configured to impart an electromagnetic force on the pre-form articles when supplied with electrical energy. The electromagnetic force is configured to urge the pre-form articles into contact with the inner surfaces of the multi-segment mold to produce the formed containers. The charging circuit is configured to supply the electrical energy to the rotary turret. The discharge-control mechanism is operatively coupled to the rotary turret and the charging circuit. The discharge-control mechanism is configured to selectively actuate discharge of the electrical energy from the charging circuit to a predetermined one of the plurality of forming modules. The rotary turret continually rotates during forming of the plurality of formed containers.

According to further aspects of the present disclosure, a method for electromagnetic forming of formed containers using a rotary turret has a plurality of forming modules disposed about the periphery of the rotary turret includes the acts of receiving a pre-form article from an upstream process in a respective one of the forming modules, disposing the pre-form article about an electromagnetic coil, securing a multi-segment mold about the pre-form article, and supplying a first electrical energy to the electromagnetic coil to produce an electromagnetic force after securing the multi-segment mold. The electromagnetic coil is disposed on the forming module. The electromagnetic coil is configured to impart an electromagnetic force on the pre-form article when supplied with electrical energy. The multi-segment mold includes a plurality of segments. Each of the plurality of segments includes an inner surface. The plurality of inner surfaces defines a desired shape of the formed containers. The electromagnetic force is configured to urge the pre-form article into contact with the inner surfaces of the multi-segment mold. Contact between the pre-form article and the inner surfaces of the multi-segment mold produce one of the formed containers. The disposing, securing, and supplying steps occur while the rotary turret continually rotates.

According to yet further aspects of the present disclosure, a system for forming a plurality of formed containers from a plurality of pre-form articles using electromagnetic energy includes a plurality of forming modules, a charging circuit, and a discharge control mechanism. The plurality of forming modules is movably mounted relative to an infeed mechanism. The infeed mechanism is configured to supply pre-form articles to the plurality of forming modules. Each of the plurality of forming modules includes a multi-segment mold disposed about an electromagnetic coil. The multi-segment mold has a plurality of segments. Each of the plurality of segments includes an inner surface. The plurality of inner surfaces defines a desired shape of the formed containers. The electromagnetic coil is configured to impart an electromagnetic force on the pre-form articles when supplied with electrical energy. The electromagnetic force is configured to urge the pre-form articles into contact with the inner surfaces of the multi-segment mold to produce the formed containers. The charging circuit is configured to supply the electrical energy to the plurality of forming modules. The discharge-control mechanism is operatively coupled to the plurality of forming modules and the charging circuit. The discharge-control mechanism is configured to selectively actuate discharge of the electrical energy from the charging circuit to a predetermined forming module.

According to still yet further aspects of the present disclosure, a mold system includes a first plate disposed opposite a second plate, and a multi-segment mold. Each of the first plate and the second plate includes a plurality of slots thereon. Each of the plurality of slots in the first plate corresponds to a respective one of the plurality of slots on the second plate. The multi-segment mold extends the distance between the first plate and the second plate. The multi-segment mold has an open state and a closed state. The multi-segment mold includes a plurality of segments. Each of the plurality of segments has one of a plurality of inner surfaces thereon. The plurality of segments is cooperatively arranged such that the plurality of inner surfaces defines a volume when in the closed state. Each of the plurality of segments of the multi-segment mold includes a first end disposed proximate the first plate and a second end proximate the second plate. The first end and the second end of each of the plurality of segments includes slot followers. Each of the slot followers is configured to engage one of the plurality of slots. Each of the plurality of slots is shaped such that engagement of the slot followers with the respective slots guide movement of the plurality of segments between the open state and the closed state when each of the plurality of segments moves relative to the first plate and the second plate.

According to additional aspects of the present disclosure, an electromagnetic coil assembly includes a bottom cap and milled helical windings. The milled helical windings are electrically coupled to the bottom cap. The bottom cap and the milled helical windings are configured to be coupled to a charging circuit. The helical coil is configured to exert an electromagnetic force when an electrical energy is passed through the milled helical windings. The milled helical windings are created by milling a generally cylindrical tube of conductive material.

According to yet additional aspects of the present disclosure, a method of making an electromagnetic coil includes the acts of assembling a top cap, a winding tube, a bottom cap, and a return conductor, pouring a curable material into a cavity formed by the top cap, the winding tube, the bottom cap, and the return conductor, and milling the winding tube to form helical windings. The assembling includes securing the top cap to a first end of the winding tube, securing the bottom cap to a second end of the winding tube, and securing the return conductor to the bottom cap. The second end is opposite the first end. The top cap is electrically coupled to the winding tube. The bottom cap is electrically coupled to the winding tube. The return conductor is electrically coupled to the bottom cap. The windings are formed by removing portions of the winding tube.

According to still yet additional aspects of the present disclosure, an electromagnetic coil includes a top cap, a bottom cap, helical windings, and a return conductor. The bottom cap is shaped to accommodate a domed bottom of a pre-form article. The helical windings extend between the top cap and the bottom cap. The helical windings are electrically couple the top cap and the bottom cap. The helical windings define a generally cylindrical cavity therein. Each of the helical windings has a cross-sectional profile. The cross-sectional profiles include generally flat edges proximate the cavity. The return conductor is electrically coupled to the bottom cap. The top cap, helical windings, bottom cap, and return conductor form an electrical circuit. The electrical circuit is configured to be electrically coupled to a charging circuit.

Aspects of the present disclosure also provide a variable-speed starwheel for transferring articles including a driving mechanism, a cam surface, and an arm. The driving mechanism is configured to rotate about an axis of rotation. The cam surface has variable radial distance from the axis of rotation. The variable radial distance has a first radial distance extending a first distance away from the axis of rotation at a first angular position. The variable radial distance also has a second radial distance extending a second distance away from the axis of rotation at a second angular position. The second angular position is spaced a distance from the first angular position. The arm is coupled to the driving mechanism. The arm includes a pivot mechanism, a pocket, and a cam follower. The pivot mechanism is coupled to the driving mechanism. The pivot mechanism provides pivotable movement of the arm relative to the driving mechanism. The pivot mechanism is spaced a distance from the pocket. The pocket is configured to releasably receive the articles. The cam follower is configured to engage the cam surface. Engagement of the cam follower with the cam surface at the first angular position disposes the arm at a first angle. Engagement of the cam follower with the cam surface at the second angular position disposes the arm at a second angle. The second angle is different than the second angle.

Aspects of the present disclosure yet also provide an arm for use in a variable-speed starwheel to transfer articles including a member and a cam follower. The member has a first end opposite a second end. The first end has a pivot mechanism configured to be coupled to a driving mechanism. The pivot mechanism is configured to provide pivotable movement of the arm relative to the driving mechanism. The second end has a pocket configured to releasably receive the articles. The cam follower is configured to engage a cam surface. The cam follower is coupled to the member such that engagement of the cam follower with a cam surface is configured pivotably move the arm about the pivot mechanism.

Aspects of the present disclosure still yet also provide a variable-speed starwheel for transferring articles including a driving mechanism, a cam surface, and an arm. The driving mechanism is configured to rotate about an axis of rotation. The cam surface has variable radial distance from the axis of rotation. The variable radial distance has a first radial distance extending a first distance away from the axis of rotation at a first angular position. The variable radial distance also has second radial distance extending a second distance away from the axis of rotation at a second angular position. The second angular position is spaced a distance from the first angular position. The arm is coupled to the driving mechanism. The arm includes a first portion and a second portion. The second portion is slidably mounted on the first portion. The first portion is attached to the driving mechanism. The second portion includes a pocket and a cam follower. The pocket is configured to releasably receive the articles. The cam follower is configured to engage the cam mechanism. Engagement of the cam follower with the cam surface at the first angular position disposes the arm at a first distance from the axis of rotation. Engagement of the cam follower with the cam surface at the second angular position disposes the arm at a second distance from the axis of rotation. The first distance is different than the second distance.

Aspects of the present disclosure further also provide a variable-speed starwheel for transferring articles including a driving mechanism, a pocket, and a movement means. The driving mechanism is configured to rotate about an axis of rotation. The pocket is coupled to the driving mechanism. The pocket is configured to releasably receive the articles. The movement means is configured to dispose the pocket at a first distance from the axis of rotation when the pocket is at a first angular position and to dispose the pocket at a second distance from the axis of rotation when the pocket is at a second angular position.

BRIEF DESCRIPTION

FIG. 2C illustrates an example pre-form article.

FIG. 2D illustrates an example formed container having been shaped, necked, and flanged using electromagnetic forming.

FIG. 2E illustrates an exemplary formed container having been expanded, necked, flanged, and embossed using electromagnetic forming.

FIG. 4A illustrates a cross-sectional view of the forming module of FIG. 3A when the mold is in an open position.

FIG. 4B illustrates an end view of the forming module of FIG. 4A, with the outer plate removed.

FIG. 4C illustrates an end view of the forming module of FIG. 4A.

FIG. 4D illustrates a cross-sectional view of the forming module of FIG. 3A when the mold is in a closed position.

FIG. 4E illustrates an end view of the forming module of FIG. 4D, with the outer plate removed.

FIG. 4F illustrates an end view of the forming module of FIG. 4D.

FIG. 7D illustrates a side view of the electromagnetic coil of FIG. 7C, according to aspects of the present disclosure.

FIG. 10A illustrates an example of a schematic of a system including a moving spark-gap mechanism, according to aspects of the present disclosure.

FIG. 11A illustrates a side view of a variable-speed starwheel, according to aspects of the present disclosure.

FIG. 11B illustrates a side view an arm for use in the variable-speed starwheel of FIG. 11A from a first side.

FIG. 11C illustrates a side view an arm for use in the variable-speed starwheel of FIG. 11A from a second side.

DETAILED DESCRIPTION

Figure 1:
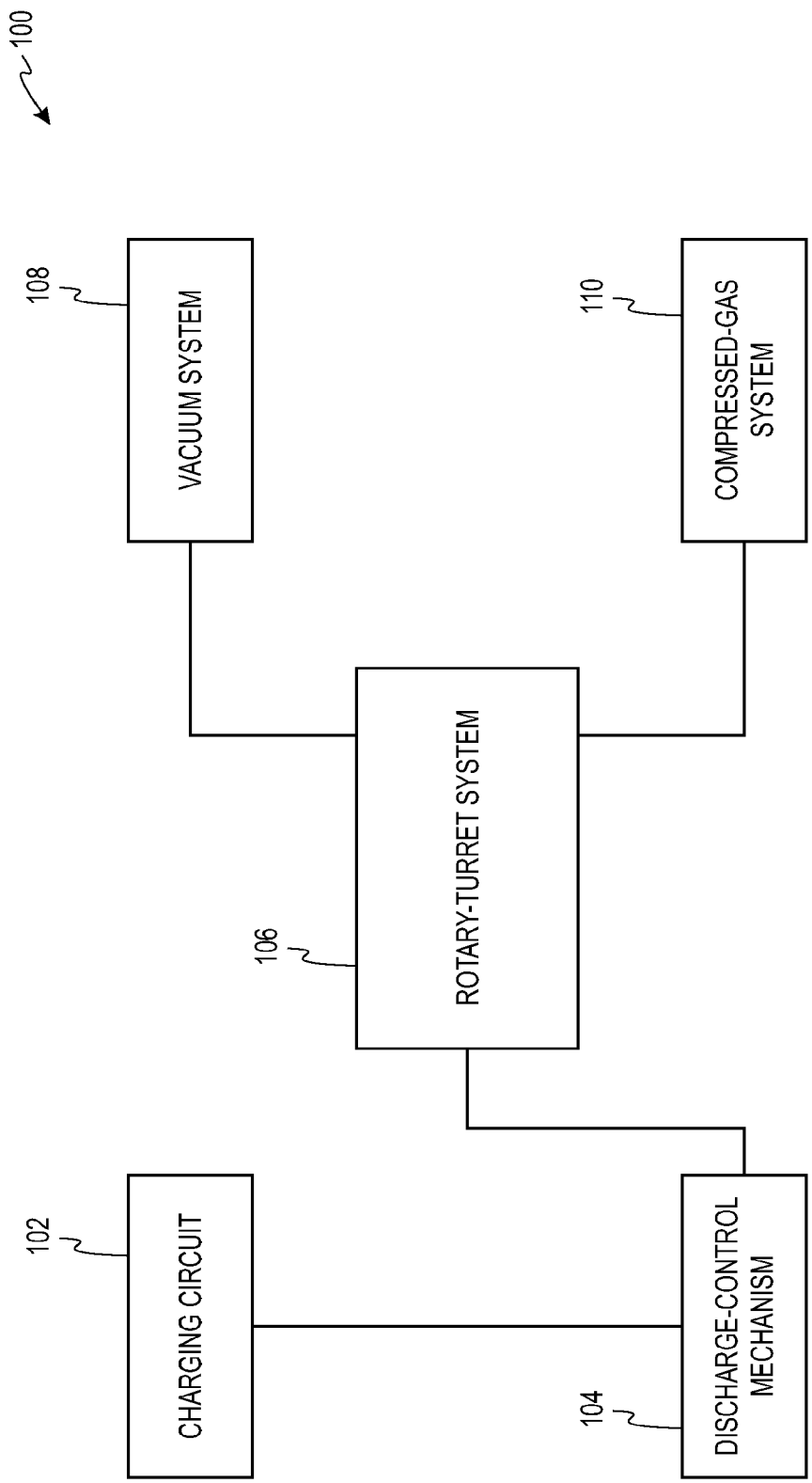
FIG. 1 illustrates a schematic diagram of a system for electromagnetic forming of articles, according to aspects of the present disclosure.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

According to aspects of the present disclosure, an electromagnetic-forming system is configured to perform one or more forming operations such as trimming, flanging, threading, embossing, shaping, expanding, and necking on an article. These forming operations are accomplished using a multi-segment mold, air pressure and/or vacuum, and one or more electromagnetic pulses delivered using an electromagnetic coil.

Beneficially, electromagnetic-forming systems and methods in accord with the present disclosure significantly reduce the number of stages required to produce finished articles such as thin-walled, metal containers. These systems and methods can perform a forming operation such as necking in a single stage, rather than the multiple stages required by typical cold-form systems. Moreover, these systems and methods can also perform one or more operations such as expanding and embossing in a single stage. As such, the systems and methods require significantly fewer stages to achieve a fully formed container, thus reducing the number of machines needed in a machine line. The reduction of machines in the machine line also reduces certain costs associated with manufacture such as reducing space needed to house the machine line and reduced maintenance costs. Further, as discussed above, fewer cold-forming stages reduces the brittleness associated with work-hardening caused by many cold-forming stages. Beneficially, this reduced brittleness allows for more complex geometries, such as highly expanded and complex shaped and embossed articles that may not be possible using many cold forming stages that may result in cracking of the more brittle work-hardened metal. Further, much higher expansions are possible with high-speed electromagnetic forming compared to multi-stage cold forming systems. Yet another benefit of aspects of the present disclosure is to produce formed containers 218 having a wall thickness that is thinner than containers formed using cold-forming, resulting in lower metal cost per formed container 218.

Additionally, electromagnetic-forming systems and methods in accord with the present disclosure provide for high-speed, continuous processing of articles, while producing consistently formed containers from thin-walled pre-form articles.

Aspects of the present disclosure also provide for low-profile electromagnetic coils that can extend into narrow clearances of pre-form articles to provide direct and efficient electromagnetic forming of the lower sidewall of pre-form articles. In some aspects, these low-profile coils include milled or machined windings.

Aspects of the present disclosure also provide for fine-detail patterning on formed containers through, for example, use of a multi-segment mold.

Aspects of the present disclosure provide for trimming pre-form articles using electromagnetic forming. According to some aspects, the pre-form article is trimmed using, for example, a sharp edge in the mold and using electromagnetic force to contact the pre-form article with the sharp edge.

Aspects of the present disclosure provide for threading pre-form articles using electromagnetic forming. The articles formed may be cans, any suitable food or beverage containers, jars, bottles, or any other suitable articles of manufacture. The articles may be formed of materials capable of responding to an electromagnetic field such as a metal, metal alloy, any other suitable material, combinations thereof, and the like. It is contemplated that aspects of the present disclosure may also be applicable to articles that do not generally respond to an electromagnetic field such as polymers. Each of the articles has an open end opposite a closed end and at least one sidewall bridging the open end and the closed end.

Referring now to FIG. 1, a schematic illustration of an electromagnetic-forming system 100 is shown. The electromagnetic-forming system 100 includes a charging circuit 102, a discharge-control mechanism 104, a rotary-turret system 106, a vacuum system 108, and a compressed-gas system 110. The charging circuit 102 delivers energy to the rotary-turret system 106 in a series of high-energy impulses. The charging circuit 102 can be, for example, a bank of capacitors configured to collect energy from an electrical grid. The discharge-control mechanism 104 selectively discharges the energy from the charging circuit 102 and delivers the energy to the rotary-turret system 106. The rotary-turret system 106 is configured to receive pre-form articles 216, perform at least one forming operation thereon using electromagnetic energy supplied by the charging circuit 102, and pass the formed container 218 downstream for further processing or packaging. The vacuum system 108 is coupled to the rotary-turret system 106 to selectively evacuate volumes within the rotary-turret system 106. The compressed-gas system 110 is coupled to the rotary-turret system 106 to selectively pressurize volumes within the rotary-turret system 106.

Figure 2A:
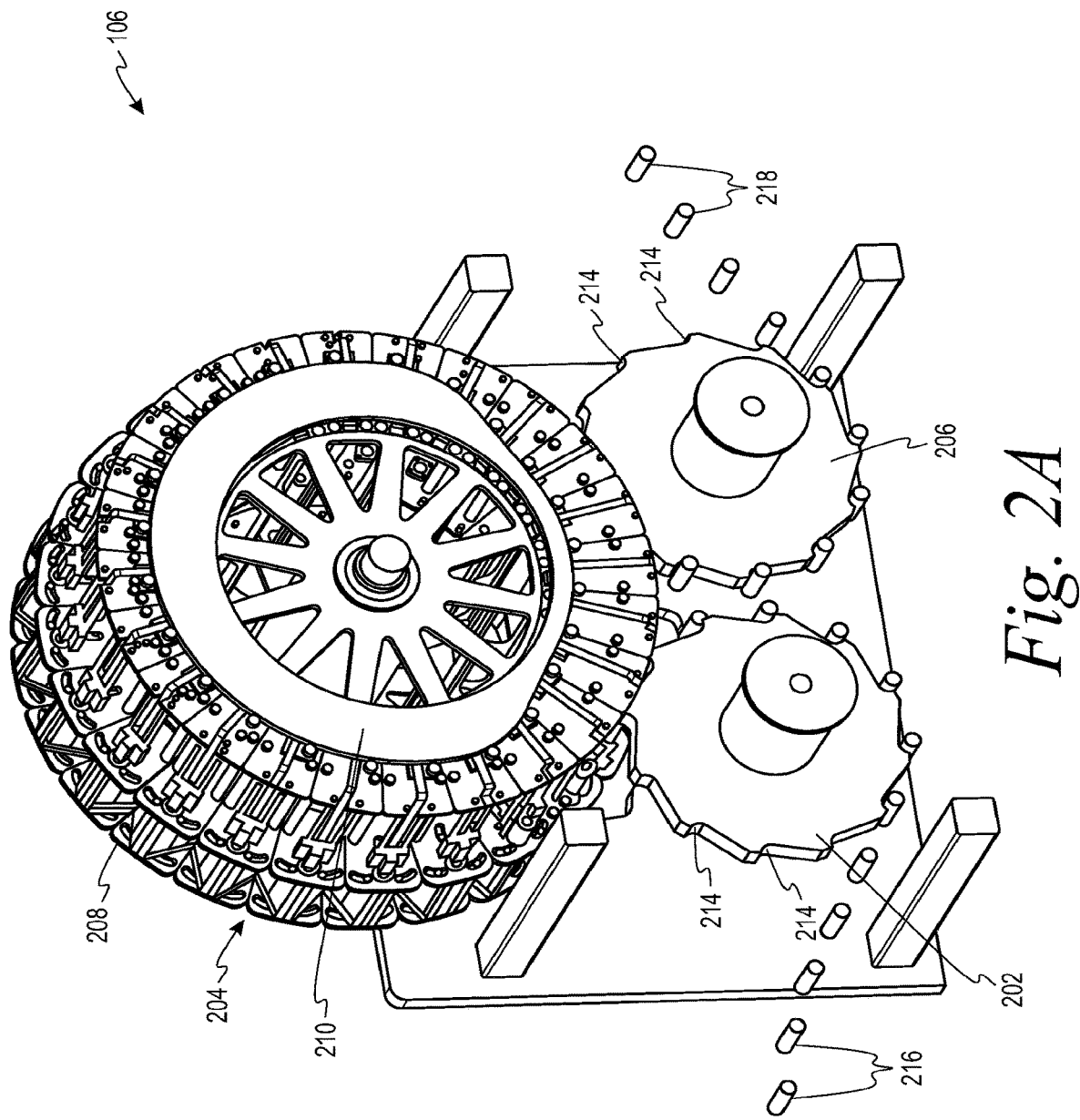
FIG. 2A illustrates a perspective view of a rotary-turret system for electromagnetic forming of articles from a first side, according to aspects of the present disclosure.
Figure 2B:
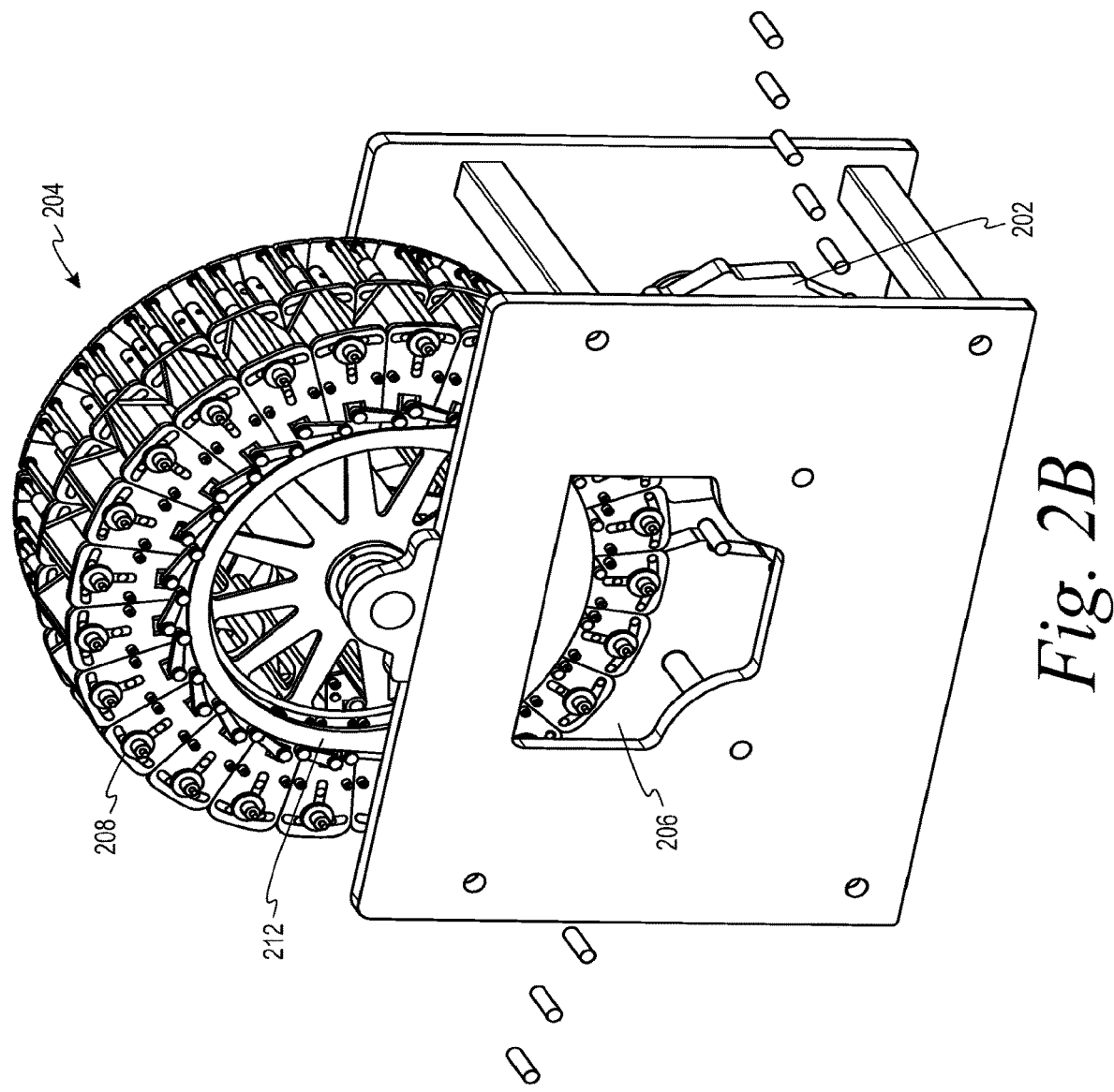
FIG. 2B illustrates a perspective view of the rotary-turret system of FIG. 2A from a second side, opposite the first side.
Figure 3A:
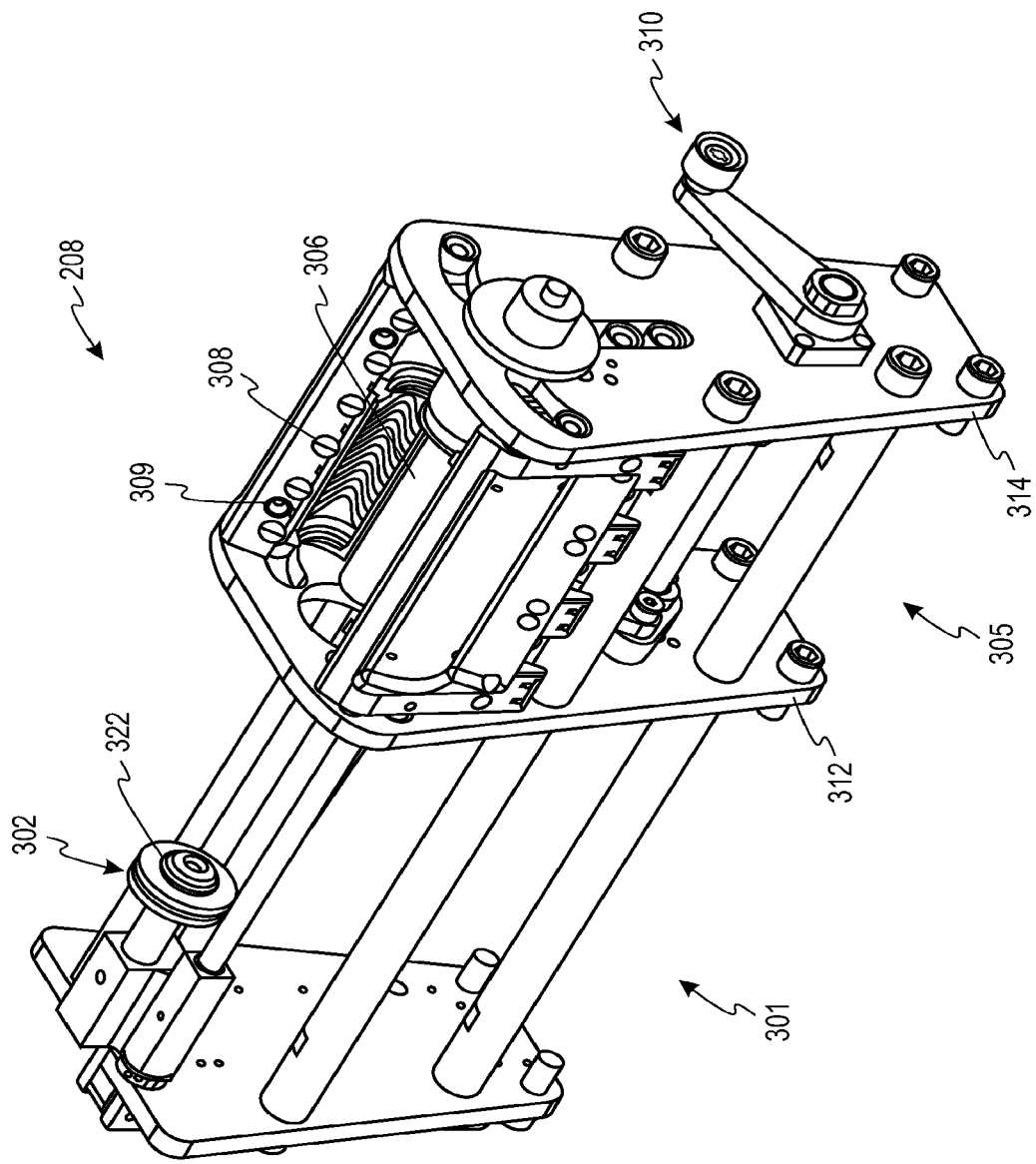
FIG. 3A illustrates a perspective view of an example forming module for use in the rotary-turret system of FIGS. 2A-B, according to aspects of the present disclosure.
Figure 3B:
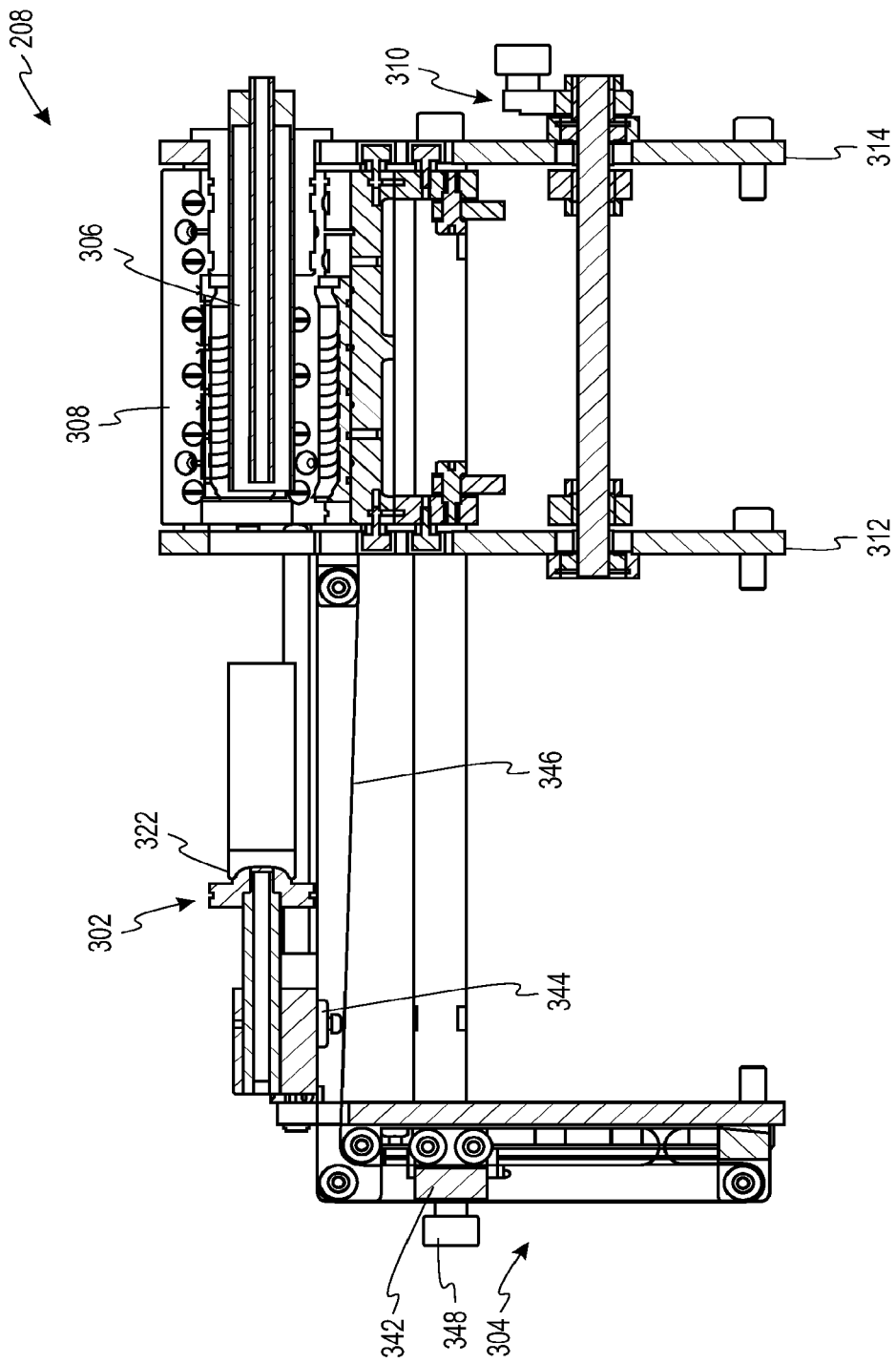
FIG. 3B illustrates a cross-sectional view of the forming module of FIG. 3A when disposed in a first position.
Figure 3C:
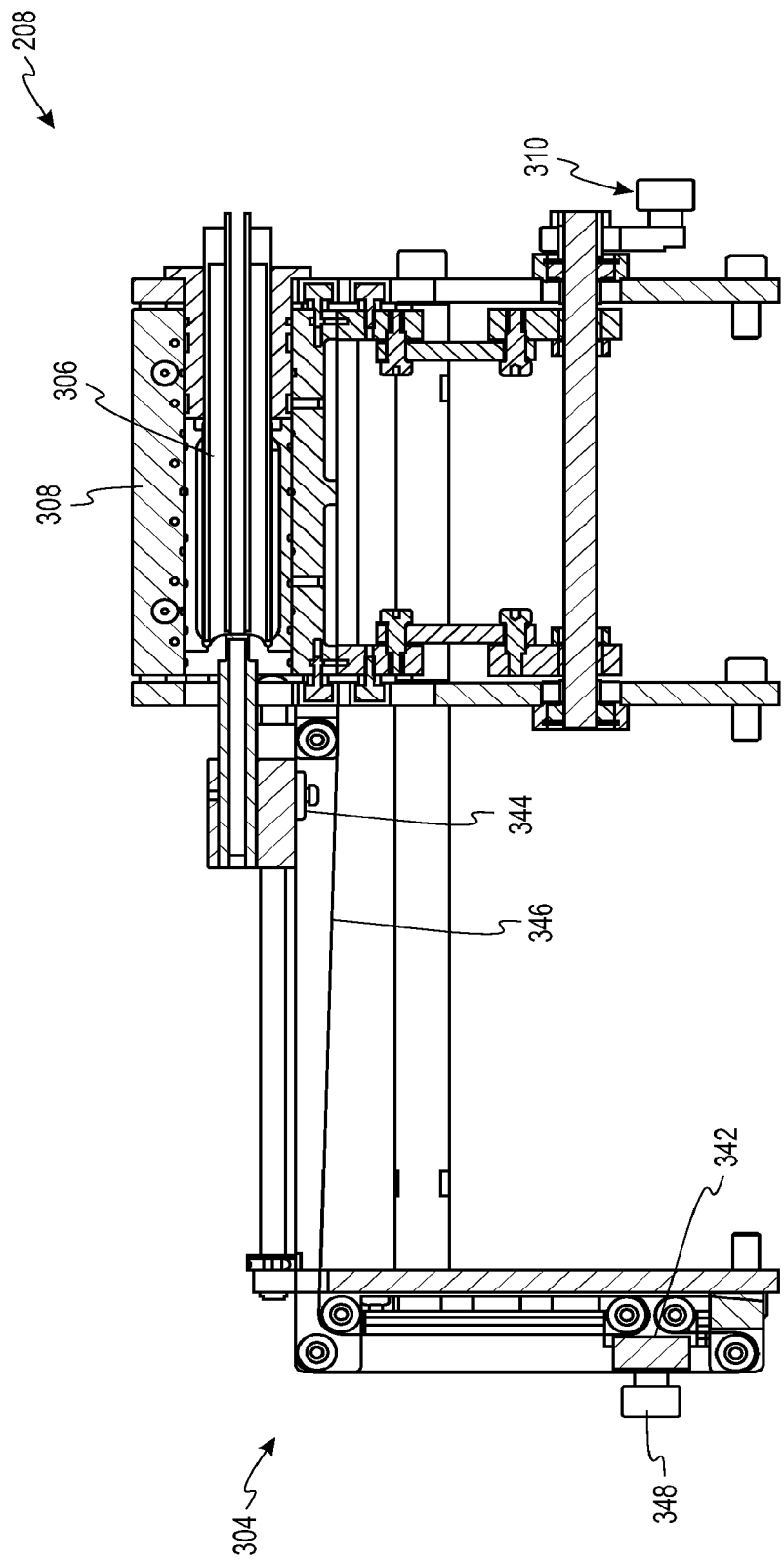
FIG. 3C illustrates a cross-sectional view of the forming module of FIG. 3A when disposed in a second position.
Figure 3D:
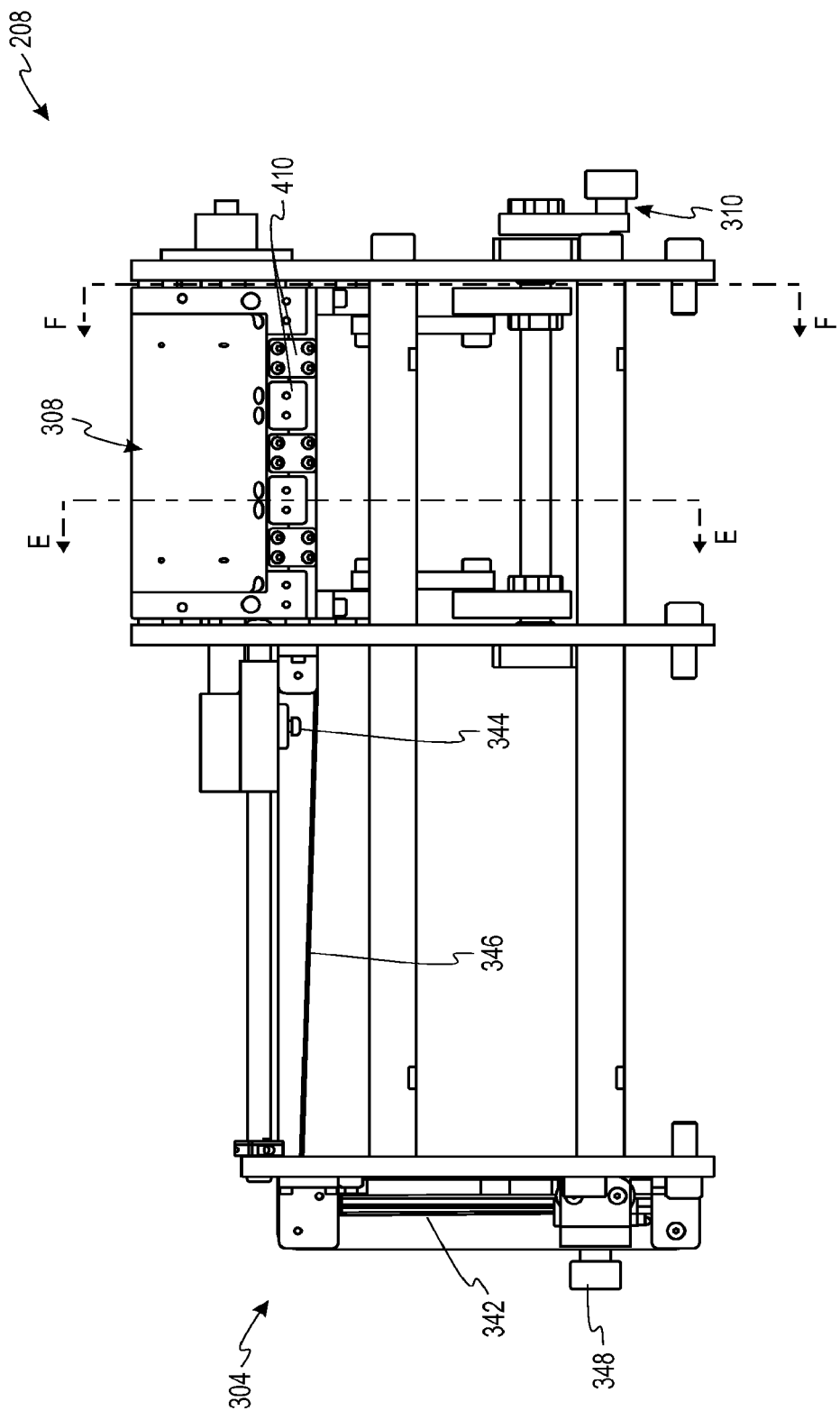
FIG. 3D illustrates a side view of the forming module of FIG. 3C.

Referring now to FIGS. 2A and 2B, an example rotary-turret system 106 for use in the electromagnetic-forming system 100 is shown. The illustrated rotary-turret system 106 provides for high-speed, high-throughput, and continuous processing of articles using electromagnetic forming. The rotary-turret system 106 includes an infeed starwheel 202, a forming turret 204, an outfeed starwheel 206, a loading cam 210, and a mold cam 212. The infeed starwheel 202, forming turret 204, and outfeed starwheel 206 are cooperatively arranged to form a process line. Each of the infeed starwheel 202 and the outfeed starwheel 206 includes a plurality of starwheel pockets 214 configured to receive articles at a predetermined stage of manufacture. The starwheel pockets 214 are disposed generally regularly about the periphery of the infeed starwheel 202 and outfeed starwheel 206. The forming turret 204 includes a plurality of forming modules 208 configured to perform at least one forming operation on the articles. The forming modules 208 are disposed generally regularly about the periphery of the forming turret 204.

The infeed starwheel 202 receives pre-form articles 216 from upstream starwheels or track-work using starwheel pockets 214, and then feeds each pre-form article 216 into a respective forming module 208 on the forming turret 204. In some embodiments, the infeed starwheel 202 has dynamically variable speed, pitch spacing, combinations thereof, and the like. Beneficially, such a dynamically-variable infeed starwheel 202 allows for receiving an article at one speed and depositing the article at another speed in systems that require a large speed or pitch change during processing, as will be described in further detail in relation to FIG. 11 below.

The forming turret 204 counter-rotates relative to the infeed starwheel 202 and uses electromagnetic energy to perform at least one forming operation on the pre-form article 216 while continually rotating. The forming turret 204 includes the plurality of forming modules 208 disposed about its periphery. Each forming module 208 receives a pre-form article 216 from the infeed starwheel 202 and performs at least one forming operation on the article while the forming turret 204 continually rotates. The at least one forming operation can be completed in a variety of angular distances that are less than one revolution of the forming turret 204, such as about 180°, about 270°, or the like. It is contemplated that the angular distances may be more than one revolution of the forming turret 204, such as about 540°, about 630°, or the like.

The outfeed starwheel 206 counter-rotates relative to the forming turret 204 and receives formed containers 218 from the forming modules 208 using starwheel pockets 214. The outfeed starwheel 206 then passes the formed containers 218 downstream for further processing or packaging. As discussed above with respect to the infeed starwheel 202, the outfeed starwheel 206, in some embodiments, may have dynamically variable speed, pitch spacing, combinations thereof, and the like.

The loading cam 210 is disposed on a first side of the forming turret 204 and selectively actuates loading and unloading of the articles onto an electromagnetic coil 306 (FIGS. 3A-D). The mold cam 212 is disposed on a second side of the forming turret 204 that is opposite the first side and selectively actuates opening and closing of a multi-segment mold 308 (FIGS. 4A-F). The loading cam 210 and the mold cam 212 are generally fixed during operation of forming turret 204 such that the forming turret 204 rotates relative to the loading cam 210 and the mold cam 212. It is contemplated that the loading cam 210 and the mold cam 212 may be disposed on a single side of the forming turret and may even be surfaces disposed on a single member.

Referring now to FIG. 2C, a pre-form article 216 is shown. The pre-form article 216 includes a domed bottom 262 with a sidewall 264 extending therefrom. The pre-form article 216 is generally produced from a drawn-wall ironing process or an impact-extrusion process. The pre-form article 216 includes a generally uniform initial diameter D1 throughout the length of the pre-form article 216. The sidewall thickness may vary along the length of the article to optimize material usage relative to the structural performance effects of the final geometry.

Referring now to FIG. 2D, an example formed container 218 is shown. The formed container 218 may be produced by, for example, shaping, necking, and flanging the pre-form article 216. The formed container 218 includes the domed bottom 262 and a sidewall 284. The formed container 218 includes a plurality of diameters including an opening diameter D2, an upper diameter D3, a midsection diameter D4, and a lower diameter D5. In the illustrated example, the formed container 218 includes an hourglass shape where the upper diameter D3 and lower diameter D5 are generally larger than the midsection diameter D4. In some aspects, the opening diameter D2 is generally the same as the initial diameter D1. More complex shapes may also be produced. A container may have any number of alternating small and large diameters. None circular cross sections and asymmetric shapes are also possible.

Referring now to FIG. 2E, an exemplary formed container 218' having an embossed pattern is shown. The formed container 218' may be produced by, for example, expanding, necking, flanging, and embossing the pre-form article 216 of FIG. 2C. The formed container 218' includes the domed bottom 262 and a sidewall 294. The formed container 218' includes a plurality of diameters including an opening diameter D6, a sidewall diameter D7, and a bottom diameter D8. In the illustrated example, the uniformly expanded sidewall 294 has a sidewall diameter D7 that is larger than the opening diameter D6 or the bottom diameter D8. The sidewall 294 also includes embossing 296 or raised ridges. The embossing 296 is a positive pattern formed by, for example, contact between a pattern 309 (see, e.g., FIG. 3A) disposed on the inner surface 412 of a multi-segment mold 308 (see FIGS. 4A-4F) and the sidewall 294.

Referring now to FIGS. 3A-D, an example forming module 208 having a loading portion 301 and a forming portion 305 is shown. The loading portion 301 includes a loading mechanism 302 and a loading-mechanism actuator 304. The loading mechanism 302 is configured to releasably receive a pre-form article 216 and, when actuated, move the article between a first position that is distal the forming portion 305 and a second position that is proximal the forming portion 305.

The forming portion 305 includes the electromagnetic coil 306, the multi-segment mold 308, a mold actuator 310, an inner plate 312 and an outer plate 314. The multi-segment mold 308 extends between and is supported by the inner plate 312 and the outer plate 314. The multi-segment mold 308 is disposed generally about the electromagnetic coil 306 and may include a pattern 309 on the interior of the multi-segment mold 308 to be imprinted on the formed container 218.

During operation, the loading mechanism 302 receives a pre-form article 216 while disposed in the first position. The loading-mechanism actuator 304 then urges the loading mechanism 302 away from the second position to load the pre-form article 216 onto the electromagnetic coil 306. The mold actuator 310 urges the multi-segment mold 308 to close around the electromagnetic coil 306 and the pre-form article 216. After the multi-segment mold 308 is closed, a forming operation is performed on the pre-form article 216 to produce a formed container 218. After the forming operation is complete, the mold actuator 310 urges the multi-segment mold 308 open and the loading-mechanism actuator 304 urges the loading mechanism 302 from the second position to the first position, removing the formed container 218 from the electromagnetic coil 306. After the loading mechanism 302 reaches the first position, the formed container 218 is removed from the loading mechanism 302 by, for example, the outfeed starwheel 206.

The loading mechanism 302 can be any mechanism capable of releasably receiving a pre-form article 216 from the infeed starwheel 202. The loading mechanism 302 includes an article-engaging surface 322 with an opening coupled to the vacuum system 108 (not shown). The article-engaging surface 322 forms a seal with a domed bottom portion of the pre-form article 216 such that a selectively-applied vacuum secures the pre-form article 216 to the loading mechanism 302. In some embodiments, mechanical features directly engage the pre-form article 216 to releasably secure the article to the loading mechanism 302. For example, in some embodiments, a "gripper" is used, to apply a pinching force to the pre-form article 216. The mechanical features can be actuated by, for example, a cam element or other non-rotational feature.

The loading-mechanism actuator 304 includes an actuator carriage 342 and a loading-mechanism carriage 344. The actuator carriage 342 is coupled to the loading-mechanism carriage 344 using a drive belt 346 such that movement of the actuator carriage 342 moves the loading-mechanism carriage 344 and vice versa.

The actuator carriage 342 includes a loading cam follower 348 that contacts the cam surface of the loading cam 210 during rotation of the forming turret 204. Contact between the loading cam 210 and the loading cam follower 348 urges the actuator carriage 342 downward, which in turn urges the loading-mechanism carriage 344 toward the electromagnetic coil 306 and the multi-segment mold 308. The loading-mechanism carriage 344 is spring loaded to urge the loading mechanism 302 toward the first position when the loading cam 210 disengages the loading cam follower 348. In some aspects, the loading cam 210 is a grooved cam or slotted cam. The grooved cam includes two cam surfaces spaced a distance apart. The first cam surface is configured to urge the actuator carriage 342 upward downward, which in turn urges the loading-mechanism carriage 344 toward the electromagnetic coil 306. The second cam surface is configured to urge the actuator carriage 342 downward, which in turn urges the loading-mechanism carriage 344 away from the electromagnetic coil.

Referring now to FIGS. 4A-F, a multi-segment mold 308 is shown in two states of operation. FIGS. 4A-C depict the multi-segment mold 308 in a first state where the mold is open. FIGS. 4D-F depict the multi-segment mold 308 in a second state where the mold is closed. The multi-segment mold 308 uses a mold or forming die having multiple segments to provide easy removal of formed containers 218 without damage to the surface of the formed containers 218. The number of segments required can be varied depending on, for example, the level of detail needed for embossing patterns, material to be molded, geometries for the formed container 218, etc. Two-segment molds may be used, for example, on metal containers having smooth sidewalls and no threading features. However, metal containers having an embossed pattern, threaded features, or certain other geometries may be scratched, deformed, or otherwise damaged during the opening and closing action of the mold due to the tangential, sheering movement in the direction of opening along the parting lines of the mold. Beneficially, three or more mold segments may be used to eliminate the tangential movement along the parting lines, allowing for fine-detail embossing patterns or other features on metal containers without significantly damaging the formed container 218 during separation of the mold.

In the illustrated embodiment, the multi-segment mold 308 includes three segments 402a-c. Each segment includes at least one slot follower 404a-c and a mold insert 406a-c. The slot followers 404a-c are disposed at each end of the mold segments 402a-c and fit within respective slots 408a-c formed on the inner plate 312 and the outer plate 314. The slots 408a-c guide movement of the multi-segment mold 308 during opening and closing of the multi-segment mold 308. In some aspects, link arms are used in place of the slots 408a-c and slot followers 404a-c to guide motion of the multi-segment mold 308 during opening and closing. Each of the link arms include a first end pivotably and/or slidably attached to a respective inner plate 312 or outer plate, and a second end pivotably and/or slidably attached to a respective one of the segments 402a-c.

Figure 12A:
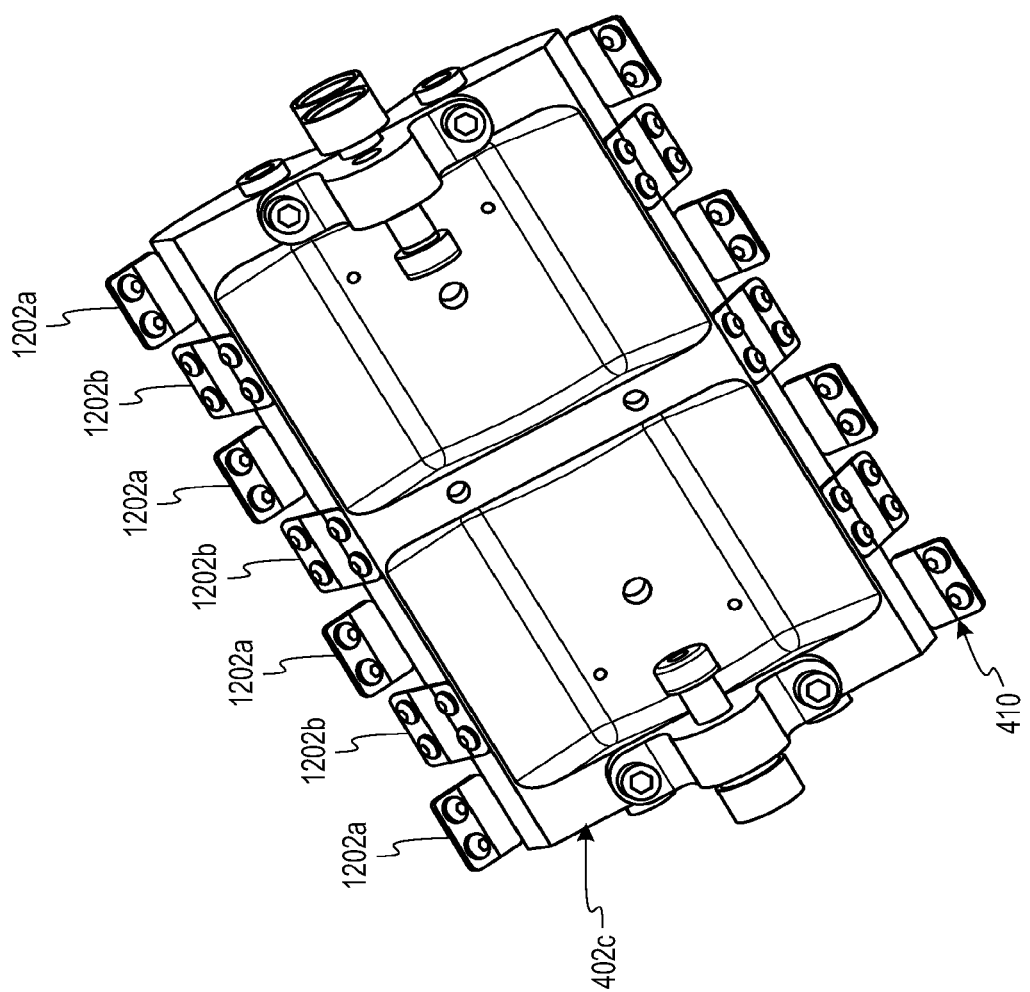
FIG. 12A illustrates a perspective view of a bottom mold segment of a mold having flexural hinges.
Figure 12B:
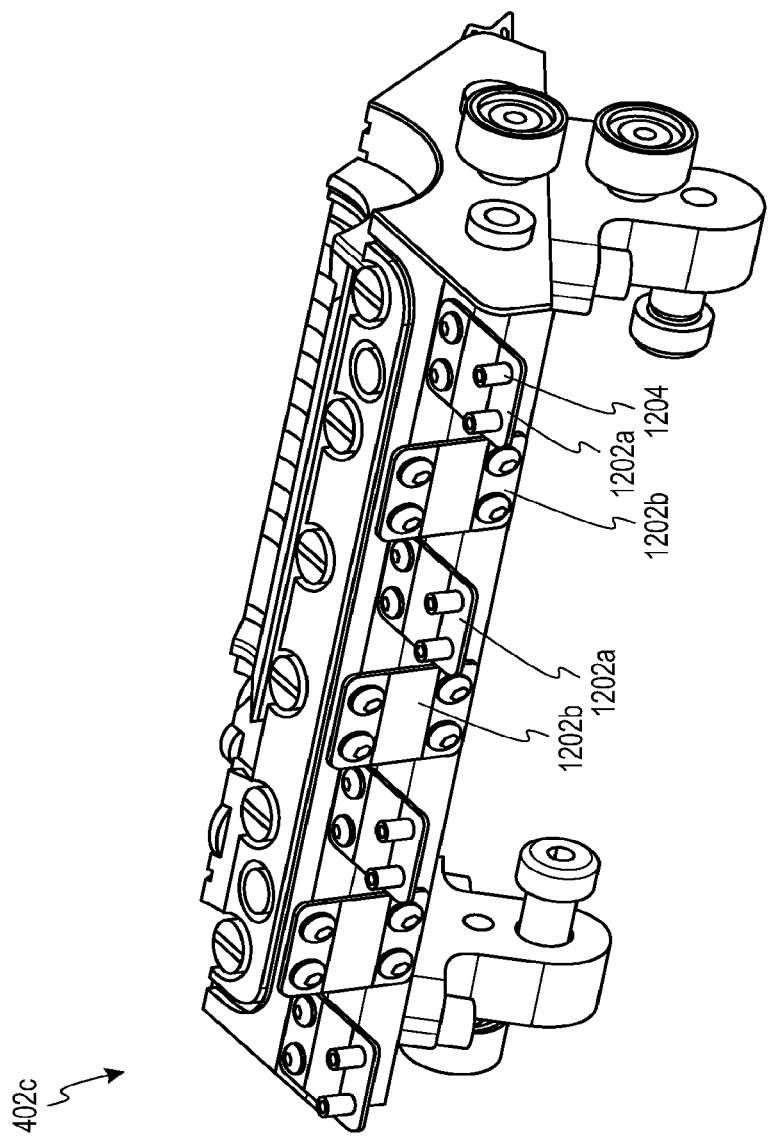
FIG. 12B illustrates the bottom mold segment of FIG. 12A from a second perspective view.
Figure 12C:
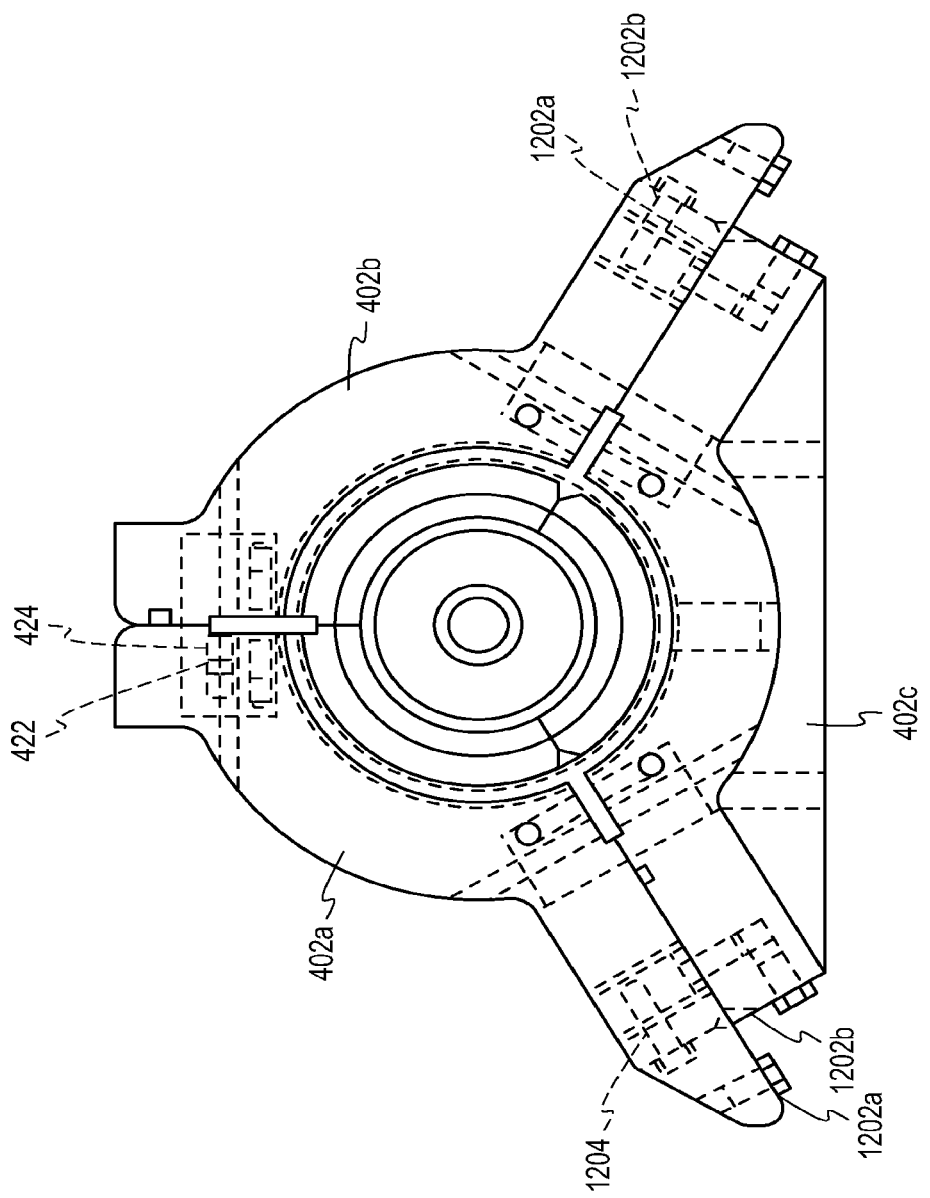
FIG. 12C illustrates an end view of a multi-segment mold including the bottom mold segment of FIG. 12A coupled to other segments using flexural hinges.

In some embodiments, the segments 402a-c of the multi-segment mold 308 are coupled using hinges 410. The hinges 410 connect the segments 402a-c such that movement of any of segments 402a-c produces movement of the remaining segments 402a-c. In the illustrated embodiment, downward movement of the bottom mold segment 402c causes generally outward movement of the left and right mold segments 402a,b due to contact of slot followers 404a,b with their respective slots 408a,b. Similarly, upward movement of the bottom mold segment 402c causes generally inward movement of the left and right mold segment 402a,b. In some aspects, the hinges 410 include a flexural hinge mechanism 1202a,b (FIGS. 12A-12C).

Other slot geometries may be used to achieve desired kinematics. For example, the opening positions, velocities, accelerations, or force relationships of segments of the multi-segment mold 308 relative to the downward movement of the lower mold segment 402c may be altered using different slot geometries. In some aspects, the slots 408a-c may be replaced by guide arms having one end pivotably attached to the inner plate 312 or the outer plate 314 at the desired center of rotation for the respective mold segment 402a,b to produce the same or similar motion produced by the slots 408a,b. For example, the guide arms being attached at the center of an arc formed by the respective slot 408a,b produces the same movement as the illustrated slot 408a,b and slot follower 404a,b arrangement.

The mold inserts 406a-c, when the mold is closed, form the perimeter of the formed container 218 and have a respective portion of the pattern 309 (FIG. 3A) on the inner surface 412 of the mold insert 406a-c. The mold inserts 406a-c can be formed from any suitable material including metals, metal alloys, polymers, ceramics, combinations thereof, or the like. In some aspects, the mold inserts 406a-c are formed from DELRIN®, nylon, polycarbonate, glass-filled nylon, glass-filled DELRIN®. In the illustrated embodiment, each mold insert 406a-c covers about 120° or about one-third of the circumference of the formed container 218. It is contemplated that the angles covered by each mold insert 406a-c may be non-uniform such as a first mold insert 406a covering about 90°, a second mold insert 406b covering about 90°, and a third mold insert 406c covering about 180°.

Figure 5:
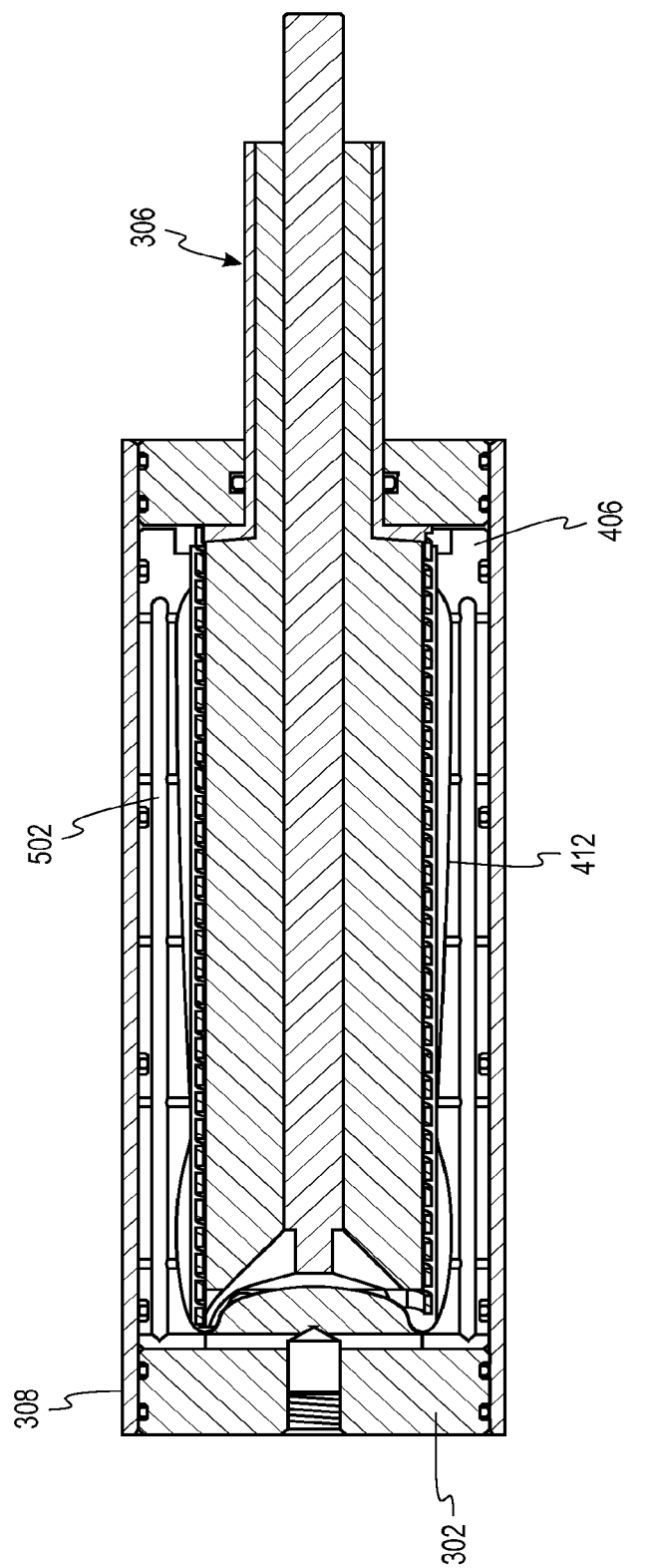
FIG. 5 illustrates a cross-sectional view of an electromagnetic coil and multi-segment mold, according to aspects of the present disclosure.

As shown in FIG. 5, the mold inserts 406a-c include one or more tubular cavities 502 therethrough, with openings on the inner surface 412 of the mold insert 406. This allows a vacuum to be applied to the outer surface of the pre-form article 216. Beneficially, applying a vacuum to the outer surface of the pre-form article 216 allows less electrical energy to be used to produce the formed container 218 and helps inhibit surface aberrations on the formed container 218 that may be caused by trapped air between the sidewall of the formed container 218 and the inner surface 412 of the mold. Additionally, application of the vacuum also assists in securing closure of the multi-segment mold 308 to ensure there is no unwanted spacing in the pattern 309 along the parting lines separating adjacent mold inserts 406*a-c*. Beneficially, the vacuum can be applied using the loading mechanism 302, or the multi-segment mold 308 may be coupled to the vacuum system 108.

Figure 6:
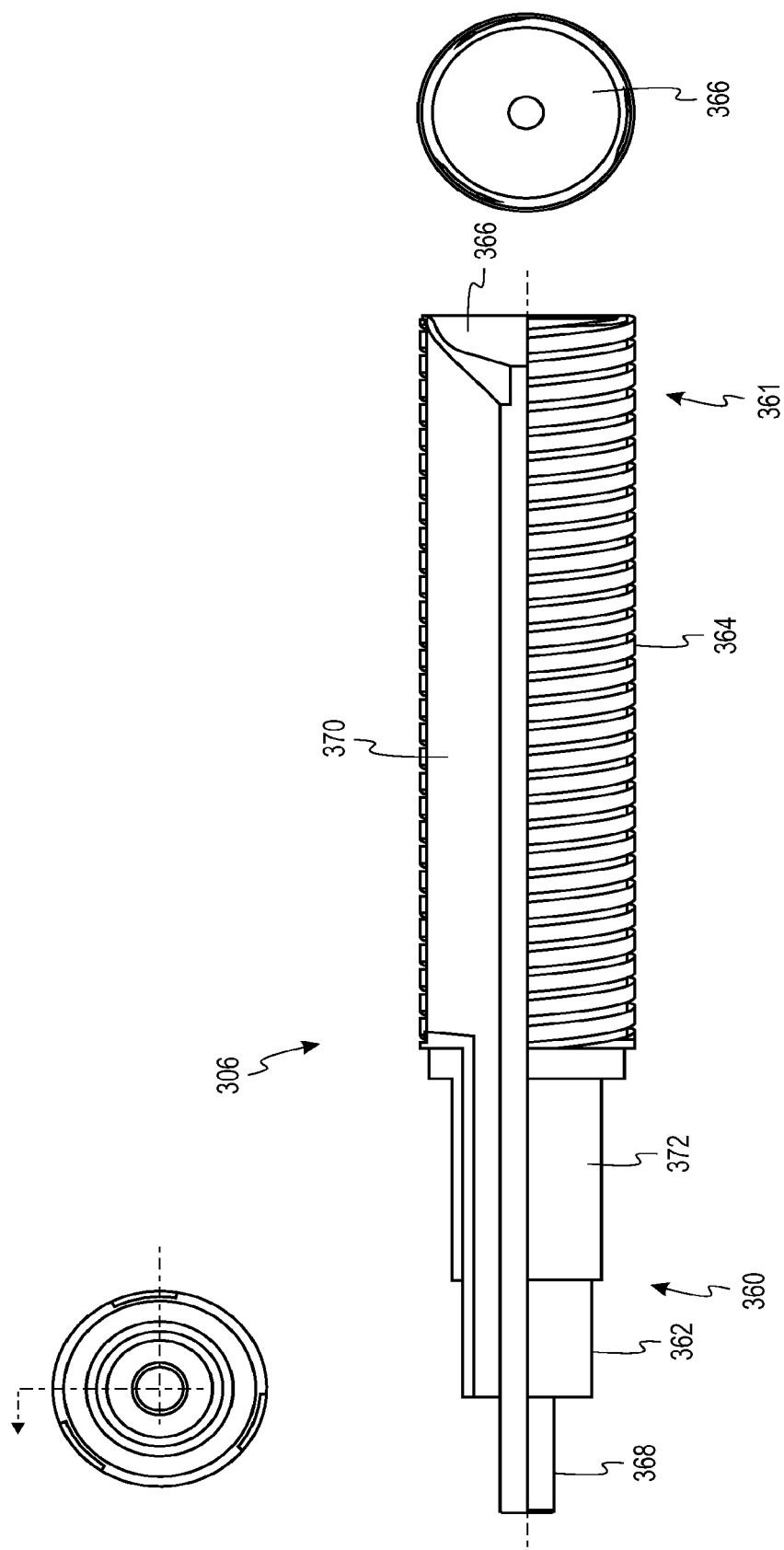
FIG. 6 illustrates a partial-cross-sectional view of an electromagnetic coil, according to aspects of the present disclosure.

Referring now to FIG. 6, the electromagnetic coil 306 includes a top cap 362, helical windings 364, a bottom cap 366, a return conductor 368, a core 370, and an insulating sleeve 372. The top cap 362, helical windings 364, bottom cap 366, and return conductor 368 are each formed from one or more conductive materials and form an electrical path through the electromagnetic coil 306. The top cap 362 is electrically coupled to a first end 360 of the helical windings 364. The return conductor 368 is electrically coupled to a second end 361 of the helical windings 364 using the bottom cap 366. The electromagnetic coil 306 is sized to fit within an un-necked pre-form article 216 such that the helical windings 364 are disposed proximate to, but not in electrical contact with, the walls of the pre-form article 216.

The core 370 generally increases structural integrity of the electromagnetic coil 306 and can also be used to enhance electromagnetic properties of the electromagnetic coil 306. The core 370 can be formed from any suitable material, such as one or more glass, ceramic, polymer including resin, epoxy, elastomer, etc., combinations thereof, and the like. Considerations for selection the core 370 material can include, for example, structural properties such as rigidity, adhesive properties, electrical properties such as dielectric constant and insulating qualities, thermal conductivity, dimensional stability, shrinkage, etc. In some aspects, the core 370 is a poured polyurethane epoxy resin such as Freeman 1090 Casting Resin, available from Freeman Manufacturing And Supply Co. (Avon, Ohio). It is contemplated that the core 370 may be rapid prototyped or 3-D printed, or machined. In some embodiments, the core 370 includes one or more passages that deliver pressurized air to the interior of the pre-form article 216. The core may also include cooling passages providing, for example, air or liquid cooling. For example, heat pipes 1404 may be included within the core 370 to carry heat away from the electromagnetic coil 306 and deliver the heat to cooling fins 1406 for dissipation (e.g., FIG. 14).

The insulating sleeve 372 is coupled to the electromagnetic coil 306 and is configured to inhibit flow of electrical energy form the electromagnetic coil 306 to the multi-segment mold 308. In some aspects, the insulating sleeve 372 is used alone or in conjunction with corresponding components to form an air-tight seal between the first end 360 of the electromagnetic coil 306 and the multi-segmented mold 308.

Figure 7A:
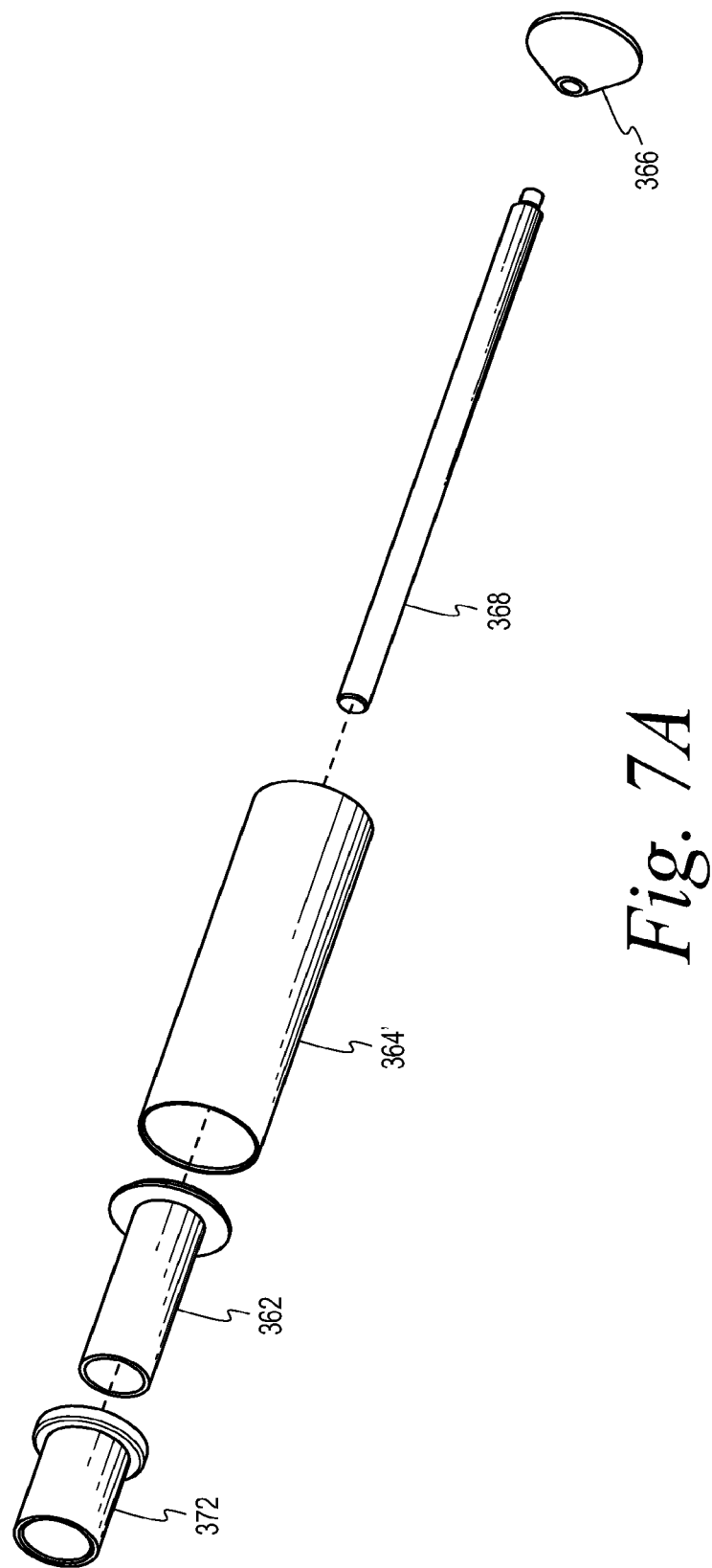
FIG. 7A illustrates an exploded view of components of the electromagnetic coil of FIG. 6, according to aspects of the present disclosure.

FIGS. 7A-D illustrate a method of manufacturing the electromagnetic coil 306, according to some aspects of the present disclosure. FIG. 7A shows an exploded view of the top cap 362, a winding tube 364', the bottom cap 366, the return conductor 368, and the insulating sleeve 372. The conductive components, e.g., the top cap 362, winding tube 364', bottom cap 366, and return conductor 368, may be assembled and attached using any suitable fastening method such as welding, brazing, soldering, threaded connection, clipping, etc. The top cap may be smaller, larger or similar diameter to the tube.

Figure 7B:
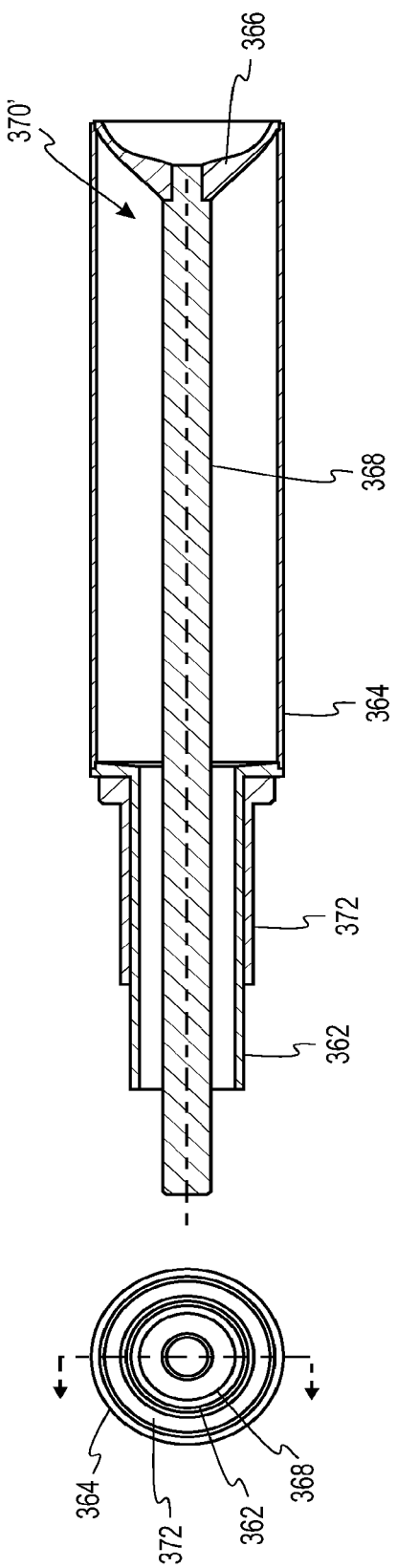
FIG. 7B illustrates a cross-sectional view of the assembled components of FIG. 7A.

As shown in FIG. 7B, the top cap 362, winding tube 364', bottom cap 366, and return conductor 368 form a cavity 370' when assembled. This cavity 370' is then filled with a suitable material such as an epoxy or other non-conductive support filler for strength. The pourable material then solidifies, forming the core 370. It is contemplated that the core 370 may be formed by other methods, such as rapid prototyping or machining, and inserted into the electromagnetic coil 306 prior to the components being fixed together.

The winding tube 364' is then milled or machined to form the helical windings 364. The milling can be used to produce a single helical coil, or multiple helical coils in parallel. In the illustrated example, the helical windings 364 form a triple-helix pattern where there are three parallel electrical paths between the top cap 362 and the bottom cap 366. Multiple electrical paths can be used to provide different inductance. Beneficially, the same assembly procedures and machining equipment can be used to produce coils having markedly different configurations and electrical properties without the need to change out any components used in the manufacturing process. Additionally, milling can produce parallel helical windings more quickly, cheaply, and efficiently than typical wound-wire coils. Further, milling provides additional cost-savings for each electromagnetic coil 306 because general equipment such as CNC machines may be used as opposed to specialized wire-wrapping machines or wrapping each coil by hand. It is contemplated that other methods may be used to produce helical windings such as wrapping wires or ribbons and electrically coupling the wires or ribbons to the bottom cap 366 and top cap 362. Beneficially, the bottom cap 366 can be machined to be electrically coupled to multiple, parallel helical windings. This provides for a parallel-path electromagnetic coil 306 without the need for complicated winding patterns to return the conductors forming the windings though the center of the electromagnetic coil 306.

Beneficially, milling the helical windings 364 assists in overcoming difficulties associated with fabricating wound-wire coils for existing systems, particularly that wound-wire coils are often cumbersome and difficult, if not impossible, to form in such a way that the electromagnetic coil extends into the lower sidewall of a pre-form article 216. This problem is only amplified when attempting to wind multiple coils in parallel.

Milling the helical windings 364 also provides a convenient method for controlling magnetic domains formed along the length of the electromagnetic coil 306. For example, the milling can quickly and easily form multiple, parallel conductor paths to provide generally uniform force extending radially from the electromagnetic coil 306. Additionally or alternatively, multiple magnetic domains can be formed axially along the helix by varying properties of the helical windings 364 such as helix angles and "pitch" to provide non-uniform spacing. The pitch can be adjusted by varying the space between adjacent windings 364 along the length of the electromagnetic coil 306 and the width of the helical windings 364 along the length of the electromagnetic coil 306.

For example, the pitch can be non-uniform along the length of the helical windings 364 so that a first portion of the helical windings 364 that corresponds to a first portion of the pre-form article 216, such as the top, may have a higher pitch (closer together) than a second portion of the helical windings 364 corresponding to a second portion of the pre-form article 216, such as the midsection. In this example, a single pulse through the helical windings 364 will produce a greater force on the first portion of the pre-form article 216 than the force produced on the second portion of the pre-form article 216. These non-uniform forces can aid in forming a shaped container, such as an hourglass-shaped container.

It is contemplated that other properties of the helical windings 364 such as the height, width, and shape of the cross-sectional profile can be altered to produce multiple magnetic domains. For example, at high frequencies, electrical current travels generally along the outer edges of conductors. In some aspects, the exterior surface geometry is shaped to produce beneficial properties.

Figure 7C:
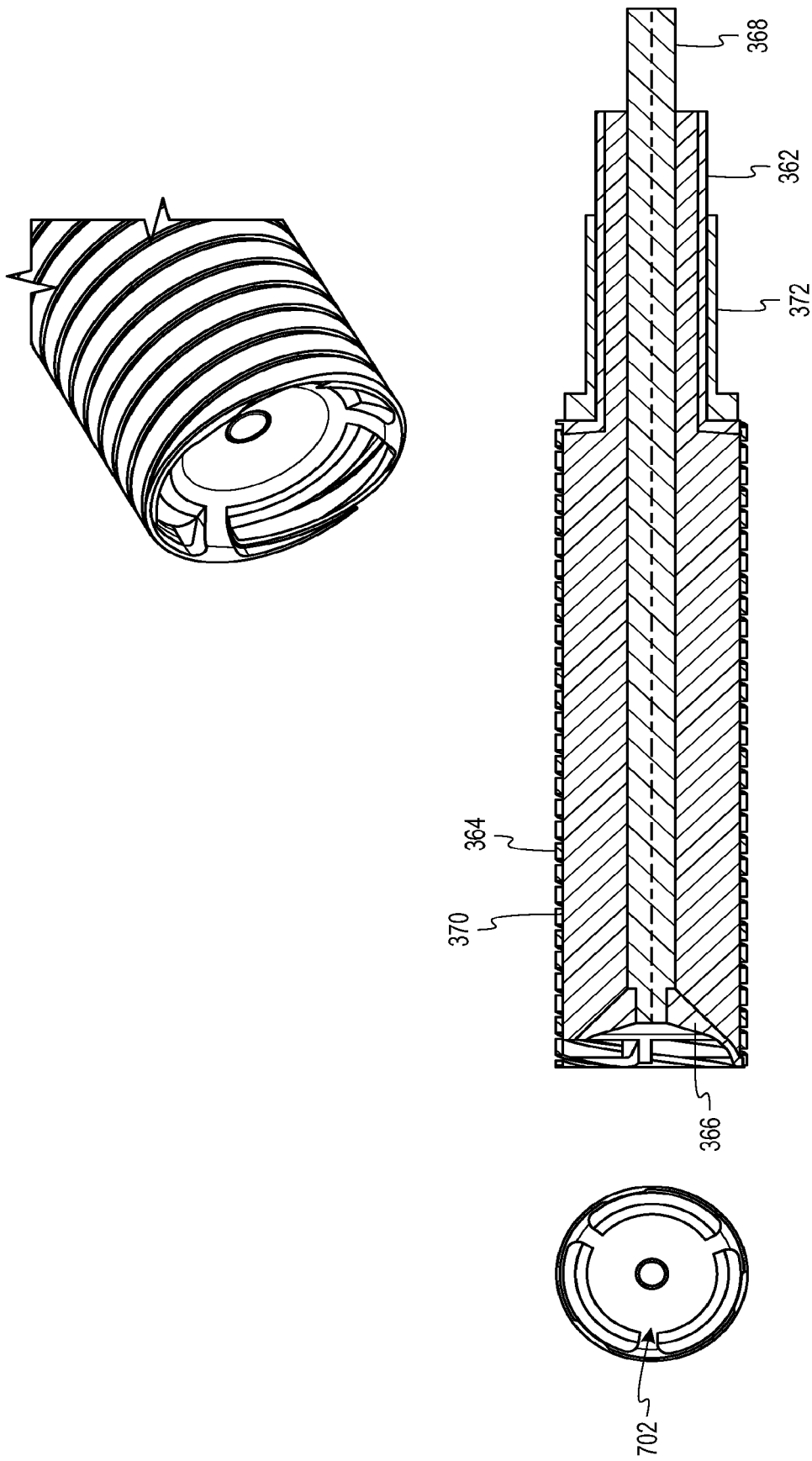
FIG. 7C illustrates a cross-sectional view of the assembled components of FIG. 7A after milling a helical coil.

As shown in FIG. 7C, milling the winding tube 364' may produce helical windings 364 having a generally rectangular cross section. The cross-sectional height of the helical windings 364 generally corresponds with the thickness of the winding tube 364', but can be reduced along some or all of the helical windings 364 during the milling process. The cross-sectional width of the helical windings is selected during the milling process and may be continuous along the length of the helical windings 364 or may be varied.

Beneficially, the rectangular cross-sectional profile of the helical windings 364 and the ability to alter the cross-sectional height of the helical windings 364 provides for a low-profile electromagnetic coil 306 that can fit into narrower clearances and geometries, such as the domed bottom of pre-form articles 216, than typical wound-wire coils. This allows for the efficient application of magnetic flux to portions of the pre-form article 216 near the domed bottom. By removing additional material from the electromagnetic coil 306 disposed near the bottom of the pre-form article 216, the current path can be optimized to be effective at the very lowest parts of the sidewall without interfering with the domed bottom. In some aspects, the helical windings 364 extend to the transition zone of the pre-form article 216 (e.g., 25 mm from the bottom). In some aspects, the helical windings 364 extend into the transition zone (e.g., 20 mm, 15 mm, or even 5 mm from the bottom).

After milling, the empty space between adjacent helical windings 364 can be filled with epoxy or other material. Beneficially, this provides additional rigidity to the helical windings 364 and inhibits movement of the helical windings 364 during application of the electrical pulses—particularly lateral movement. This may also extend the life of the electromagnetic coil 306. Additionally, the outer surface of the helical windings 364 can be coated, wrapped, or sleeved with a material such as an epoxy to provide electrical insulation, strength, or other beneficial properties. It is contemplated that other forming methods can be used to achieve these configurations and beneficial properties.

As shown in FIG. 7D, grooves 374 can be machined into the wall of the helical windings 364 to receive O-rings or other sealing devices to provide a seal between the electromagnetic coil 306 and inner wall of the pre-form article 216. In one example, O-rings are inserted into the grooves 374, and a flexible shrink-sleeve is installed over both the electromagnetic coil 306 and the O-rings. The sleeve conforms to the shape of the electromagnetic coil 306 with the O-rings, and the resulting bulge over the O-rings provides compliant sealing against the pre-form article 216 wall. In some aspects, the sleeve does not cover the O-rings such that the O-rings form a direct seal with the pre-form article 216 wall.

Figure 14:
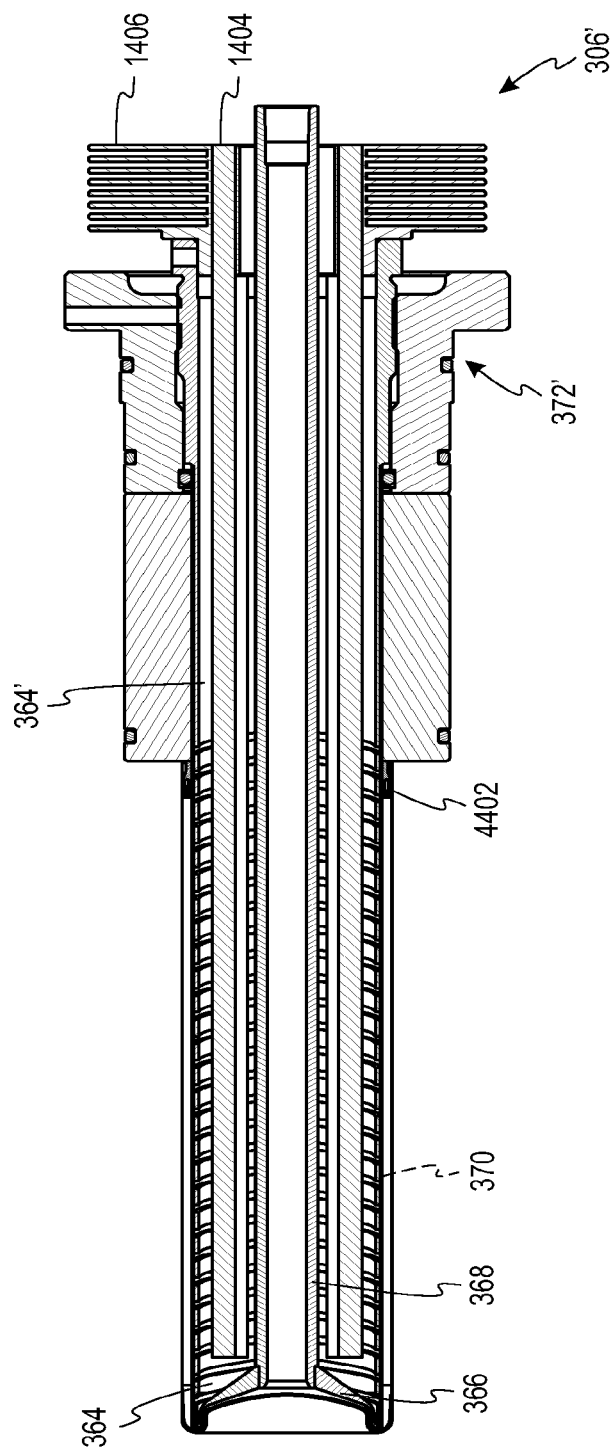
FIG. 14 illustrates a cross-sectional view of an electromagnetic forming coil, according to aspects of the present disclosure.

Referring now to FIG. 14, an embodiment of an electromagnetic coil 306' is shown, excluding inner fill material and electrical insulation. The electromagnetic coil 306' includes a winding tube 364' having helical windings 364 disposed on a portion thereof, a bottom cap 366, a return conductor 368, a core 370, and an insulating sleeve 372'. In the illustrated embodiment, the winding tube 364' can be directly attached to the forming modules and electrically coupled to the power source without use of a top conductor 362, which provides for fewer joints between components, leading to improved electrical properties and lower manufacturing costs. Additionally, sealing member 1402 is disposed between the top of the pre-form article 216 and the insulating sleeve 372' to prevent gas transfer between the pressurized-side and vacuum-side of the pre-form article 216. Beneficially, the seal is disposed about the outer radius of the helical windings 362, which allows for reconfigurability of the system to provide for forming of pre-form articles 216 having different lengths. For example, shorter pre-form articles 216 can be accommodated by replacing the sealing member 1402 with a longer sealing member 1402.

Referring again to FIGS. 2A-2B and FIGS. 3A-3B, in one example of operation of the electromagnetic-forming system 100, a pre-form article 216 is received by a pocket 214 of the infeed starwheel 202 while continually rotating. The infeed starwheel 202 then deposits the pre-form article 216 into the loading portion 301 of a respective forming module 208 on the forming turret 204 and is secured by the loading mechanism 302 while the forming turret 204 continually rotates. The rotation of the forming turret 204 relative to the loading cam 210 causes the loading cam 210 to urge the loading-mechanism actuator 304 towards the axis of rotation of the forming turret 204. This causes the loading mechanism 302 to travel from the first position to the second position to dispose the pre-form article 216 about the electromagnetic coil 306. The rotation of the forming turret 204 relative to the mold cam 212 causes the mold cam 212 to urge the mold actuator 310 towards the axis of rotation of the forming turret 204. This inward movement urges the multi-segment mold 308 to close around the pre-form article 216 when the pre-form article 216 is disposed about the electromagnetic coil 306.

After the multi-segment mold 308 is closed, the volume between the pre-form article 216 and the inner surface of the multi-segment mold 308 is evacuated to create a vacuum. The vacuum provides for fewer sidewall aberrations because there is less opportunity for air to become trapped between the sidewall of the formed container 218 and the inner surface 412 of the mold inserts 406a-c. Additionally, the vacuum allows lower-energy pulses to be used for forming because there is less resistance against outward movement of the sidewall of the pre-form article 216. In some aspects, vacuum levels of less than about −25 inHg (about −12.3 psia) are used. In further aspects, vacuum levels of less than about −26 inHg, (about −12.8 psia) are used. In yet further aspects, vacuum levels of less than about −27 inHg (about −13.3 psia) are used. In still yet further aspects, vacuum levels of less than about −28 inHg (about −13.8 psia) are used.

While evacuating the volume between the pre-form article 216 and the inner surface of the multi-segment mold 308 assists in reducing sidewall aberrations due to trapped air, it has been determined that aberrations such as wrinkling may also be produced by "ricochet" or "bounce" of the sidewalls of the pre-form article 216 during the electromagnetic forming. Ricochet is generally caused by the sidewall of pre-form articles 216 expanding with such speed that the impact between the sidewall and the mold causes the sidewall to bounce off of the inner surface 412 of the mold inserts 406a-c, and retract toward the electromagnetic coil 306 before coming to rest. It is contemplated modifying the elasticity or resiliency of the mold inserts 406a-c may alter the amount of ricochet.

Surprisingly, the problem of ricochet is generally more difficult to overcome in smooth-walled articles than embossed articles. It is believed that the embossing inhibits ricochet by providing added rigidity to the formed container 218, dissipating kinetic energy in forming the ridges, and increasing the duration of the forming of the sidewall and, thus, lessening the impulse on the sidewall during forming. Moreover, the problem of ricochet is also generally more difficult to overcome in straight-walled articles than in articles having tapered sides, such as those having an "hourglass" or other contoured shape.

Contemporaneously with the application of a vacuum, the volume between the pre-form article 216 and the outer surface of the electromagnetic coil 306 may be pressurized. The pressurized interior volume of the pre-form article 216 allows for lower-energy pulses to be used to form the container. Beneficially, the pressurized interior volume of the pre-form article 216 helps to counteract ricochet of the wall off of the inner surface of the mold. In some aspects, pressurized air is forced through the channel 704 (FIG. 7D) in the inner conductor 368 and is passed to the inner sidewall of pre-form article 216 through passages 702 in the shaped bottom cap 366. Surprisingly, pressures of greater than about 114.7 psia can be used to produce consistent forming of containers, including smooth-walled containers. In some aspects, the pressure applied is approximately at the "yield point" or "hoop stress" of the pre-form article 216. That is, the pressure applied will cause the pre-form article 216 to stretch slightly, but generally will not substantially or permanently deform the pre-form article 216. Thus, pre-form articles 216 with thinner walls will require less pressure than pre-form articles 216 with thicker walls. For example, it has been discovered that pressures between about 144.7 psia and about 184.7 psia produce desirable results without wrinkles for containers having an about 2.08" (about 5.28 cm) diameter with an about 0.009" (about 0.023 cm) wall thicknesses. In some aspects, the system 100 includes a booster pump to receive the house-supplied pressure (typically about 104.7 psia or less) and increase the house-supplied pressure to the desired level. It is contemplated that lower pressures may be used. More particularly, pre-form articles having thin walls (e.g., 0.007" or 0.005"), soft materials, or soft tempers will generally require lower pressures than 144.7 psia.

In accord with certain aspects described herein, a single expansion step of annealed pre-form articles 216 can produce generally straight-walled, cylindrical formed containers 218 with diameters that have been expanded more than about 15%. In further aspects, the single-step expansion is greater than about 20%. In yet further aspects, the single-step expansion is greater than about 25%. Beneficially, expansions of greater than about 25% allow use of straight-wall, un-necked pre-form articles 216 because features such as necks and flanges can be produced during the electromagnetic forming. Further in accord with aspects described herein, a single expansion step of non-annealed pre-form articles 216 can produce straight-walled, cylindrical formed containers 218 with diameters that have been expanded up to about 12%. It is believed that different materials and different alloys can achieve still higher levels of expansion. It is believed that air pressures in excess of about 114.7 psia are needed to achieve such large single-step expansions of pre-form articles 216 having 0.009" thick sidewall. Other air pressures may be used depending on wall thickness and material of the pre-form article 216.

After the system achieves a desired vacuum on the outside of the pre-form article 216 and a desired pressure on the inside of the pre-form article 216, one or more electromagnetic pulses are passed through the electromagnetic coil 306. Each electromagnetic pulse induces a current in the pre-form article 216 that forces the pre-form article 216 outward and into contact with the inner surface of the multi-segment mold 308. In aspects applying more than one electromagnetic pulse, the properties of each pulse may be uniform or may be varied to achieve desirable results. For example, electromagnetic pulses applied during the forming may have different pulse voltages, pulse duration, time between adjacent pulses, pulse waveforms, etc., combinations thereof, and the like. In some non-limiting examples, a 53 mm×185 mm pre-form article 216 with a 0.009" wall thickness can be expanded by 25% using about 3 to about 4.5 KJ of energy. The amount of energy varies depending on the desired formed container 218 geometry. The energy is transferred has a high frequency, which is needed for forming thin metals. The current oscillates within the system until the voltage is insufficient to travel through the circuit. This occurs, for example, in the order of milliseconds or less. Beneficially, the pressure differential on the pre-form article and the applied energy may be independently adjusted to produce desired characteristics and features of the formed container 218. For example, for certain forming operations, lower pressure differential, higher energy forming will produce more desirable results than higher pressure differential, lower energy forming. Conversely, for certain other forming operations, higher pressure differential, lower energy forming will produce more desirable results than lower pressure differential, higher energy forming.

After the article is formed, the vacuum and pressurization are released and the system returns to atmospheric pressure. The rotation of the forming turret 204 relative to the mold cam 212 causes the mold cam 212 to allow the mold actuator 310 to travel away from the axis of rotation of the forming turret 204. This outward movement urges the multi-segment mold 308 open and releases the formed container 218 from the multi-segment mold 308. The loading cam 210 begins to disengage the loading-mechanism actuator 304, and the loading-mechanism actuator 304 travels away from the center of the axis of rotation of the forming turret 204. This causes the loading mechanism 302 to travel from the second position to the first position to remove the formed container 218 from about the electromagnetic coil 306. The outfeed starwheel 206 then receives the formed container 218 from the forming turret 204 and passes the formed container 218 downstream for further processing or packaging.

Figure 8:
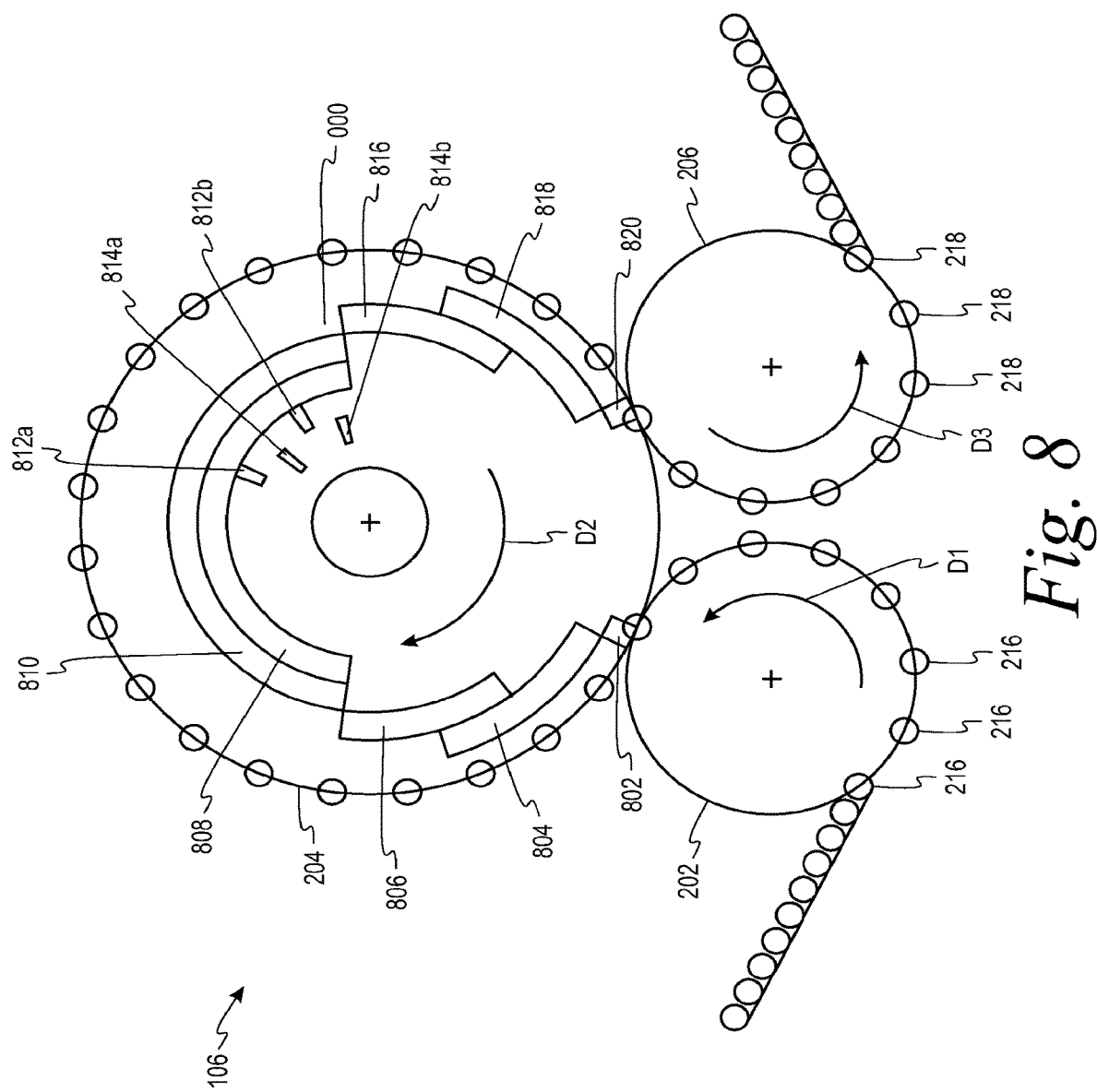
FIG. 8 illustrates a process timing schematic for an exemplary rotary-turret system using electromagnetic forming, according to aspects of the present disclosure.

Referring now to FIG. 8, a diagram illustrating a process timing schematic for an example rotary-turret system 106 having an infeed starwheel 202, a forming turret 204, and an outfeed starwheel 206 is shown. While the process timing schematic illustrates a plurality of articles disposed at various stages of forming, it should be understood that the following embodiment will be described with respect to a single article passing through the rotary-turret system 106.

The infeed starwheel 202 receives a pre-form article 216 while continually rotating. The infeed starwheel 202 then rotates in a direction D1 to deposit the pre-form article 216 in a respective forming module 208 of the forming turret 204. The forming turret 204 receives the pre-form article 216 while continually rotating in a direction D2 that is opposite the infeed starwheel direction D1. For ease of description, the point at which the pre-form article 216 is received by the forming turret 204 will be referred to as the reference point or 0°.

The pre-form article 216 is transferred from the infeed starwheel 202 to the rotary turret 206 between about 0° and about 5° of rotation at step 802. After the forming module 208 receives the pre-form article 216, the pre-form article 216 is loaded onto the electromagnetic coil 306 by, for example, the loading mechanism 302 at step 804. The loading step 804 occurs between about 5° and about 50° of rotation. While the pre-form article 216 is being loaded onto the electromagnetic coil 306, the multi-segment mold 308 begins to close at step 806. The multi-segment mold 308 closing occurs between about 30° and about 75° of rotation. In the illustrated embodiment, there is some overlap between the pre-form-loading step 804 and the mold-closing step 806 to reduce total process time because the mold can be partially closed without interfering with the loading step 804. Beneficially, completion of the loading step 804 prior to completion of the mold-closing step 806 provides for increased longevity of sealing members such as O-rings that are disposed between the loading mechanism 302 and the multi-segment mold 308. Longevity is increased because the multi-segment mold 308 contacts the O-rings and moves substantially inward to form the seal, producing a generally compressing force, rather than the O-rings sliding laterally relative to the multi-segment mold 308, which would produce a generally shearing force. After the mold-sealing step 806, a vacuum is applied and air occupying the volume between the pre-form article 216 and the inner surface of the mold 308 is evacuated at step 808. The vacuuming step 808 occurs between about 75° and about 240° of rotation. A volume between the electromagnetic coil 306 and the pre-form article 216 is pressurized at step 810. In the illustrated embodiment, the pressurizing step 810 is performed simultaneously with the vacuuming step 808, e.g., between about 75° and about 240° of rotation. In some embodiments, the vacuuming step 808 and the pressurizing step 810 begin and/or end at different angles of rotation.

At step 812a, the pressure of the volume between the electromagnetic coil 306 and the pre-form article 216 and the vacuum of the volume between the pre-form article 216 and the inner surface of the mold 308 are tested and verified at about 180° of rotation. If the pressure and vacuum are verified to be within predetermined operating ranges, a first electromagnetic pulse is applied to the pre-form article 216 at step 814a. The first-pulse step 814a occurs at about 195° of rotation.

A determination that the pressure and vacuum are outside of the predetermined operating ranges could indicate one or more possible breaches/defects in the pre-form article 216, the multi-segment mold 308, and/or other components in the system 100. For example, if the pre-form article 216 has a breach, the pressurized volume and the evacuated volume will not be separated by an air-tight seal and, thus, the pressure will be lower or closer to atmospheric pressure than expected. Such a breach may be dangerous if an electromagnetic pulse is applied because the split may cause arcing, vaporization of the pre-form material, and/or even explosions within the multi-segment mold 308. Thus, if the pressure and vacuum are outside of the predetermined operating ranges, the first-pulse step 814a and any subsequent pulse steps are inhibited.

After the first-pulse step 814a, the pressure and vacuum are optionally tested again and verified at step 812b, at about 210° of rotation. If the pressure and vacuum are verified to be within predetermined operating ranges, a second electromagnetic pulse is applied to the pre-form article 216 at step 814b. The second-pulse step 814b occurs at about 225° of rotation. Similarly, if the pressure and vacuum are outside of the predetermined ranges, the second-pulse step 814b and any subsequent pulse steps are inhibited.

Beneficially, a verifying step such as step 812b after an electromagnetic pulse can also be used to determine whether the formed container 218 contains structural defects such as a breach. A defective formed container can then be separated from the non-defective formed containers 218 without further testing. Additionally, the verifying steps 812a,b can be used to alert operators to an issue with the rotary-turret system 106 such as a defective multi-segment mold 308, electromagnetic coil 306, spark-gap mechanism, loading mechanism 302, combinations thereof, or the like. For example, adequate pressure but inadequate vacuum in a multi-segment mold 308 through two rotations could indicate a defective multi-segment mold 308. In another example, inadequate pressure or vacuum for consecutive articles in adjacent forming modules could indicate a defective compressed-gas system 110 or vacuum system 108, respectively.

After the forming, the vacuum and pressure are released. The multi-segment mold 308 is then opened at step 816. The mold-opening step 816 occurs between about 240° and about 285° of rotation. While the multi-segment mold 308 is being opened, the loading mechanism 302 begins to remove the formed container 218 from the electromagnetic coil 306 at step 818. The removing step 818 occurs between about 265° and about 310° of rotation. After being removed from the electromagnetic coil 306, the formed container 218 is transferred from the rotary turret 206 to the outfeed starwheel 208 between about 310° and about 315° of rotation at step 820.

In some aspects, the working angle of the rotary turret 206 is about 315° of rotation, and switching on and off of the components in the process occurs through about 330° of rotation. For consistency, the point at which the pre-form article 216 is received by the forming turret 204 will be referred to as the reference point or 0°.

The pre-form article 216 is loaded onto the electromagnetic coil 306 by, for example, the loading mechanism 302 between about −7.5° and about 42.5° of rotation. After the pre-form loading step has been initiated, vacuum is applied to the loading mechanism 302 to assist in releasably securing the pre-form article 216 to the loading mechanism 302 beginning at about −4.5° and lasting until about 247.5° of rotation. After these steps have been initiated, the preform article 216 is transferred from the infeed starwheel 202 to the rotary turret 206 at about 0° of rotation. While the pre-form article 216 is being loaded onto the electromagnetic coil 306, the multi-segment mold 308 begins to close. The multi-segment mold 308 closing occurs between about 22.5° and about 67.5° of rotation. As stated above, there is some overlap between the pre-form loading step and the mold-closing step to reduce total process time, and the pre-form loading step is completed prior to completion of the mold-closing step to provide increased longevity of sealing members disposed between the loading mechanism 302 and the multi-segment mold 308. After the mold-sealing step, a vacuum is applied to the mold multi-segment mold 308 from about 67.5° to about 247.5° of rotation, and air occupying the volume between the pre-form article 216 and the inner surface of the mold 308 is evacuated. A volume between the electromagnetic coil 306 and the pre-form article 216 is pressurized between about 187.5 and 247.5°.

While pressure is being applied to the pre-form article 216 and vacuum is being applied to the multi-segment mold 308, forming steps are performed. Preferably, the forming step includes at least one leak test and at least one forming pulse. Leak tests are performed to verify the pressure and vacuum levels. If the pressure and vacuum are within predetermined range, one or more pulses are applied. If the pressure and vacuum are outside of the predetermined operating ranges, any subsequent pulses are inhibited. Preferably, a leak test is performed prior to each applied pulse. It is contemplated that a pulse may be applied prior to any leak test.

After the forming steps, the vacuum and pressure are released and the multi-segment mold 308 is opened between about 262.5° and 292.5° of rotation. While the multi-segment mold 308 is being opened, the unloading step is performed between about 272.5° and 322.5° of rotation to remove the formed container 218 from the electromagnetic coil 306 and position the formed article 218 to be transferred from the rotary turret 206 to the outfeed starwheel 208. Vacuum is applied to the loading mechanism 308 between about 262.5° and 312.5° of rotation to releasably secure the formed article 218. The formed article 218 is transferred from the rotary turret 206 to the outfeed starwheel 208 at about 315° of rotation.

While the working angles described in the above embodiments are about 315°, it is contemplated that greater or smaller working angles may be used, such as about 180°, about 270°, about 330°, about 345°, or the like. Further, it is contemplated that the angular ranges or proportions of the working angle occupied by each step may vary. Additionally, overlaps between adjacent steps may also be added, varied, or removed.

Figure 9:
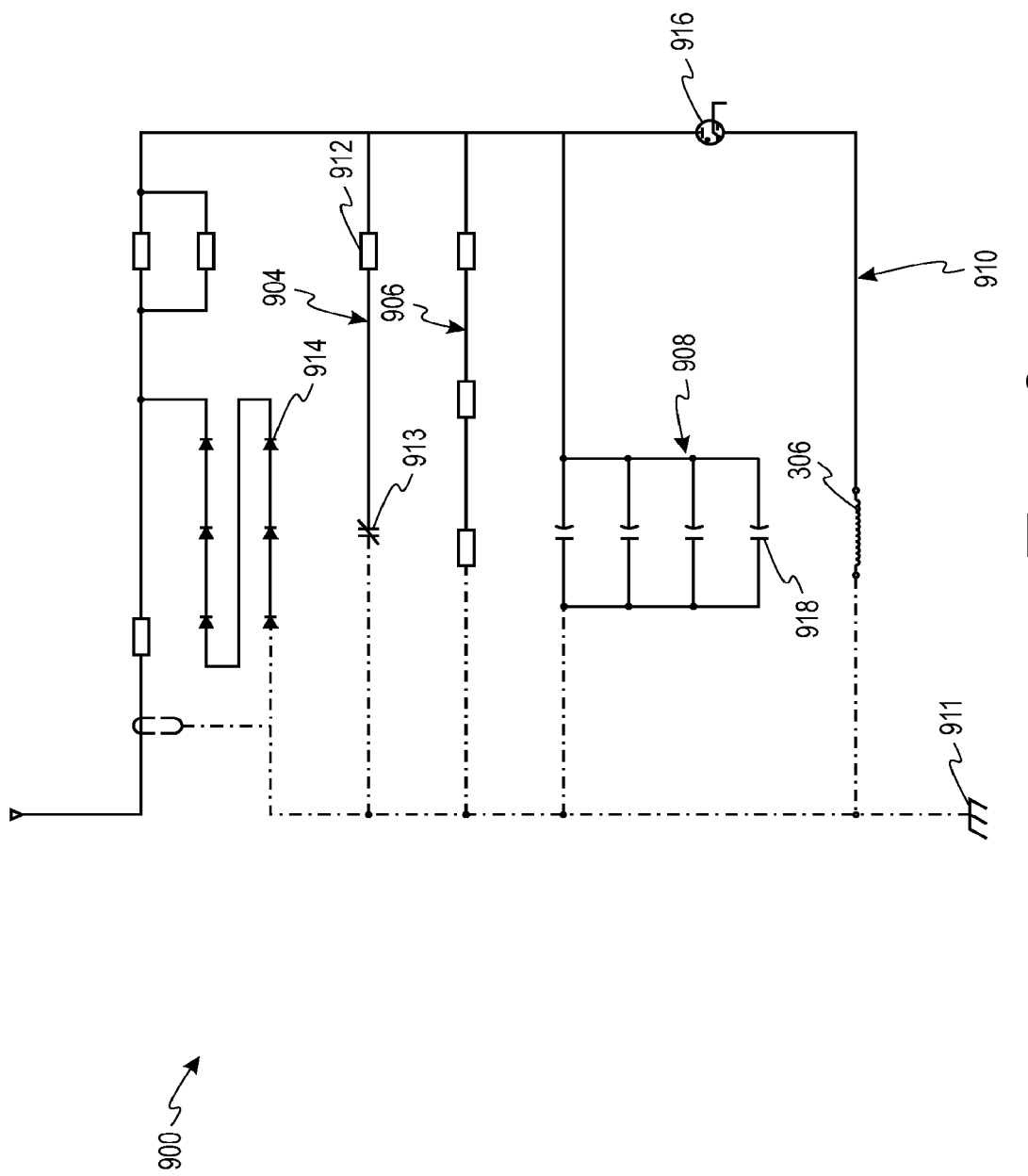
FIG. 9 illustrates an electrical schematic of an exemplary forming system, according to aspects of the present disclosure.

Referring now to FIG. 9, an electrical schematic of an exemplary forming system 900 is shown. The forming system 900 includes a high-voltage power supply 902, an emergency-stop circuit 904, a discharge circuit 906, a capacitor bank 908, a forming circuit 910 and ground. The emergency-stop circuit 904, discharge circuit 906, capacitor bank 908, and forming circuit 910 are electrically coupled in parallel. The high-voltage power supply 902 passes high-voltage current through the system to charge the capacitors 918. The emergency-stop circuit 904 provides a quick discharge circuit 904 that can be actuated to safely discharge the capacitor bank 908 in an emergency situation. The emergency-stop circuit 904 includes a resistor 912 and a quick-discharge high-voltage chip resistor 913.

The discharge circuit 906 is configured to slowly drain energy from the capacitor bank 908 when the power supply 902 is not supplying power to the system 900. The discharge circuit 906 includes a plurality of resistors 912 that provide a closed circuit that slowly drains the capacitors 918 when the system is powered down, inhibiting unintentional discharge of the capacitors 918.

The capacitor bank 908 includes a plurality of capacitors 918 configured to store energy to be supplied to the electromagnetic coil 306. This energy is supplied to the electromagnetic coil 306 in short impulse, high-voltage bursts.

The forming circuit 910 includes a discharge-control mechanism 916 configured to selectively actuate discharge of the capacitor bank 908 to the electromagnetic coil 306. The discharge-control mechanism 916 can be any suitable high-current switching device such as a Paschen-mode spark-gap switch, various spark gaps, rail gaps, trigatron, ignitrons, high-current solid-state switches, combinations thereof, and the like.

The energy ($E_c$) discharged per pre-form article 216 is given by the formula $E_c = \frac{1}{2} C \cdot V_c^2$, where C is the capacitance of the capacitor bank 908 and $V_c$ is the voltage supplied by the capacitors. In some non-limiting aspects, the capacitor bank 908 includes four capacitors 918 coupled in parallel, and each capacitor 918 has about 6 μF of capacitance. The voltage supplied during the discharge is about 18,000 V. Thus, the energy discharged per pre-form article 216 is about 3888 J.

The total power needed for a high-speed continuous system is given by the formula Power=CPM·$E_c$, where CPM is the number of cans per minute and $E_c$ is the energy discharged per pre-form article 216. Thus, if the energy discharged per pre-form article 216 is about 3888 J, the power needed is about 65 W for one can per minute, about 1944 W for thirty cans per minute, about 7776 W for 120 cans per minute, and $2 \times 10^5$ W for 2400 cans per minute.

The amperage needed to supply a high-speed continuous system is given by the formula $A_c$=Power/$V_c$ where power is the total power needed and $V_c$ is the capacitor voltage. In the above-described example, about 0.0036 A are needed for one can per minute, about 0.108 A is needed for thirty cans per minute, about 0.432 A is needed for 120 cans per minute, and 8.64 A is needed for 2400 cans per minute. It is noted that these calculations relate to the power needed to supply electromagnetic pulses and do not include other aspects of the system such as the power required by drive motors, vacuum systems, compressed-gas systems, controls, etc.

It is believed that high-voltage, low capacitance, and low inductance system allows for improved and surprising success of electromagnetic forming systems in accord with aspects of the present invention. At the same energy and inductance, a system with high voltage, low capacitance, and low inductance will resonate at a higher frequency than a system with low voltage, high capacitance, and low inductance system. It is believed that the resulting high-frequency pulse provides beneficial forming properties by producing greater eddy currents in very thin-walled pre-form articles 216 than those produced by lower-voltage, higher-capacitance circuits of equal inductance and energy. These eddy currents provide the electromagnetic force that opposes the electromagnetic force from the coil, which provides for more efficient forming.

Referring back to FIG. 1, the discharge-control mechanism 104 is configured to selectively actuate discharge of the capacitors to the rotary-turret system 106. A selected electromagnetic pulse may be delivered to one or more forming modules 208 simultaneously.

In some aspects, the discharge-control mechanism 104 includes a spark-gap mechanism to pass current from the capacitor bank to the electromagnetic coil 306. The spark-gap mechanism includes a first electrode and a second electrode spaced a predetermined distance apart. The predetermined distance is selected such that electricity is passed from the first electrode to the second electrode when the electric-potential difference between the two electrodes reaches a desired level. Additionally, the spark-gap mechanism can be placed in a housing that allows for dynamically altering the atmosphere within the housing. For example, a vacuum can be applied to the spark-gap mechanism to lower resistance between the electrodes and, thus, control discharge of the capacitors. Pressure can be applied to the mechanism to inhibit the spark. The open spark causes some material to be ablated from each of the electrodes and, thus, requires replacement of both electrodes after a period of use.

In some aspects, a moving spark-gap mechanism is used to pass current from the capacitor bank to the electromagnetic coil 306. The moving spark-gap includes a pair of stationary electrodes and a plurality of movable electrode pairs. As will be described with respect to FIG. 10A below, the return path can be formed using a pair of stationary electrodes, or may be formed using, a single stationary electrode with a slip-ring for the return path. The stationary electrodes are electrically coupled to the charging circuit 102 and each of the moving electrode pairs are electrically coupled to one or more forming modules 208. In operation, each pair of moving electrodes is passed in proximity to the stationary electrodes. This allows current to flow from the stationary electrodes to the proximate movable electrode pair, similar to a "distributor" used in the automotive industry. In some aspects, each forming module 208 includes a moving electrode pair disposed thereon. The stationary electrodes are disposed external to the forming turret 204 such that current passes from the stationary electrodes to a respective moving electrode pair when the respective moving electrode pair is less than a predetermined distance away from the stationary electrodes. The predetermined distance is selected based on factors such as voltage to be delivered, pulse duration, pulse shape, combinations thereof, and the like. Beneficially, the moving spark-gap mechanism allows for the oftentimes large, bulky capacitors and most of the controls to remain stationary while the forming turret 204 continually spins. Beneficially, the moving spark-gap mechanism provides benefits of lowering overall cost of a spark-gap mechanism. That is, the stationary electrode reduces the number of electrodes in the system by about half as compared to a traditional spark-gap mechanism. Thus, these electrodes can be comprised of a generally higher-cost, heavy-duty material that significantly resists ablation without a substantial cost increase to the system. Further, an added benefit of the moving spark-gap mechanism is a lower cost of maintenance. Further still, by reducing the number of electrodes needed, the stationary electrodes can include an automatic-adjustment mechanism that is configured to automatically compensate for the ablation of material.

Referring now to FIG. 10A, a schematic of a system 1000 including a charging circuit 102 and a rotary-turret system 106 with a moving spark-gap mechanism 1002 disposed therebetween is shown according to aspects of the present disclosure. The moving spark-gap mechanism 1002 includes two stationary electrodes 1004 and a plurality of moving electrode pairs 1006. The charging circuit 102 includes a power source 1020 such as a high-voltage power supply, a capacitor bank 1022, a ground 1024, and stationary electrodes 1004. The stationary electrodes 1004 are spaced a sufficient distance apart to inhibit arcing therebetween, thus inhibiting short circuits. The capacitor bank 1022 is disposed between the power source 1020 and the ground 1024 to allow the capacitors to charge when the spark gap is open. Each of the plurality of moving electrode pairs 1006 are electrically coupled to a respective electromagnetic coil 306. When the moving electrode pairs 1006 come into proximity with the stationary electrodes 1004, the high-voltage current arcs across the gaps and the circuit closes. The arrangement of the moving spark-gap mechanism 1002 in parallel with the capacitor bank 1022 allows the capacitor bank 1022 to discharge its energy into the electromagnetic coil 306. It is contemplated that each electromagnetic coil 306 may be coupled to an independent ground and, thus, include only a single moving electrode corresponding to a single stationary electrode.

In some aspects, a moving inductive-coil mechanism is used to pass current from the capacitor bank to the electromagnetic coil 306. The moving inductive-coil mechanism includes one or more stationary coils and a plurality of moving coils. The stationary coil(s) are electrically coupled to the charging circuit 102. Each of the plurality of moving coils is electrically coupled to one or more of the forming modules 208. For example, each moving coil is associated with a respective forming coil. In operation, each of the moving coils is passed in proximity to the one or more stationary coils. When the stationary coil and a respective moving coil are disposed within close proximity, the stationary coil induces a current in the moving coil to electromagnetically transfer energy from the capacitor bank. This induced current avoids forming a spark between electrodes, thus assisting in preventing ablation and lowering overall maintenance costs for the system. Beneficially, current to the stationary coil can be switched by, for example, solid state switches or spark gaps that are located remotely from the process turret.

Figure 10B:
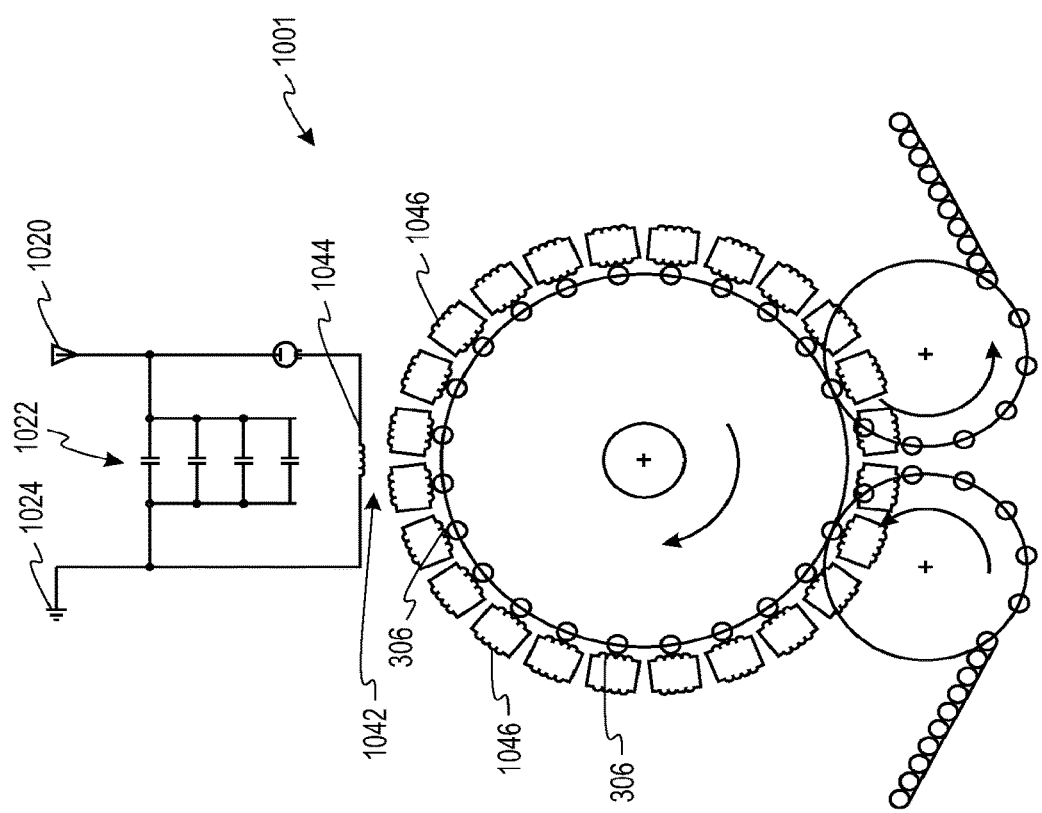
FIG. 10B illustrates an example of a schematic of a system including a moving inductive-coil mechanism, according to aspects of the present disclosure.

Referring now to FIG. 10B, a schematic of a system 1001 including a charging circuit 102 and a rotary-turret system 106 with a moving inductive-coil mechanism 1042 disposed therebetween is shown, according to aspects of the present disclosure. The moving inductive-coil mechanism 1042 includes a stationary coil 1044 and a plurality of moving coils 1046. The charging circuit 102 includes a power source 1020, a capacitor bank 1022, a ground 1024, the stationary coil 1044, and a control mechanism 1026. The control mechanism 1026 selectively activates current flow through the stationary coil 1044 and can be any suitable high-current switching device such as a Paschen-mode spark-gap switch, various spark gaps, rail gaps, trigatron, ignitrons, high-current solid-state switches, and the like. The capacitor bank 1022 is disposed between the power source 1020 and the ground 1024 to allow the capacitors to charge when the control mechanism 1026 is open, or in the OFF state. Each of the plurality of moving coils 1046 is electrically coupled to the electromagnetic coil 306 such that an induced current in a moving coil 1046 produces an induced current in the respective electromagnetic coil 306. When the stationary coil 1044 is in proximity to a respective moving coil 1046, the control mechanism 1026 is actuated to the ON state, and the capacitor bank 1022 discharges through the stationary coil 1044. This discharge induces a current in a respective one of the plurality of moving coils 1046, which is transferred to the electromagnetic coil 306. Beneficially, the number of windings on each of the plurality of moving coils 1046 can be increased relative to the number of windings on the stationary coil 1044 and to produce beneficial forming properties through use of higher voltage pulses.

In some aspects, one or more slip rings are used to pass current from the capacitor bank to the electromagnetic coil 306. The slip ring includes one or more brushes to transfer energy from the stationary portion to the rotating portion. For example, each of the brushes can be electrically coupled to one or more forming modules 208. During a portion of the travel of the forming turret 204, the respective brush contacts the stationary portion of the slip ring and transfers energy from the capacitor bank to the respective forming modules 208. Alternatively, the brush may be stationary and may contact moving portions of the slip ring to transfer energy from the capacitor bank to the respective forming modules 208.

In some aspects, the capacitor bank is included on the forming turret 204 and rotates therewith. The current can then be passed from the capacitor bank to the electromagnetic coil 306 using, for example, solid state switches or spark-gap mechanisms. Beneficially, lower-current electricity may be passed through slip rings to charge the capacitors, and the high-current pulse may be completely contained on the process turret. Beneficially, including the capacitor bank with the rotary turret 204 provides for a more self-contained electromagnetic forming apparatus.

Multiple capacitor banks may be included within the charging circuit 102, and power supplied to the forming modules 208 may be alternated between the capacitor banks. Such a configuration may be used to provide for the forming turret 204 to rotate at a faster rate than systems with a single capacitor bank. In an example, a single stationary electrode is used and the power supplied to the single electrode is alternated between the first and second capacitor bank. In another example, two stationary electrodes can be used with each stationary electrode being coupled to one of the capacitor banks and engaging a respective plurality of moving electrodes. In this configuration, the moving electrodes of adjacent forming modules 208 alternate between the first plurality of moving electrodes and the second plurality of moving electrodes (e.g., modules 1, 3, 5, etc. would have moving electrodes from the first plurality of moving electrodes and modules 2, 4, 6, etc. would have moving electrodes from the second plurality of moving electrodes).

In some aspects, multiple electromagnetic pulses used within the same forming cycle can assist in improving the forming detail of the resulting container. Multiple electromagnetic pulses such as double- or triple-pulse systems and methods can be used to achieve improved feature definition and smoothness. Beneficially, multiple pulses can be used to consistently produce straight-walled formed containers 216. Surprisingly, these containers are more difficult to produce than shaped or embossed containers. Such a container can be consistently produced using, for example, a two-pulse process. The two-pulse process may include a first, lower-energy pulse to expand the mid-section to the inner surface 412 of the multi-segment mold 308. In some aspects, the upper and lower ends of the pre-form article 216 expand as well, but generally do not contact the inner surface 412 of the mold, or do contact the inner surface 412 of the mold, but lack adequate feature definition. A higher-energy second pulse is then used to further expand the upper and lower portions of the pre-form article 216 to expand into contact with the inner surface 412 of the multi-segment mold 308. For example, in some aspects, a first pulse having 16,600V and a second pulse having 18,000V is used to consistently form straight-walled formed containers 216. Two-pulse processes are generally less likely to cause the mid-section wall to "bounce" because the mid-section wall does not have enough distance between it and the inner surface 412 to accelerate to a velocity that would cause ricochet or bounce back. Beneficially, these subsequent pulses can also further improve features such as embossing detail by more-gently urging the sidewall of the formed container 218 outward into the mold, thus better conforming to the mold structure without generally causing aberrations. Even more beneficially, multiple pulses can be used to reduce the vacuum level required to consistently form articles without significant aberrations. By partially forming the pre-form article 216 with a lower-energy first pulse, air between the wall of the pre-form article 216 and the inner surface 412 of the multi-segment mold 308 is inhibited from becoming highly compressed in small pockets. The remaining voids between the wall of the article and the inner surface 412 of the multi-segment mold 308. This provides less movement and less volume change during subsequent pulses, which also lessens the need for high vacuum.

In some aspects, a portion of the formed container 218 (e.g., the mid-section) is expanded less than the remaining portions of the formed container 218 (e.g., the upper and lower ends) to produce a formed container 218 having a generally hourglass shape. Such a container can be consistently produced using, for example, a two-pulse process. In some aspects, first pulse causes the upper and lower ends of the pre-form article 216 expand as well, but generally do not contact the inner surface 412 of the mold. The higher-energy second pulse is then used to further expand the upper and lower portions of the pre-form article 216 to into contact with the inner surface 412 of the multi-segment mold 308.

In some aspects where multiple stationary electrodes share the same capacitor bank, the stationary electrodes can be disposed such that the timing between pulses assists in determining the amount of current delivered from the capacitor bank. That is, by selecting the timing such that the capacitor bank does not charge to its full capability, a lower-energy pulse will be applied. Additionally or alternatively, the two stationary electrodes can each be electrically coupled to a respective capacitor bank, where each capacitor bank is configured to deliver a different level of energy.

According to aspects of the present disclosure, a variable-speed starwheel may be configured to receive articles such as pre-form articles 216 or formed containers 218 that are traveling at a first speed, then accelerate or decelerate the articles to be deposited at a second speed. In some aspects, the change in speed is accomplished, for example, by altering the distance of the pockets 214 from an axis of rotation 1108 between receiving and depositing the articles, delaying or retarding the position of the pockets 214 relative to rotation of a driving mechanism 1102, combinations thereof, or the like.

Referring now to FIGS. 11A-C, a variable-speed starwheel 1100 is shown according to aspects of the present disclosure. In non-limiting examples, the variable-speed starwheel 1100 includes a driving mechanism 1102, a cam surface 1104, and a plurality of arms 1106. The driving mechanism 1102 is configured to rotate about an axis of rotation 1108 and drives the variable-speed starwheel 1100. The driving mechanism 1102 can be, for example, a hub coupled to a synchronization mechanism that receives drive-power from another module in the system, or can be an independently driven motor.

The cam surface 1104 generally does not rotate about the axis of rotation 1108 and defines an irregular shape with variable radial distance from the axis of rotation 1108. The variable radial distance includes a first radial distance R1 disposed at a first angular position and a second radial distance R2 at a second angular position.

Each of the plurality of arms 1106 includes a pocket 214, a pivot mechanism 1160, and a cam follower 1162. The pockets 214 are configured to releasably receive the articles. Each pivot mechanism 1160 is spaced a distance from the pocket 214. The pivot mechanisms 1160 are attached to the driving mechanism 1102 and are disposed a fixed distance away from the axis of rotation 1108. Each arm 1106 swivels about each pivot mechanism 1160 such that an angle between a first line extending from the axis of rotation 1108 to the pivot mechanism 1160 and a second line extending from the pivot mechanism 1160 to the pocket 214 can be varied.

The cam follower 1162 is configured to engage the cam surface 1104. The cam follower 1162 is offset from the pivot mechanism 1160 such that the arm 1106 is advanced or retarded as the cam follower 1162 rises and falls. The advancing or retarding of the arm is used to increase or decrease the circumferential velocity and the pitch of the arm 1106. In some aspects, the arm 1106 may be biased such that the cam follower 1162 is urged into engagement with the cam surface 1104. In some aspects, the cam follower 1162 may be disposed within a slotted cam or grooved cam that includes a first cam surface 1104 to urge the cam follower 1162 in a first direction (e.g., outward) and a second cam surface 1104 to urge the cam follower 1162 in a second direction (e.g., inward). Engagement of the cam follower 1162 with the cam surface 1104 may be used to control the angle of the arm 1106. Beneficially, the arms can be "nested" to provide for greater numbers of arms about the variable-speed starwheel 1100. In the illustrated embodiment, the cam follower 1162 is axially offset from the pivot mechanism 1160 and pocket 214 such that the cam follower 1162 of a first arm 1106 overlaps with a second arm 1106 when viewed in an axial direction. It is contemplated that other nesting configurations can be used.

As shown, a first pocket 214a disposed at a first angular position extends a first distance D1 away from the axis of rotation 1108. The point of engagement between the first cam follower 1162a and the cam surface 1104 is the first radial distance R1 from the axis of rotation 1108. The first arm 1106a is disposed in a generally straight line (e.g., the angle may be about 180°) such that the first distance D1 is the farthest distance from the axis of rotation 1108. A second pocket 214b disposed at a second angular position extends a second distance D2 away from the axis of rotation 1108. The point of engagement between the cam follower 1162b and the cam surface 1104 is a second radial distance R2 from the axis of rotation 1108. The arm 1106 is disposed at an oblique angle (e.g., the angle may be about 120°) such that the second distance D2 is a shorter distance from the axis of rotation 1108 than the first distance D1. Because the angular velocity of the variable-speed starwheel 1100 is generally constant, the linear velocity of the first pocket 214a is greater than the linear velocity of the second pocket 214b.

Moreover, pivotable movement of the arms 1106 relative to the driving mechanism 1102 retards or advances the pocket 214 relative to the driving mechanism 1102. The rate that the pocket 214 advances or retards depends on the rate of change of the radius of the cam surface 1104 relative to the position of the pivot mechanism 1160. Beneficially, large changes in the linear velocity of the pocket 214 can be achieved without large changes between the first distance D1 and the second distance D2.

Figure 11E:
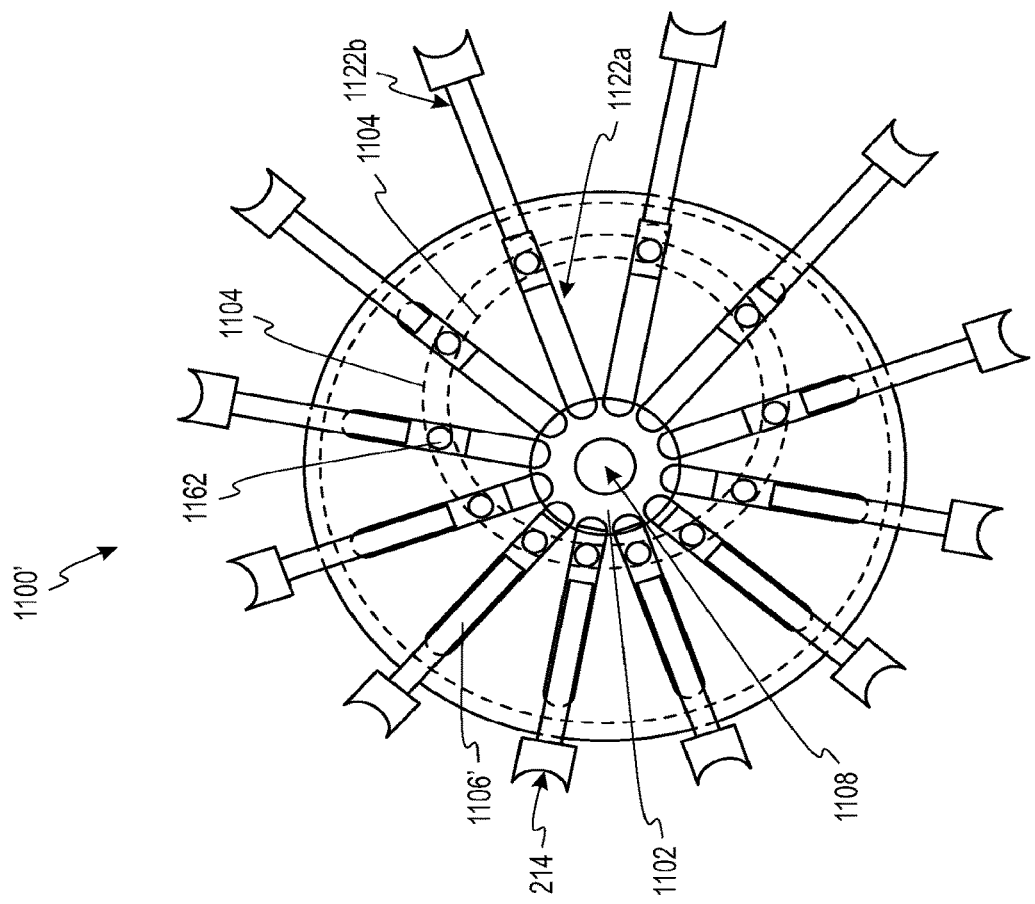
FIG. 11E illustrates a side view of the variable-speed starwheel of FIG. 11D.
Figure 11D:
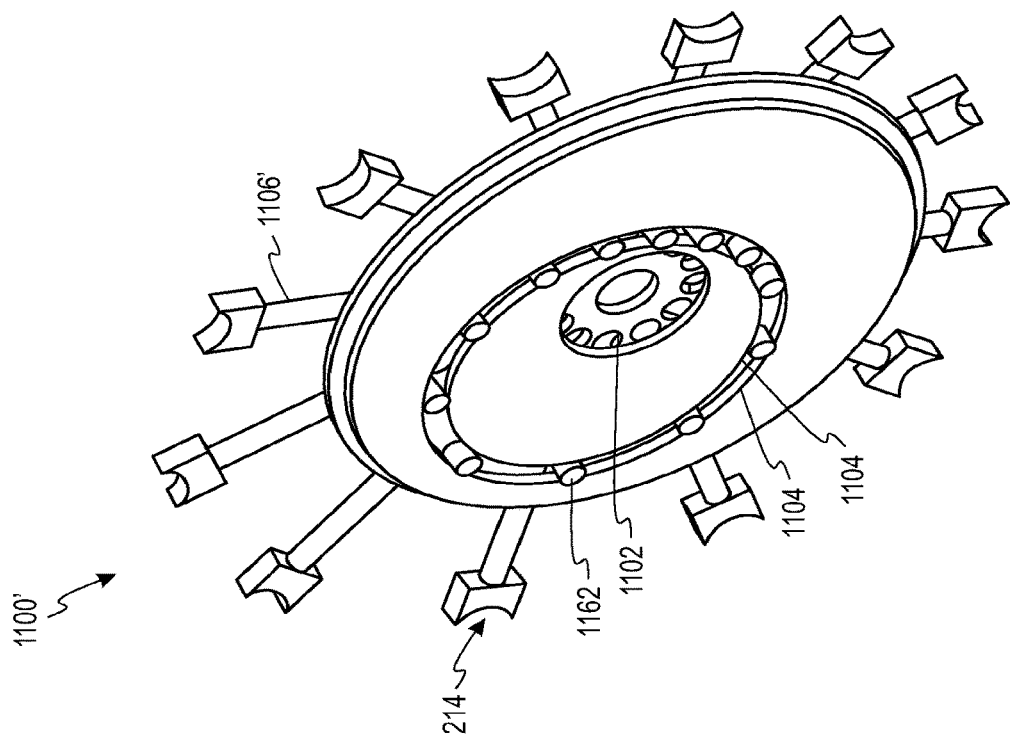
FIG. 11D illustrates a perspective view of a variable-speed starwheel, according to aspects of the present disclosure.

Referring now to FIGS. 11D-E, a variable-speed starwheel 1100' is shown according to aspects of the present disclosure. In some aspects, the variable-speed starwheel 1100' includes a driving mechanism 1102, a cam surface 1104, and a plurality of arms 1106'. Each of the plurality of arms 1106' includes a pocket 214 and a sliding mechanism that moves the pocket 214 inwardly or outwardly from the axis of rotation 1108. In some aspects, the sliding mechanism is a telescoping arm. The telescoping arm includes a first portion 1122a that is attached to the driving mechanism 1102 and a second portion 1122b that is attached to the pocket 214. In some aspects, the pocket 214 is urged inwardly or outwardly by engagement of a cam follower 1162 with a cam surface 1104. The cam follower 1162 may be mounted, for example, on the second portion 1122b of the telescoping arm. In some aspects, the pocket 214 is urged inward or outward by a hydraulic cylinder.

In the illustrated example, the cam surfaces 1104 form a generally circular shape that is disposed eccentrically about the axis of rotation 1108, providing a variable radius that depends on angular position of the arms 1106'. In the illustrated example, the radius between the cam surface 1104 and the axis of rotation 1108 is directly related to the distance between the pocket 214 and the axis of rotation 1108. Because the angular velocity of the variable-speed starwheel 1100' is generally constant, the linear velocity of pockets 214 a greater distance from the axis of rotation 1108 is greater than the linear velocity of pockets 214 a lesser distance from the axis of rotation. It is contemplated that non-circular cam surfaces 1104 can be used.

Figure 11G:
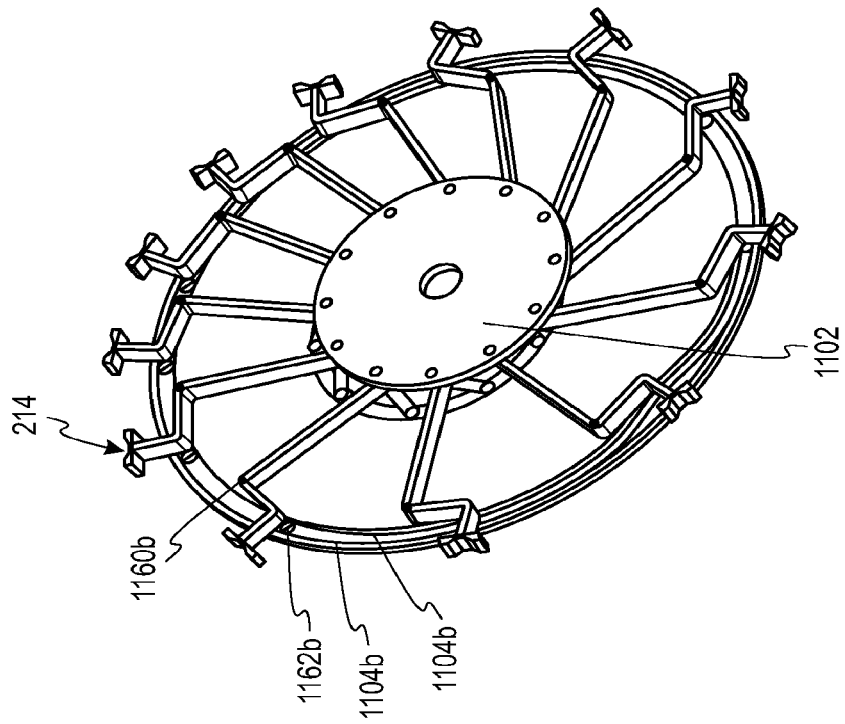
FIG. 11G illustrates a side view of the variable-speed starwheel of FIG. 11F.
Figure 11F:
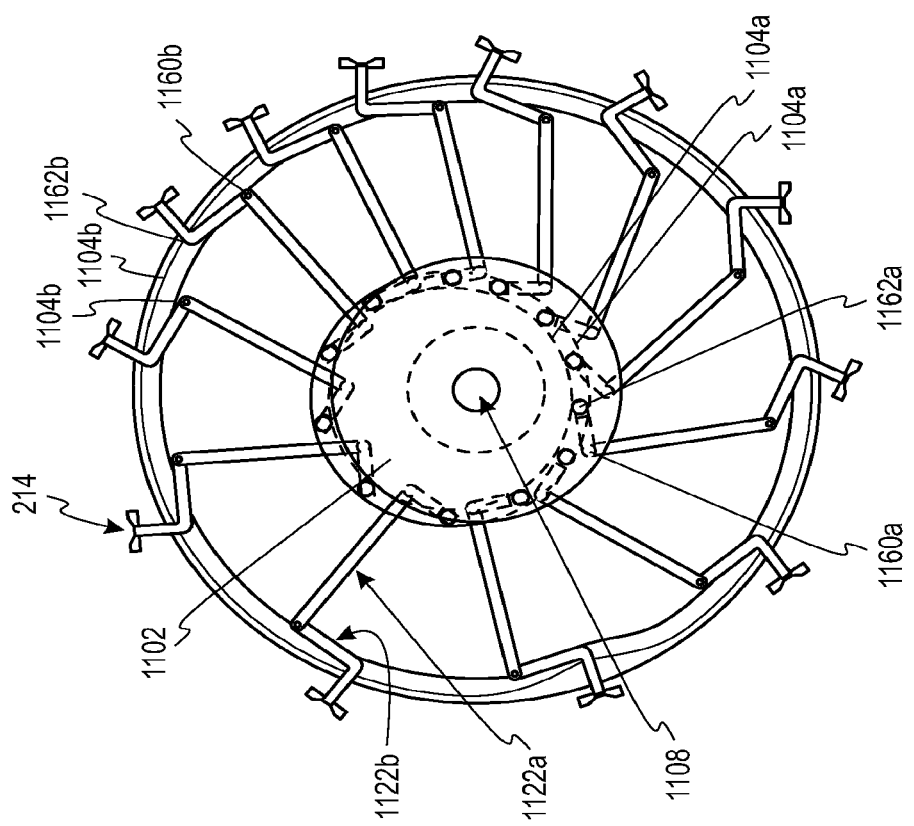
FIG. 11F illustrates a perspective view of a variable-speed starwheel, according to aspects of the present disclosure.

Referring now to FIGS. 11F-G, a variable-speed starwheel 1100" is shown according to aspects of the present disclosure. In some aspects, the variable-speed starwheel 1100" includes a driving mechanism 1102, a first cam surface 1104a, a second cam surface 1104b, and a plurality of arms 1106'.

The first cam surface 1104a generally does not rotate about the axis of rotation 1108 and defines a shape with a variable radial distance from the axis of rotation 1108. The first cam surface 1104a may define a generally circular shape disposed eccentrically from the axis of rotation 1108 as shown, may define an irregular shape, or the like.

The second cam surface 1104b generally does not rotate about the axis of rotation 1108 and defines a shape with a variable radial distance from the axis of rotation 1108. The second cam surface 1104b may define an irregular shape as shown, may define a generally circular shape disposed eccentrically from the axis of rotation 1108, or the like.

Each of the plurality of arms 1106" includes a pocket 214, a first pivot mechanism 1160a, a second pivot mechanism 1160b, a first cam follower 1162a, and a second cam follower 1162b. The first pivot mechanism 1160 is attached to the driving mechanism 1102 and disposed a fixed distance from the axis of rotation 1108. The arm 1106" swivels about the first pivot mechanism 1160a such that the arm 1106" is advanced or retarded relative to rotation of the driving mechanism 1102.

The first cam follower 1162a is configured to engage the first cam surface 1104a. The first cam follower 1162a is offset from the first pivot mechanism 1160a such that the arm 1106" is advanced or retarded as the first cam follower 1162a rises and falls. The advancing or retarding of the arm 1162" is generally responsible for increasing or decreasing the circumferential velocity and the pitch of the arm 1106".

The second pivot mechanism 1160b is disposed a distance from the first pivot mechanism 1160a and separates the arm 1106" into a first portion 1122a and a second portion 1122b. The second pivot mechanism 1160b allows the first portion 1122a to pivot relative to the second portion 1122b. The pivotable movement of the first portion 1122a relative to the second portion 1122b provides for rotational or "rolling" movement of the pocket 214, and provides for adjusting the distance between the pocket 214 and the axis of rotation 1108.

The second cam follower 1162b is configured to engage the second cam surface 1104b. The second cam follower 1162b is offset from the second pivot mechanism 1160b such that an angle between the first portion 1122a and the second portion 1122b of the arm 1162" is increased or decreased as the second cam follower 1162b rises or falls. The increasing or decreasing of the angle between the first portion 1122a and the second portion 1122b is generally responsible for increasing or decreasing the distance between the pocket 214 and the axis of rotation 1108.

Beneficially, the two degrees of freedom for the variable-speed starwheel 1106" provide for more desirable transfer between the variable-speed starwheel 1100" and an adjacent unit such as the forming turret 204. The compound adjustment of the pocket 214 can be used to more closely track both linear speed of the adjacent unit and a radial path centered on the axis of rotation the adjacent unit. This allows the transfer to occur along a path rather than at single, tangential point. This provides more desirable transfer of articles to the adjacent unit because the amount of time to transfer the article is increased.

Beneficially, variable-speed starwheels 1100 may be used to achieve greater working angles of adjacent units such as the forming turret 204. For example, variable speed starwheels 1100 can be used to reduce the effective radius between the infeed and outfeed starwheels in a first direction (e.g., between the infeed and outfeed starwheels) relative to a rigid starwheel while maintaining both the pitch between pockets 214 and the linear speed of the pockets required at the receiving and depositing points.

The pockets 214 of the variable-speed starwheels 1100 can include any suitable mechanism to releasably secure the article to the pocket 214 during transport. In some embodiments, the pockets 214 include at least one vacuum port configured to releasably secure the article to the pocket 214. The vacuum port is coupled to a vacuum source, which is selectively delivered to the pocket 214. For example, in some embodiments, the selective delivery of the vacuum to the pocket 214 is controlled by timing valves. In some embodiments, the selective delivery of the vacuum to the pocket 214 is controlled by plate (e.g., a moveable plate) which inhibits vacuum from being delivered to the pocket 214 between certain rotational angles of the variable-speed starwheel 1100. In some embodiments, the pockets 214 include mechanical features to releasably secure the article to the pocket 214. For example, in some embodiments, a "gripper" is used, to apply a pinching force to the article. The mechanical features can be actuated by, for example, a cam element or other non-rotational feature.

Referring now to FIGS. 12A-12C, a flexural hinge mechanism 410 is shown. The flexural hinge mechanism includes first resilient plates 1202a and second resilient plates 1202b. The first resilient plates 1202a and second resilient plates 1202b are formed from a material having a high yield strength such as such as spring steel. Beneficially the high yield strength allows the resilient plates to maintain their form indefinitely if the spring stress is kept below the fatigue limit for the material.

The first resilient plates 1202a are disposed along a line in a first co-planar arrangement. The second resilient plates 1202b are disposed along the line in a second co-planar arrangement. The first co-planar arrangement is perpendicular to the second co-planar arrangement such that the first resilient plates 1202a and the second resilient plates generally form an "X" pattern when viewed from an end of the bottom mold segment 402c. The shared line forms a hinge axis.

The multi-segment mold 308 includes an alignment mechanism. In some aspects, the alignment mechanism includes a plurality of tapered pins 422 configured to mate with a plurality of tapered holes 424. In some aspects, each segment includes a tapered pin 422 configured to mate with a respective tapered hole 424 disposed on an adjacent segment. While the mold is closing, each of the tapered pins 422 moves into engagement with a respective tapered hole 424. The engagement of the tapered pins 422 with the respective tapered holes 424 guides the mold segments 402a-c into alignment. Beneficially, the alignment mechanism provides for precise, repeatable alignment of the segments 402a-c of the multi-segment mold 308. This precise, repeatable alignment allows for air-tight seals to be formed between the segments 402a-c of the multi-segment mold 308. Additionally, the precise, repeatable alignment provides for production of formed containers with minimal or no aberrations due to seams between segments 402a-c of the multi-segment mold 308.

Beneficially, the flexural hinge mechanism 410 provides for rotation along the hinge axis without drawbacks associated with certain other hinge mechanisms. For example, the flexural hinge mechanism 410 significantly resists wear, has no backlash, does not require lubrication, and provides increased longevity of the hinges. Additionally, the flexural hinge mechanism 410 does not need the level of precision in machining required by certain other hinge mechanisms.

Beneficially, use of the alignment mechanism and flexural hinges provides for easy assembly of the multi-segment mold 308. When the multi-segment mold 308 is assembled, the segments 402a-c are placed together such that the tapered pins 422 and tapered holes 424 are engaged. The flexural hinges 410 are then secured between the bottom segment 402c and the respective adjacent segments 402a,b.

Figure 13A:
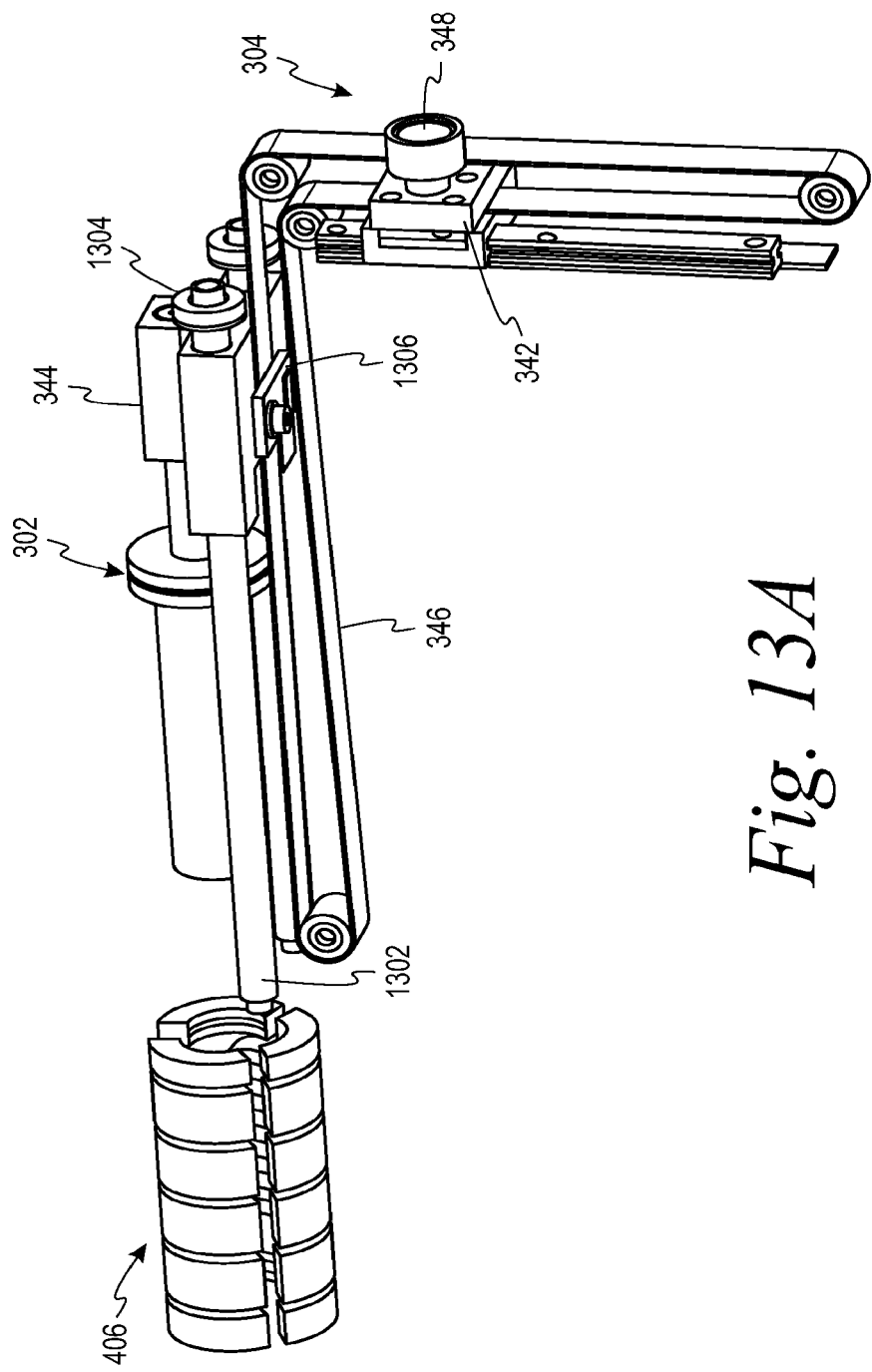
FIG. 13A illustrates a first perspective view of a belt-driven loading mechanism.
Figure 13B:
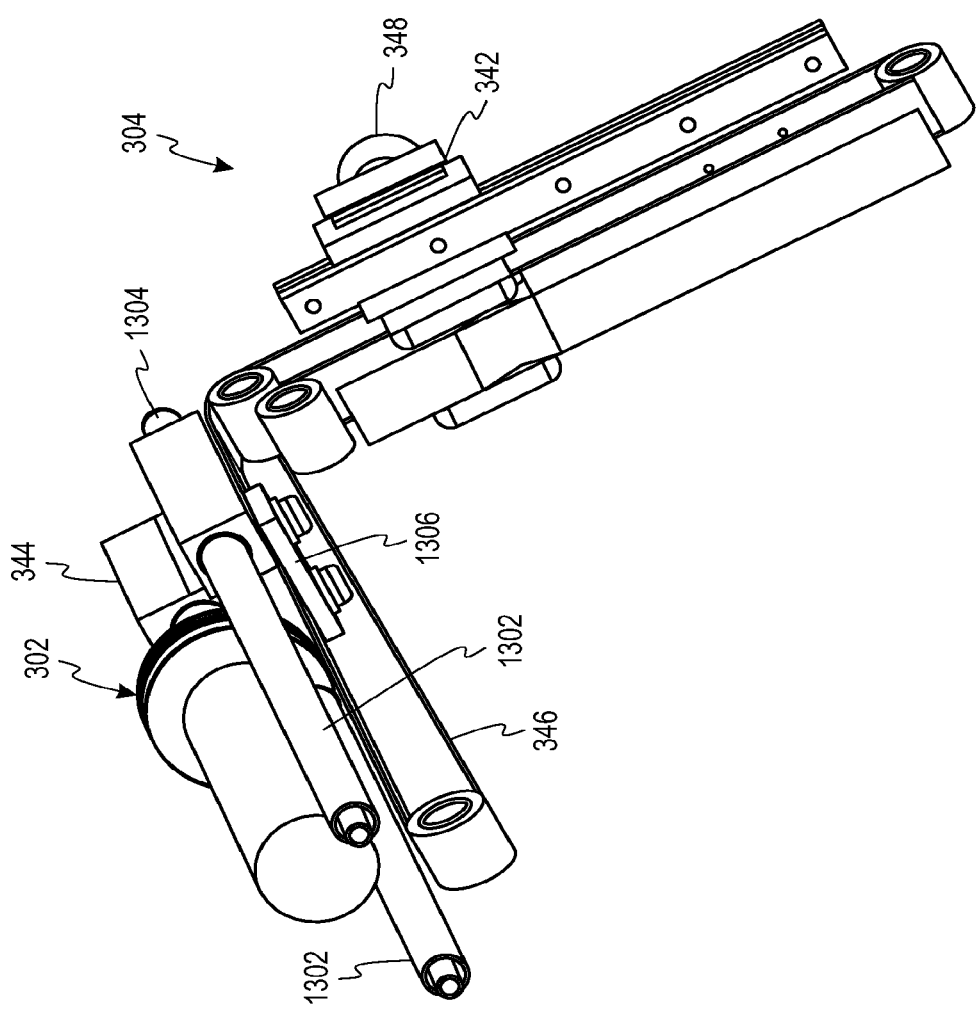
FIG. 13B illustrates a second perspective view of the belt-driven loading mechanism of FIG. 13A.

Referring now to FIGS. 13A-13B, a belt-driven loading mechanism 302 is shown. In some aspects, the belt-driven loading mechanism 302 provides an overload reset mechanism. The overload reset mechanism is configured to inhibit damage to the forming module 208 from, for example, a misfed preform article 216 and configured to reset the loading mechanism 302 to the first position when a misfeed occurs. The loading-mechanism carriage 344 is guided between the first position and the second position by rails 1302. The rails 1302 include a stop mechanism 1304 such a collar. The loading-mechanism carriage 344 is slidably attached to the belt 346 using a clamping mechanism 1306. The clamping mechanism 1306 uses resilient members such as spring washers to provide a clamping pressure to the belt 346. The clamping pressure provides sufficient frictional force between the belt 346 and the clamping mechanism 1306 to move the loading-mechanism carriage with the belt 346. When a misfeed occurs, the force of friction is overcome and the belt 346 continues to move toward the second position, while the loading-mechanism carriage 344 remains generally motionless. This prevents damage to the forming module 208 by inhibiting the pre-form article 216 from being driven into contact with components of the module. When the loading-mechanism actuator 304 begins its return, the loading-mechanism carriage 344 is urged toward the first position by the belt 346. However, because the belt 346 slid relative to the loading-mechanism carriage 344, the loading-mechanism carriage 344 returns to the first position prior to the loading-mechanism actuator 304. Once at the first position, the loading-mechanism carriage 344 engages the stop mechanism 1304. The stop mechanism 1304 provides resistive force so that the belt 346 slips through the clamping mechanism 1306. When the loading-mechanism actuator 304 returns to the first position, the system is reset to its initial conditions and may receive another pre-form container 216.

It is contemplated that a lower-speed, non-rotary system implementing aspects of the present disclosure is also possible. Single or multiple assemblies similar to FIG. 3A can be fed preforms manually, or by an automated system such as a robot or other device.

It is also contemplated that some aspects of the present disclosure may be applied to other processes to provide for forming of non-metallic articles, such as "blow-forming" of polymeric materials. For example, the electromagnetic coil 306 and charging circuit 102 may be replaced by a high pressure pneumatic, hydraulic, or bladder system to pressure form articles that do not respond well to aspects of above-described electromagnetic forming. These articles may include, for example, polymeric materials such as polyethylene terephthalate, polyvinyl chloride, polyethylene, polypropylene, metals or metal alloys that do not respond to electromagnetic energy, combinations thereof, and the like.

It is also contemplated that heat exchangers can be included in the forming system to dissipate heat. In some aspects, the multi-segment mold may include a plurality of passages configured to have a cooling fluid passed therethrough. These can be used to remove heat built up during the forming process, as well as alter physical properties of the multi-segment mold to improve forming of the articles. In some aspects, the electromagnetic coil 306 may include a plurality of passages configured to have a cooling fluid passed therethrough. These can be used to remove heat built up during the forming process, as well as alter physical and electrical properties of the electromagnetic coil. In some aspects, the electromagnetic coil is cooled to lower the resistance, thus increasing electrical efficiency of the forming process.

Systems in accord with the present disclosure may also implement a specialized enclosure to provide one or more functions. In some aspects, certain enclosures may be provided with the system to ventilate fumes of ablated materials. In some aspects, certain enclosures may be provided to maintain an inert environment around one or more portions of the system. For example, portions of the system with an open spark travelling between adjacent contacts can be placed in an environment including nitrogen, carbon dioxide, a vacuum, or another inert material to inhibit ablation of the contact material. In some aspects, a sound-dampening enclosure is provided around portions of the system, such as capacitor banks or contact points, to inhibit noise hazards when the system is placed in, for example, a warehouse.

Systems in accord with the present disclosures may also provide for lower cost to manufacture articles by lowering operating costs such as replacement parts, maintenance, and power requirements.

While the articles herein are described as having an open end opposite a closed end and at least one sidewall bridging the open end and the closed end, it is also contemplated that each of the articles may be open at both ends or closed at both ends. Additionally, a top, lid, or other closure may be added to the articles during an operation by the electromagnetic-forming system or at a later stage.

Each of the embodiments disclosed herein, and obvious variations thereof, is contemplated as falling within the spirit and scope of the claimed invention, which is set forth in the following claims. Moreover, the present concepts expressly include any and all combinations and subcombinations of the elements and aspects disclosed herein.

Alternative Embodiment A

A rotary-turret system for forming a plurality of formed containers from a respective plurality of pre-form articles using electromagnetic energy, the system comprising:
- a rotary turret having a plurality of forming modules, the forming modules being disposed about the periphery of the rotary turret, each forming module including a multi-segment mold disposed about an electromagnetic coil, the multi-segment mold having a plurality of segments, each segment including an inner surface, the plurality of inner surfaces defining a desired shape of the formed containers, the electromagnetic coil being configured to impart an electromagnetic force on the pre-form articles when supplied with electrical energy, the electromagnetic force configured to urge the pre-form articles into contact with the inner surfaces of the multi-segment mold to produce the formed containers;
- a charging circuit configured to supply the electrical energy to the rotary turret;
- a discharge-control mechanism operatively coupled to the rotary turret and the charging circuit, the discharge-control mechanism configured to selectively actuate discharge of the electrical energy from the charging circuit to a predetermined one of the plurality of forming modules,
- wherein the rotary turret continually rotates during forming of the plurality of formed containers.

Alternative Embodiment B

The rotary-turret system of alternative embodiment A, further comprising an infeed starwheel and an outfeed starwheel, the infeed starwheel configured to receive the pre-form articles from an upstream process and deposit each of the pre-form articles into a respective one of the forming modules, the outfeed starwheel configured to receive the formed containers from the forming modules and deliver the formed containers to a downstream process.

Alternative Embodiment C

The rotary-turret system of alternative embodiment A, wherein charging circuit includes a capacitor bank.

Alternative Embodiment D

The rotary-turret system of alternative embodiment A, wherein the discharge-control mechanism includes a moving spark-gap mechanism.

Alternative Embodiment E

The rotary-turret system of alternative embodiment A, wherein the electromagnetic coil includes helical windings, the helical windings being formed from milling a winding tube.

Alternative Embodiment F

The rotary-turret system of alternative embodiment A, further comprising a compressed-air system and a vacuum system, the compressed-air system configured to pressurize an internal volume disposed between the pre-form article and the electromagnetic coil to a predetermined pressure, the vacuum system configured to evacuate a volume between the pre-form article and the inner surface of the multi-segment mold.

Alternative Embodiment G

The rotary turret system of alternative embodiment A, wherein the multi-segment mold has three segments.

Alternative Embodiment H

The rotary turret system of alternative embodiment A, wherein the segments include hinges coupling the segments of the multi-segment mold such that actuating a first segment of the multi-segment mold actuates the remaining segments of the multi-segment mold.

Alternative Embodiment I

A method for electromagnetic forming of formed containers using a rotary turret having a plurality of forming modules disposed about the periphery of the rotary turret, the method comprising the acts of:
- receiving a pre-form article from an upstream process in a respective one of the forming modules;
- disposing the pre-form article about an electromagnetic coil, the electromagnetic coil being disposed on the forming module, the electromagnetic coil being configured to impart an electromagnetic force on the pre-form article when supplied with electrical energy;
- securing a multi-segment mold about the pre-form article, the multi-segment mold including a plurality of segments, each of the plurality of segments including an inner surface, the plurality of inner surfaces defining a desired shape of the formed containers;
- supplying, after the securing the multi-segment mold, a first electrical energy to the electromagnetic coil to produce an electromagnetic force, the electromagnetic force configured to urge the pre-form article into contact with the inner surfaces of the multi-segment mold, thereby producing one of the formed containers; and
- wherein the disposing, securing, and supplying steps occur while the rotary turret continually rotates.

Alternative Embodiment J

The method of alternative embodiment I, further comprising removing the formed container from the respective one of the forming module using an outfeed starwheel, and wherein the pre-form article is received from an infeed starwheel.

Alternative Embodiment K

The method of alternative embodiment I, wherein the electromagnetic coil includes helical windings, the helical windings being milled from a winding tube.

Alternative Embodiment L

The method of alternative embodiment I, wherein the multi-segment mold has three segments.

Alternative Embodiment M

The method of alternative embodiment I, wherein the multi-segment mold includes hinges coupling the segments of the multi-segment mold, and wherein the securing the multi-segment mold is performed by an actuator engaging a single segment of the plurality of segments.

Alternative Embodiment N

The method of alternative embodiment I, further comprising the acts of:
- pressurizing, prior to supplying the first electrical energy, an interior volume disposed between the pre-form article and the electromagnetic coil to a predetermined pressure; and
- evacuating, prior to the supplying the first electrical energy, a volume defined by the pre-form article and the inner surfaces of the multi-segment mold.

Alternative Embodiment O

The method of alternative embodiment I, further comprising the act of supplying a second electrical energy to the electromagnetic coil to produce a second electromagnetic force, the second electromagnetic force configured to further urge the pre-form article into contact with the inner surfaces of the multi-segment mold.

Alternative Embodiment P

The method of alternative embodiment 0, wherein the second electrical energy is higher than the first electrical energy.

Alternative Embodiment Q

The method of alternative embodiment I, wherein the electromagnetic coil is configured to produce a first magnetic domain corresponding to a first portion of the pre-form article and a second magnetic domain corresponding to a second portion of the pre-form article, and wherein the supplying the electrical energy produces the electromagnetic force in a first magnetic domain and a second electromagnetic force in a second magnetic domain, the second electromagnetic force being lower than the electromagnetic force.

Alternative Embodiment R

A system for forming a plurality of formed containers from a plurality of pre-form articles using electromagnetic energy, the system comprising:
- a plurality of forming modules, the plurality of forming modules being movably mounted relative to an infeed mechanism, the infeed mechanism configured to supply pre-form articles to the plurality of forming modules, each of the plurality of forming modules including a multi-segment mold disposed about an electromagnetic coil, the multi-segment mold having a plurality of segments, each of the plurality of segments including an inner surface, the plurality of inner surfaces defining a desired shape of the formed containers, the electromagnetic coil being configured to impart an electromagnetic force on the pre-form articles when supplied with electrical energy, the electromagnetic force being configured to urge the pre-form articles into contact with the inner surfaces of the multi-segment mold to produce the formed containers;
- a charging circuit being configured to supply the electrical energy to the plurality of forming modules;
- a discharge-control mechanism operatively coupled to the plurality of forming modules and the charging circuit, the discharge-control mechanism being configured to selectively actuate discharge of the electrical energy from the charging circuit to a predetermined forming module.

Alternative Embodiment S

The system of alternative embodiment R, further comprising a compressed-air system and a vacuum system, the compressed-air system being configured to pressurize an internal volume disposed between the pre-form article and the electromagnetic coil to a predetermined pressure, the vacuum system being configured to evacuate a volume between the pre-form article and the inner surface of the multi-segment mold.

Alternative Embodiment T

A mold system comprising:
a first plate disposed opposite a second plate, each of the first plate and the second plate including a plurality of slots thereon, each of the plurality of slots in the first plate corresponding to a respective one of the plurality of slots on the second plate; and
a multi-segment mold extending the distance between the first plate and the second plate, the multi-segment mold having an open state and a closed state, the multi-segment mold including a plurality of segments, each of the plurality of segments having one of a plurality of inner surfaces thereon, the plurality of segments being cooperatively arranged such that the plurality of inner surfaces defines a volume when in the closed state, each of the plurality of segments of the multi-segment mold including a first end disposed proximate the first plate and a second end proximate the second plate, the first end and the second end of each of the plurality of segments including slot followers, each of the slot followers being configured to engage one of the plurality of slots,
wherein each of the plurality of slots is shaped such that engagement of the slot followers with the respective slots guide movement of the plurality of segments between the open state and the closed state when each of the plurality of segments moves relative to the first plate and the second plate.

Alternative Embodiment U

The mold system of alternative embodiment T, wherein the multi-segment mold further includes a plurality of hinges coupling the segments of the multi-segment mold such that actuating a first segment of the multi-segment mold actuates the remaining segments of the multi-segment mold.

Alternative Embodiment V

The mold system of alternative embodiment T, wherein each of the plurality of segments further includes one of a plurality of inserts, each of the plurality of inner surfaces being disposed on a respective one of the plurality of inserts.

Alternative Embodiment W

The mold system of alternative embodiment T, wherein the plurality of segments further comprises a plurality of apertures extending therethrough, the plurality of apertures being coupled to a vacuum system, the plurality of apertures being configured to evacuate air from a volume between the plurality of inner surfaces and the pre-form article.

Alternative Embodiment X

The mold system of alternative embodiment T, wherein the plurality of inner surfaces includes an embossing pattern thereon.

Alternative Embodiment Y

The mold system of alternative embodiment T, further comprising an electromagnetic coil disposed within the volume when the multi-segment mold is in the closed position, the electromagnetic coil being configured to urge a pre-form article into contact with the plurality of inner surfaces.

Alternative Embodiment Z

An electromagnetic coil assembly comprising:
a bottom cap and milled helical windings, the milled helical windings being electrically coupled to the bottom cap, the bottom cap and the milled helical windings being configured to be coupled to a charging circuit, the helical coil being configured to exert an electromagnetic force when an electrical energy is passed through the milled helical windings,
wherein the milled helical windings are created by milling a generally cylindrical tube of conductive material.

Alternative Embodiment AA

The electromagnetic coil assembly of alternative embodiment Z, wherein the helical windings define a cavity, the helical windings having cross-sectional profiles including generally flat edges proximate the cavity.

Alternative Embodiment BB

The electromagnetic coil assembly of alternative embodiment AA, wherein the cross-sectional profile is generally rectangular.

Alternative Embodiment CC

The electromagnetic coil assembly of alternative embodiment Z, wherein the bottom cap is generally shaped to extend into a domed bottom of a pre-form article when the pre-form article is disposed about the electromagnetic coil assembly.

Alternative Embodiment DD

A method of making an electromagnetic coil comprising the acts of:
assembling a winding tube, a bottom cap, and a return conductor, the assembling including
securing the bottom cap to an end of the winding tube, the bottom cap being electrically coupled to the winding tube, and
securing the return conductor to the bottom cap, the return conductor being electrically coupled to the bottom cap;
pouring a curable material into a cavity formed by the winding tube, the bottom cap, and the return conductor; and
milling the winding tube to form helical windings, the windings being formed by removing portions of the winding tube.

Alternative Embodiment EE

The method of alternative embodiment DD, wherein each of the helical windings has a generally rectangular cross-sectional profile.

Alternative Embodiment FF

The method of alternative embodiment DD, wherein the helical windings have a non-uniform pitch along the length of the electromagnetic coil, the non-uniform pitch creating a plurality of electromagnetic domains when an electrical energy is passed through the electromagnetic coil.

Alternative Embodiment GG

The method of alternative embodiment DD, wherein the bottom cap is shaped to accommodate a domed bottom of a pre-form article.

Alternative Embodiment HH

The method of alternative embodiment GG, further comprising the act of milling at least one passage in the bottom cap, the at least one passage being configured to allow airflow between the bottom cap and an exterior of the helical windings.

Alternative Embodiment II

An electromagnetic coil comprising:
a bottom cap being shaped to accommodate a domed bottom of a pre-form article;
helical windings extending from the bottom cap, the helical windings defining a generally cylindrical cavity therein, each of the helical windings having a cross-sectional profile, the cross-sectional profiles including generally flat edges proximate the cavity;
a return conductor electrically coupled to the bottom cap such that the helical windings, bottom cap, and return conductor form an electrical circuit, the electrical circuit configured to be electrically coupled to a charging circuit.

Alternative Embodiment JJ

The electromagnetic coil of alternative embodiment II, wherein the cross-sectional profile is generally rectangular.

Alternative Embodiment KK

The electromagnetic coil of alternative embodiment II, wherein the helical windings include a plurality of parallel electrical paths between the bottom cap and the power source.

Alternative Embodiment LL

The electromagnetic coil of alternative embodiment II, wherein the helical windings form a plurality of electromagnetic domains along the length of the coil.

Alternative Embodiment MM

The electromagnetic coil of alternative embodiment LL, wherein the electromagnetic domains are formed by a non-uniform pitch of the helical windings.

Alternative Embodiment NN

The electromagnetic coil of alternative embodiment II, wherein the helical windings and the bottom cap form a generally tapered edge such that the helical windings extend proximate a bottom edge of the pre-form article when the pre-form article is disposed about the electromagnetic coil.

Alternative Embodiment OO

The electromagnetic coil of alternative embodiment NN, wherein a distance from the helical windings to the bottom edge is less than about 25 mm.

Alternative Embodiment PP

The electromagnetic coil of alternative embodiment NN, wherein a distance from the helical windings to the bottom edge is less than about 20 mm.

Alternative Embodiment QQ

The electromagnetic coil of alternative embodiment NN, wherein a distance from the helical windings to the bottom edge is less than about 15 mm.

Alternative Embodiment RR

The electromagnetic coil of alternative embodiment II, wherein the cavity includes a rigid core disposed therein, the core being configured to inhibit movement of the helical windings during application of an electromagnetic energy.

Alternative Embodiment SS

The electromagnetic coil of alternative embodiment RR, wherein the core is formed from a poured epoxy, urethane, or polyurethane resin.

Alternative Embodiment TT

The electromagnetic coil of alternative embodiment II, wherein the assembly is configured to be coupled to a compressed-air system, the compressed-air system being configured to pressurize an internal volume disposed between the pre-form article and the electromagnetic coil to a predetermined pressure when the pre-form article is disposed about the helical windings.

Alternative Embodiment UU

The electromagnetic coil of alternative embodiment TT, further comprising a plurality of sealing members disposed about the helical windings proximate the top cap, the sealing members being configured to form a substantially air-tight seal between a portion of the pre-form article and the electromagnetic coil assembly.

Alternative Embodiment VV

The electromagnetic coil of alternative embodiment II, further comprising a sleeve disposed about the helical windings, the sleeve being configured to electrically insulate the electromagnetic coil from the pre-form article.

Alternative Embodiment WW

A variable-speed starwheel for transferring articles comprising
a driving mechanism configured to rotate about an axis of rotation;
a cam surface having variable radial distance from the axis of rotation, the variable radial distance having a first radial distance extending a first distance away from the axis of rotation at a first angular position, and a second radial distance extending a second distance away from the axis of rotation at a second angular position, the second angular position being spaced a distance from the first angular position; and
an arm coupled to the driving mechanism, the arm including a pivot mechanism, a pocket, and a cam follower, the pivot mechanism being coupled to the driving mechanism, the pivot mechanism providing pivotable movement of the arm relative to the driving mechanism, the pivot mechanism being spaced a distance from the pocket, the pocket being configured to releasably receive the articles, the cam follower being configured to engage the cam surface,
wherein engagement of the cam follower with the cam surface at the first angular position disposes the arm at a first angle, and wherein engagement of the cam follower with the cam surface at the second angular position disposes the arm at a second angle, the second angle being different than the second angle.

Alternative Embodiment XX

The variable-speed starwheel of alternative embodiment WW, wherein the driving mechanism includes a motor.

Alternative Embodiment YY

The variable-speed starwheel of alternative embodiment WW, wherein the driving mechanism includes a synchronization mechanism.

Alternative Embodiment ZZ

The variable-speed starwheel of alternative embodiment WW, wherein the arm is configured to nest with an adjacent arm of the variable-speed starwheel.

Alternative Embodiment AAA

The variable-speed starwheel of alternative embodiment WW, wherein the cam follower is axially offset from the pivot mechanism such that movement of the cam follower does not interfere with movement of an adjacent arm.

Alternative Embodiment BBB

An arm for use in a variable-speed starwheel to transfer articles, the arm comprising:
a member having a first end opposite a second end, the first end having a pivot mechanism configured to be coupled to a driving mechanism, the pivot mechanism being configured to provide pivotable movement of the arm relative to the driving mechanism, the second end having a pocket configured to releasably receive the articles; and
a cam follower configured to engage a cam surface, the cam follower being coupled to the member such that engagement of the cam follower with a cam surface is configured pivotably move the arm about the pivot mechanism.

Alternative Embodiment CCC

The arm of alternative embodiment BBB, wherein the cam follower is coupled to the member using a support, the support being attached to the member between the first end and the second end.

Alternative Embodiment DDD

The arm of alternative embodiment BBB, wherein the cam follower is disposed proximate the pivot mechanism and distal the pocket.

Alternative Embodiment EEE

A variable-speed starwheel for transferring articles comprising:
a driving mechanism configured to rotate about an axis of rotation;
a cam surface having variable radial distance from the axis of rotation, the variable radial distance having a first radial distance extending a first distance away from the axis of rotation at a first angular position, and a second radial distance extending a second distance away from the axis of rotation at a second angular position, the second angular position being spaced a distance from the first angular position; and
an arm coupled to the driving mechanism, the arm including a first portion and a second portion, the second portion being slidably mounted on the first portion, the first portion being attached to the driving mechanism, the second portion including a pocket and a cam follower, the pocket being configured to releasably receive the articles, the cam follower being configured to engage the cam mechanism.
wherein engagement of the cam follower with the cam surface at the first angular position disposes the arm at a first distance from the axis of rotation, and wherein engagement of the cam follower with the cam surface at the second angular position disposes the arm at a second distance from the axis of rotation, the first distance being different than the second distance.

Alternative Embodiment FFF

A variable-speed starwheel for transferring articles comprising:
a driving mechanism configured to rotate about an axis of rotation;
a pocket coupled to the driving mechanism, the pocket being configured to releasably receive the articles; and
a movement means, the movement means being configured to dispose the pocket at a first distance from the axis of rotation when the pocket is at a first angular position and to dispose the pocket at a second distance from the axis of rotation when the pocket is at a second angular position.

Alternative Embodiment GGG

The variable-speed starwheel of alternative embodiment GGG, wherein the movement means includes a cam follower configured to engage a cam surface, the cam follower being attached to the pocket.

What is claimed is:
1. An electromagnetic coil assembly comprising:
a bottom cap;
and more than one helical winding, each of the helical windings including a respective parallel electrical path, the helical windings being electrically coupled to the bottom cap, the bottom cap and the helical windings being configured to be coupled to a charging circuit, the helical windings being configured to exert an electro- magnetic force when an electrical energy is passed through the helical windings,
wherein the helical windings are created from a generally cylindrical tube of conductive material.

2. The electromagnetic coil assembly of claim 1, wherein the helical windings define a cavity, the helical windings having cross-sectional profiles including generally flat edges proximate the cavity.

3. The electromagnetic coil assembly of claim 2, wherein the cross-sectional profiles are generally rectangular.

4. The electromagnetic coil assembly of claim 1, wherein the bottom cap is generally shaped to extend into a domed bottom of a pre-form article when the pre-form article is disposed about the electromagnetic coil assembly.

5. The electromagnetic coil assembly of claim 1, wherein each of the parallel electrical paths is configured to provide a different inductance.

6. The electromagnetic coil assembly of claim 1, wherein the helical windings are created by milling the generally cylindrical tube of conductive material.

7. An electromagnetic coil comprising:
a bottom cap being shaped to accommodate a domed bottom of a pre-form article;
more than one helical winding extending from the bottom cap, each of the helical windings including a respective parallel electrical path, the helical windings defining a generally cylindrical cavity therein, each of the helical windings having a cross-sectional profile, the cross-sectional profiles including generally flat edges proximate the cavity; and
a return conductor electrically coupled to the bottom cap such that the helical windings, bottom cap, and return conductor form an electrical circuit, the electrical circuit configured to be electrically coupled to a charging circuit.

8. The electromagnetic coil of claim 7, wherein the cross-sectional profile is generally rectangular.

9. The electromagnetic coil of claim 7, wherein the parallel electrical paths flow between the bottom cap and the power source.

10. The electromagnetic coil of claim 7, wherein the helical windings form a plurality of electromagnetic domains along the length of the electromagnetic coil.

11. The electromagnetic coil of claim 10, wherein the electromagnetic domains are formed by a non-uniform pitch of the helical windings.

12. The electromagnetic coil of claim 7, wherein the helical windings and the bottom cap form a generally tapered edge such that the helical windings extend proximate a bottom edge of the pre-form article when the pre-form article is disposed about the electromagnetic coil.

13. The electromagnetic coil of claim 12, wherein a distance from the helical windings to the bottom edge is less than about 25 mm.

14. The electromagnetic coil of claim 12, wherein a distance from the helical windings to the bottom edge is less than about 20 mm.

15. The electromagnetic coil of claim 12, wherein a distance from the helical windings to the bottom edge is less than about 15 mm.

16. The electromagnetic coil of claim 7, wherein the cavity includes a rigid core disposed therein, the core being configured to inhibit movement of the helical windings during application of an electromagnetic energy.

17. The electromagnetic coil of claim 16, wherein the core is formed from a poured epoxy, urethane, or polyurethane resin.

18. The electromagnetic coil of claim 16, wherein the core includes heat pipes configured to carry heat away from the electromagnetic coil.

19. The electromagnetic coil of claim 7, further comprising a sleeve disposed about the helical windings, the sleeve being configured to electrically insulate the electromagnetic coil from the pre-form article.

20. The electromagnetic coil of claim 7, wherein each of the parallel electrical paths is configured to provide a different inductance.

21. An electromagnetic coil comprising:
a bottom cap being shaped to accommodate a domed bottom of a pre-form article;
more than one helical winding extending from the bottom cap, each of the helical windings including a respective parallel electrical path, the helical windings defining a generally cylindrical cavity therein, each of the helical windings having a cross-sectional profile, the cross-sectional profiles including generally flat edges proximate the cavity; and
a return conductor electrically coupled to the bottom cap such that the helical windings, bottom cap, and return conductor form an electrical circuit, the electrical circuit configured to be electrically coupled to a charging circuit,
wherein the electromagnetic coil is configured to be coupled to a compressed-air system, the compressed-air system being configured to pressurize an internal volume disposed between the pre-form article and the electromagnetic coil to a predetermined pressure when the pre-form article is disposed about the helical windings.

22. The electromagnetic coil of claim 21, further comprising a plurality of sealing members disposed about the helical windings proximate the top cap, the sealing members being configured to form a substantially air-tight seal between a portion of the pre-form article and the electromagnetic coil.

* * * * *